(12) United States Patent
Wu et al.

(10) Patent No.: US 7,023,979 B1
(45) Date of Patent: Apr. 4, 2006

(54) TELEPHONY CONTROL SYSTEM WITH INTELLIGENT CALL ROUTING

(76) Inventors: Wai Wu, 238 N. Delaware Ave., Massapequa, NY (US) 11758; Toby Heller, 235 Parkside Dr., Roslyn Heights, NY (US) 11577; Steven M. Hoffberg, 29 Buckout Rd., West Harrison, NY (US) 10604

( * ) Notice: Subject to any disclaimer, the term of this patent is extended or adjusted under 35 U.S.C. 154(b) by 251 days.

(21) Appl. No.: 10/385,389

(22) Filed: Mar. 7, 2003

Related U.S. Application Data

(60) Provisional application No. 60/363,027, filed on Mar. 7, 2002.

(51) Int. Cl.
H04M 3/00 (2006.01)
H04M 5/00 (2006.01)

(52) U.S. Cl. .............................. 379/265.11; 379/266.01
(58) Field of Classification Search ........... 379/265.02, 379/265.06, 265.12, 266.01, 309, 265.11
See application file for complete search history.

(56) References Cited

U.S. PATENT DOCUMENTS

| | | | |
|---|---|---|---|
| 4,048,452 A | 9/1977 | Oehring et al. |
| 4,286,118 A | 8/1981 | Mehaffey et al. |
| 4,677,663 A | 6/1987 | Szlam |
| 4,737,983 A | 4/1988 | Frauenthal et al. |
| 4,757,529 A | 7/1988 | Glapa et al. |
| 4,768,221 A | 8/1988 | Green et al. |
| 4,797,911 A | 1/1989 | Szlam et al. |
| 4,807,279 A | 2/1989 | McClure et al. |
| 4,852,149 A | 7/1989 | Zwick et al. |
| 4,866,754 A | 9/1989 | Hashimoto |
| 4,878,243 A | 10/1989 | Hashimoto |
| 4,893,301 A | 1/1990 | Andrews et al. |
| 4,894,857 A | 1/1990 | Szlam et al. |
| 4,924,501 A | 5/1990 | Cheeseman et al. |
| 4,930,150 A | 5/1990 | Katz |
| 4,933,964 A | 6/1990 | Girgis |
| 4,935,956 A | 6/1990 | Hellwarth et al. |
| 4,941,168 A | 7/1990 | Kelly |
| 4,953,204 A | 8/1990 | Cuschleg et al. |
| 4,958,371 A | 9/1990 | Damoci et al. |
| 4,975,841 A | 12/1990 | Kehnemuyi et al. |
| 4,977,595 A | 12/1990 | Ohta et al. |
| 4,979,171 A | 12/1990 | Ashley |
| 4,987,587 A | 1/1991 | Jolissaint |
| 4,998,272 A | 3/1991 | Hawkins et al. |
| 5,007,000 A | 4/1991 | Baldi |
| 5,007,078 A | 4/1991 | Masson et al. |
| 5,014,298 A | 5/1991 | Katz |
| 5,016,270 A | 5/1991 | Katz |
| 5,020,095 A | 5/1991 | Morganstein et al. |
| 5,020,097 A | 5/1991 | Tanaka et al. |
| 5,036,535 A | 7/1991 | Gechter et al. |
| 5,040,208 A | 8/1991 | Jolissaint |
| 5,048,075 A | 9/1991 | Katz |
| 5,063,522 A | 11/1991 | Winters |
| 5,070,525 A | 12/1991 | Szlam et al. |
| 5,070,526 A | 12/1991 | Richmond et al. |
| 5,073,890 A | 12/1991 | Danielsen et al. |

(Continued)

Primary Examiner—Benny Tieu
(74) Attorney, Agent, or Firm—Milde & Hoffberg LLP

(57) ABSTRACT

A communications management system comprising an input for receiving a communications classification; a database of skill weights with respect to the communications classification; a database of agent skill scores; and a processor, for computing, with respect to the received communication classification, an optimum agent selection, the processor directly controlling a routing of the information representing the received call.

20 Claims, 2 Drawing Sheets

U.S. PATENT DOCUMENTS

| | | | |
|---|---|---|---|
| 5,073,929 | A | 12/1991 | Katz |
| 5,077,789 | A | 12/1991 | Clark et al. |
| 5,081,711 | A | 1/1992 | Rickman |
| 5,097,528 | A | 3/1992 | Gursahaney et al. |
| 5,103,449 | A | 4/1992 | Jolissaint |
| 5,121,422 | A | 6/1992 | Kudo |
| 5,128,984 | A | 7/1992 | Katz |
| 5,161,181 | A | 11/1992 | Zwick |
| 5,163,083 | A | 11/1992 | Dowden et al. |
| 5,163,087 | A | 11/1992 | Kaplan |
| 5,164,981 | A | 11/1992 | Mitchell et al. |
| 5,166,974 | A | 11/1992 | Morganstein et al. |
| 5,168,517 | A | 12/1992 | Waldman |
| 5,185,786 | A | 2/1993 | Zwick |
| 5,193,110 | A | 3/1993 | Jones et al. |
| 5,206,903 | A | 4/1993 | Kohler et al. |
| 5,214,688 | A | 5/1993 | Szlam et al. |
| 5,218,635 | A | 6/1993 | Bonvallet et al. |
| 5,224,153 | A | 6/1993 | Katz |
| 5,224,162 | A | 6/1993 | Okamoto et al. |
| 5,237,159 | A | 8/1993 | Stephens et al. |
| 5,239,574 | A | 8/1993 | Brandman et al. |
| 5,251,252 | A | 10/1993 | Katz |
| 5,253,289 | A | 10/1993 | Tanaka |
| 5,276,732 | A | 1/1994 | Stent et al. |
| 5,278,898 | A | 1/1994 | Cambray et al. |
| 5,283,818 | A | 2/1994 | Klausner et al. |
| 5,289,530 | A | 2/1994 | Reese |
| 5,291,550 | A * | 3/1994 | Levy et al. ............... 379/242 |
| 5,297,146 | A | 3/1994 | Ogawa |
| 5,297,195 | A | 3/1994 | Thorne et al. |
| 5,309,504 | A | 5/1994 | Morganstein |
| 5,309,505 | A | 5/1994 | Szlam et al. |
| 5,309,513 | A | 5/1994 | Rose |
| 5,311,574 | A | 5/1994 | Livanos |
| 5,311,577 | A | 5/1994 | Madrid et al. |
| 5,313,516 | A | 5/1994 | Afshar et al. |
| 5,319,703 | A | 6/1994 | Drory et al. |
| 5,321,745 | A | 6/1994 | Drory et al. |
| 5,325,292 | A | 6/1994 | Crockett |
| 5,327,490 | A | 7/1994 | Cave |
| 5,329,579 | A | 7/1994 | Brunson |
| 5,333,190 | A | 7/1994 | Eyster |
| 5,341,412 | A | 8/1994 | Ramot et al. |
| 5,341,414 | A | 8/1994 | Popke |
| 5,351,285 | A | 9/1994 | Katz |
| 5,359,645 | A | 10/1994 | Katz |
| 5,365,575 | A | 11/1994 | Katz |
| 5,369,695 | A | 11/1994 | Chakravarti et al. |
| 5,381,470 | A | 1/1995 | Cambray et al. |
| 5,390,236 | A | 2/1995 | Klausner et al. |
| 5,392,353 | A | 2/1995 | Morales |
| 5,400,393 | A | 3/1995 | Knuth et al. |
| 5,402,474 | A | 3/1995 | Miller et al. |
| 5,420,852 | A | 5/1995 | Anderson et al. |
| 5,420,919 | A | 5/1995 | Arnaud et al. |
| 5,425,093 | A | 6/1995 | Trefzger |
| 5,430,792 | A | 7/1995 | Jesurum et al. |
| 5,432,835 | A | 7/1995 | Hashimoto |
| 5,434,906 | A | 7/1995 | Robinson et al. |
| 5,436,967 | A | 7/1995 | Hanson |
| 5,442,693 | A | 8/1995 | Hays et al. |
| 5,448,624 | A | 9/1995 | Hardy et al. |
| 5,448,631 | A | 9/1995 | Cain |
| 5,459,781 | A | 10/1995 | Kaplan et al. |
| 5,465,286 | A | 11/1995 | Clare et al. |
| 5,467,391 | A | 11/1995 | Donaghue et al. |
| 5,479,487 | A | 12/1995 | Hammond |
| 5,479,501 | A | 12/1995 | Lai |
| 5,481,596 | A | 1/1996 | Comerford |
| 5,485,506 | A | 1/1996 | Recht et al. |
| 5,493,690 | A | 2/1996 | Shimazaki |
| 5,495,523 | A | 2/1996 | Stent et al. |
| 5,495,528 | A | 2/1996 | Dunn et al. |
| 5,502,762 | A | 3/1996 | Andrew et al. |
| 5,506,898 | A | 4/1996 | Costantini et al. |
| 5,511,112 | A | 4/1996 | Szlam |
| 5,511,117 | A | 4/1996 | Zazzera |
| 5,511,121 | A | 4/1996 | Yacobi |
| 5,515,421 | A | 5/1996 | Sikand et al. |
| 5,517,566 | A | 5/1996 | Smith et al. |
| 5,519,773 | A | 5/1996 | Dumas et al. |
| 5,524,140 | A | 6/1996 | Klausner et al. |
| 5,524,147 | A | 6/1996 | Bean |
| 5,526,417 | A | 6/1996 | Dezonno |
| 5,528,666 | A | 6/1996 | Weigand et al. |
| 5,530,931 | A | 6/1996 | Cook-Hellberg et al. |
| 5,533,103 | A | 7/1996 | Peavey et al. |
| 5,533,107 | A | 7/1996 | Irwin et al. |
| 5,533,109 | A | 7/1996 | Baker |
| 5,535,257 | A | 7/1996 | Goldberg et al. |
| 5,537,470 | A | 7/1996 | Lee |
| 5,544,220 | A | 8/1996 | Trefzger |
| 5,544,232 | A | 8/1996 | Baker et al. |
| 5,546,452 | A | 8/1996 | Andrews et al. |
| 5,546,456 | A | 8/1996 | Vilsoet et al. |
| 5,555,290 | A | 9/1996 | McLeod et al. |
| 5,555,295 | A | 9/1996 | Bhusri |
| 5,557,668 | A | 9/1996 | Brady |
| 5,559,867 | A | 9/1996 | Langsenkamp et al. |
| 5,559,878 | A | 9/1996 | Keys et al. |
| 5,560,011 | A | 9/1996 | Uyama |
| 5,561,711 | A | 10/1996 | Muller |
| 5,568,540 | A | 10/1996 | Greco et al. |
| 5,570,419 | A | 10/1996 | Cave et al. |
| 5,572,576 | A | 11/1996 | Klausner et al. |
| 5,572,586 | A | 11/1996 | Ouchi |
| 5,574,784 | A | 11/1996 | LaPadula et al. |
| 5,577,112 | A | 11/1996 | Cambray et al. |
| 5,579,377 | A | 11/1996 | Rogers |
| 5,579,383 | A | 11/1996 | Bales et al. |
| 5,581,602 | A | 12/1996 | Szlam et al. |
| 5,581,604 | A | 12/1996 | Robinson et al. |
| 5,581,607 | A | 12/1996 | Richardson et al. |
| 5,586,179 | A | 12/1996 | Stent et al. |
| 5,588,049 | A | 12/1996 | Detering et al. |
| 5,590,171 | A | 12/1996 | Howe et al. |
| 5,590,188 | A | 12/1996 | Crockett |
| 5,592,543 | A | 1/1997 | Smith et al. |
| 5,594,790 | A | 1/1997 | Curreri et al. |
| 5,594,791 | A | 1/1997 | Szlam et al. |
| 5,600,710 | A | 2/1997 | Weisser et al. |
| 5,610,774 | A | 3/1997 | Hayashi et al. |
| 5,610,978 | A | 3/1997 | Purits |
| 5,619,557 | A | 4/1997 | VanBerkum |
| 5,621,201 | A | 4/1997 | Langhans et al. |
| 5,623,547 | A | 4/1997 | Jones et al. |
| 5,625,676 | A | 4/1997 | Greco et al. |
| 5,625,682 | A | 4/1997 | Gray et al. |
| 5,633,917 | A | 5/1997 | Rogers |
| 5,633,922 | A | 5/1997 | August et al. |
| 5,633,924 | A | 5/1997 | Kaish et al. |
| 5,636,267 | A | 6/1997 | Utsumi et al. |
| 5,636,268 | A | 6/1997 | Dijkstra et al. |
| 5,638,436 | A | 6/1997 | Hamilton et al. |
| 5,646,986 | A | 7/1997 | Sahni et al. |
| 5,646,988 | A | 7/1997 | Hikawa |
| 5,652,788 | A | 7/1997 | Hara |
| 5,655,013 | A | 8/1997 | Gainsboro |
| 5,655,014 | A | 8/1997 | Walsh et al. |
| 5,657,074 | A | 8/1997 | Ishibe et al. |
| 5,661,283 | A | 8/1997 | Gallacher et al. |
| 5,666,416 | A | 9/1997 | Micali |
| 5,675,637 | A | 10/1997 | Szlam et al. |

| | | | | | |
|---|---|---|---|---|---|
| 5,677,955 A | 10/1997 | Doggett et al. | 5,875,108 A | 2/1999 | Hoffberg et al. |
| 5,679,940 A | 10/1997 | Templeton et al. | 5,878,126 A | 3/1999 | Velamuri et al. |
| 5,684,863 A | 11/1997 | Katz | 5,878,130 A | 3/1999 | Andrews et al. |
| 5,687,225 A | 11/1997 | Jorgensen | 5,884,277 A | 3/1999 | Khosla |
| 5,692,033 A | 11/1997 | Farris | 5,889,862 A | 3/1999 | Ohta et al. |
| 5,692,034 A | 11/1997 | Richardson et al. | 5,889,863 A | 3/1999 | Weber |
| 5,696,809 A | 12/1997 | Voit | 5,890,138 A | 3/1999 | Godin et al. |
| 5,696,818 A | 12/1997 | Doremus et al. | 5,893,902 A | 4/1999 | Transue et al. |
| 5,696,908 A | 12/1997 | Muehlberger et al. | 5,894,505 A | 4/1999 | Koyama |
| 5,699,418 A | 12/1997 | Jones | 5,896,446 A | 4/1999 | Sagady et al. |
| 5,701,295 A | 12/1997 | Bales et al. | 5,898,154 A | 4/1999 | Rosen |
| 5,703,935 A | 12/1997 | Raissyan et al. | 5,898,759 A | 4/1999 | Huang |
| 5,715,307 A | 2/1998 | Zazzera | 5,898,762 A | 4/1999 | Katz |
| 5,717,741 A | 2/1998 | Yue et al. | 5,901,209 A | 5/1999 | Tannenbaum et al. |
| 5,717,757 A | 2/1998 | Micali | 5,901,214 A | 5/1999 | Shaffer et al. |
| RE35,758 E | 3/1998 | Winter et al. | 5,901,229 A | 5/1999 | Fujisaki et al. |
| 5,724,418 A | 3/1998 | Brady | 5,901,246 A | 5/1999 | Hoffberg et al. |
| 5,727,154 A | 3/1998 | Fry et al. | 5,903,454 A | 5/1999 | Hoffberg et al. |
| 5,729,600 A | 3/1998 | Blaha et al. | 5,903,641 A | 5/1999 | Tonisson |
| 5,740,233 A | 4/1998 | Cave et al. | 5,903,651 A | 5/1999 | Kocher |
| 5,740,240 A | 4/1998 | Jolissaint | 5,903,880 A | 5/1999 | Biffar |
| 5,742,675 A | 4/1998 | Kilander et al. | 5,905,792 A | 5/1999 | Miloslavsky |
| 5,748,711 A | 5/1998 | Scherer | 5,905,975 A | 5/1999 | Ausubel |
| 5,754,939 A | 5/1998 | Herz et al. | 5,905,979 A | 5/1999 | Barrows |
| 5,761,285 A | 6/1998 | Stent | 5,907,601 A | 5/1999 | David et al. |
| 5,768,355 A | 6/1998 | Salibrici et al. | 5,907,608 A | 5/1999 | Shaffer et al. |
| 5,768,360 A | 6/1998 | Reynolds et al. | 5,910,982 A | 6/1999 | Shaffer et al. |
| 5,768,385 A | 6/1998 | Simon | 5,912,947 A | 6/1999 | Langsenkamp et al. |
| 5,774,357 A | 6/1998 | Hoffberg et al. | 5,913,195 A | 6/1999 | Weeren et al. |
| 5,774,537 A | 6/1998 | Kim | 5,914,951 A | 6/1999 | Bentley et al. |
| 5,787,156 A | 7/1998 | Katz | 5,915,011 A | 6/1999 | Miloslavsky |
| 5,787,159 A | 7/1998 | Hamilton et al. | 5,915,093 A | 6/1999 | Berlin et al. |
| 5,790,935 A | 8/1998 | Payton | 5,917,893 A | 6/1999 | Katz |
| 5,793,846 A | 8/1998 | Katz | 5,917,903 A | 6/1999 | Jolissaint |
| 5,793,868 A | 8/1998 | Micali | 5,918,213 A | 6/1999 | Bernard et al. |
| 5,796,791 A | 8/1998 | Polcyn | 5,920,477 A | 7/1999 | Hoffberg et al. |
| 5,796,816 A | 8/1998 | Utsumi | 5,920,629 A | 7/1999 | Rosen |
| 5,799,077 A | 8/1998 | Yoshii | 5,923,745 A | 7/1999 | Hurd |
| 5,799,087 A | 8/1998 | Rosen | 5,923,746 A | 7/1999 | Baker et al. |
| 5,806,071 A | 9/1998 | Balderrama et al. | 5,924,016 A | 7/1999 | Fuller et al. |
| 5,812,642 A | 9/1998 | Leroy | 5,926,528 A | 7/1999 | David |
| 5,812,668 A | 9/1998 | Weber | 5,926,539 A | 7/1999 | Shtivelman |
| 5,815,551 A | 9/1998 | Katz | 5,926,548 A | 7/1999 | Okamoto |
| 5,815,554 A | 9/1998 | Burgess et al. | 5,930,339 A | 7/1999 | Nepustil |
| 5,815,566 A | 9/1998 | Ramot et al. | 5,930,777 A | 7/1999 | Barber |
| 5,815,657 A | 9/1998 | Williams | 5,933,480 A | 8/1999 | Felger |
| 5,822,400 A | 10/1998 | Smith | 5,933,492 A | 8/1999 | Turovski |
| 5,822,401 A | 10/1998 | Cave et al. | 5,933,498 A | 8/1999 | Schneck et al. |
| 5,822,410 A | 10/1998 | McCausland et al. | 5,937,055 A | 8/1999 | Kaplan |
| 5,825,869 A * | 10/1998 | Brooks et al. ......... 379/265.12 | 5,937,390 A | 8/1999 | Hyodo |
| 5,828,731 A | 10/1998 | Szlam et al. | 5,937,394 A | 8/1999 | Wong et al. |
| 5,828,734 A | 10/1998 | Katz | 5,940,493 A | 8/1999 | Desar et al. |
| 5,828,840 A | 10/1998 | Cowan et al. | 5,940,496 A | 8/1999 | Gisby et al. |
| 5,832,089 A | 11/1998 | Kravitz et al. | 5,940,497 A | 8/1999 | Miloslavsky |
| 5,835,572 A | 11/1998 | Richardson et al. | 5,940,947 A | 8/1999 | Takeuchi et al. |
| 5,835,896 A | 11/1998 | Fisher et al. | 5,941,813 A | 8/1999 | Sievers et al. |
| 5,838,772 A | 11/1998 | Wilson et al. | 5,943,403 A | 8/1999 | Richardson et al. |
| 5,838,779 A | 11/1998 | Fuller et al. | 5,943,424 A | 8/1999 | Berger et al. |
| 5,839,119 A | 11/1998 | Krsul et al. | 5,946,387 A | 8/1999 | Miloslavsky |
| 5,841,852 A | 11/1998 | He | 5,946,388 A | 8/1999 | Walker et al. |
| 5,848,143 A | 12/1998 | Andrews et al. | 5,946,394 A | 8/1999 | Gambuzza |
| 5,850,428 A | 12/1998 | Day | 5,946,669 A | 8/1999 | Polk |
| 5,850,446 A | 12/1998 | Berger et al. | 5,949,045 A | 9/1999 | Ezawa et al. |
| 5,854,832 A | 12/1998 | Dezonno | 5,949,852 A | 9/1999 | Duncan |
| 5,857,013 A | 1/1999 | Yue et al. | 5,949,854 A | 9/1999 | Sato |
| 5,857,023 A | 1/1999 | Demers et al. | 5,949,863 A | 9/1999 | Tansky |
| 5,867,386 A | 2/1999 | Hoffberg et al. | 5,952,638 A | 9/1999 | Demers et al. |
| 5,867,559 A | 2/1999 | Jorgensen et al. | 5,953,332 A | 9/1999 | Miloslavsky |
| 5,867,564 A | 2/1999 | Bhusri | 5,953,405 A | 9/1999 | Miloslavsky |
| 5,867,572 A | 2/1999 | MacDonald et al. | 5,956,392 A | 9/1999 | Tanigawa et al. |
| 5,867,799 A | 2/1999 | Lang et al. | 5,956,397 A | 9/1999 | Shaffer et al. |
| 5,870,464 A | 2/1999 | Brewster et al. | 5,960,073 A | 9/1999 | Kikinis et al. |
| 5,872,833 A | 2/1999 | Scherer | 5,960,083 A | 9/1999 | Micali |

| | | | | | | |
|---|---|---|---|---|---|---|
| 5,963,632 | A | 10/1999 | Miloslavsky | 6,044,368 | A | 3/2000 | Powers |
| 5,963,635 | A | 10/1999 | Szlam et al. | 6,047,067 | A | 4/2000 | Rosen |
| 5,963,648 | A | 10/1999 | Rosen | 6,047,269 | A | 4/2000 | Biffar |
| 5,963,924 | A | 10/1999 | Williams et al. | 6,047,887 | A | 4/2000 | Rosen |
| 5,966,429 | A | 10/1999 | Scherer | 6,049,599 | A | 4/2000 | McCausland et al. |
| 5,970,132 | A | 10/1999 | Brady | 6,049,786 | A | 4/2000 | Smorodinsky |
| 5,970,134 | A | 10/1999 | Highland et al. | 6,049,787 | A | 4/2000 | Takahashi et al. |
| 5,974,120 | A | 10/1999 | Katz | 6,052,453 | A | 4/2000 | Sagady et al. |
| 5,974,135 | A | 10/1999 | Breneman et al. | 6,055,307 | A | 4/2000 | Behnke et al. |
| RE36,416 | E | 11/1999 | Szlam et al. | 6,055,508 | A | 4/2000 | Naor et al. |
| 5,978,465 | A | 11/1999 | Corduroy et al. | 6,057,872 | A | 5/2000 | Candelore |
| 5,978,467 | A | 11/1999 | Walker et al. | 6,058,381 | A | 5/2000 | Nelson |
| 5,978,471 | A | 11/1999 | Bokinge | 6,058,435 | A | 5/2000 | Sassin et al. |
| 5,978,840 | A | 11/1999 | Nguyen et al. | 6,061,347 | A | 5/2000 | Hollatz et al. |
| 5,982,857 | A | 11/1999 | Brady | 6,061,448 | A | 5/2000 | Smith et al. |
| 5,982,868 | A | 11/1999 | Shaffer et al. | 6,061,665 | A | 5/2000 | Bahreman |
| 5,983,208 | A | 11/1999 | Haller et al. | 6,064,667 | A | 5/2000 | Gisby et al. |
| 5,983,214 | A | 11/1999 | Lang et al. | 6,064,730 | A | 5/2000 | Ginsberg |
| 5,987,115 | A | 11/1999 | Petrunka et al. | 6,064,731 | A | 5/2000 | Flockhart et al. |
| 5,987,116 | A | 11/1999 | Petrunka et al. | 6,064,973 | A | 5/2000 | Smith et al. |
| 5,987,118 | A | 11/1999 | Dickerman et al. | 6,065,675 | A | 5/2000 | Teicher |
| 5,987,132 | A | 11/1999 | Rowney | 6,067,348 | A | 5/2000 | Hibbeler |
| 5,987,140 | A | 11/1999 | Rowney et al. | 6,070,142 | A | 5/2000 | McDonough et al. |
| 5,991,391 | A | 11/1999 | Miloslavsky | 6,072,864 | A | 6/2000 | Shtivelman et al. |
| 5,991,392 | A | 11/1999 | Miloslavsky | 6,072,870 | A | 6/2000 | Nguyen et al. |
| 5,991,393 | A | 11/1999 | Kamen | 6,078,928 | A | 6/2000 | Schnase et al. |
| 5,991,395 | A | 11/1999 | Miloslavsky | 6,081,750 | A | 6/2000 | Hoffberg et al. |
| 5,991,604 | A | 11/1999 | Yi | 6,084,943 | A | 7/2000 | Sunderman et al. |
| 5,991,761 | A | 11/1999 | Mahoney et al. | 6,097,806 | A | 8/2000 | Baker et al. |
| 5,995,614 | A | 11/1999 | Miloslavsky | 6,098,069 | A | 8/2000 | Yamaguchi |
| 5,995,615 | A | 11/1999 | Miloslavsky | 6,102,970 | A | 8/2000 | Kneipp |
| 5,995,948 | A | 11/1999 | Whitford et al. | 6,104,801 | A | 8/2000 | Miloslavsky |
| 5,996,076 | A | 11/1999 | Rowney et al. | 6,112,181 | A | 8/2000 | Shear et al. |
| 5,999,908 | A | 12/1999 | Abelow | 6,112,186 | A | 8/2000 | Bergh et al. |
| 5,999,919 | A | 12/1999 | Jarecki et al. | 6,115,462 | A | 9/2000 | Servi et al. |
| 5,999,965 | A | 12/1999 | Kelly | 6,115,693 | A | 9/2000 | McDonough et al. |
| 6,002,760 | A | 12/1999 | Gisby | 6,118,865 | A | 9/2000 | Gisby |
| 6,002,767 | A | 12/1999 | Kramer | 6,122,358 | A | 9/2000 | Shoji et al. |
| 6,003,765 | A | 12/1999 | Okamoto | 6,122,360 | A | 9/2000 | Neyman et al. |
| 6,005,534 | A | 12/1999 | Hylin et al. | 6,122,364 | A | 9/2000 | Petrunka et al. |
| 6,005,928 | A | 12/1999 | Johnson | 6,122,484 | A | 9/2000 | Fuller et al. |
| 6,005,931 | A | 12/1999 | Neyman et al. | 6,125,178 | A | 9/2000 | Walker et al. |
| 6,005,939 | A | 12/1999 | Fortenberry et al. | 6,128,376 | A | 10/2000 | Smith |
| 6,006,218 | A | 12/1999 | Breese et al. | 6,128,380 | A | 10/2000 | Shaffer et al. |
| 6,009,149 | A | 12/1999 | Langsenkamp | 6,130,937 | A | 10/2000 | Fotta |
| 6,011,845 | A | 1/2000 | Nabkel et al. | 6,134,530 | A | 10/2000 | Bunting et al. |
| 6,014,439 | A | 1/2000 | Walker et al. | 6,137,862 | A | 10/2000 | Atkinson et al. |
| 6,016,344 | A | 1/2000 | Katz | 6,137,870 | A | 10/2000 | Scherer |
| 6,016,475 | A | 1/2000 | Miller et al. | 6,138,119 | A | 10/2000 | Hall et al. |
| 6,016,484 | A | 1/2000 | Williams et al. | 6,144,737 | A | 11/2000 | Maruyama et al. |
| 6,018,579 | A | 1/2000 | Petrunka | 6,144,964 | A | 11/2000 | Breese et al. |
| 6,018,724 | A | 1/2000 | Arent | 6,146,026 | A | 11/2000 | Ushiku |
| 6,018,738 | A | 1/2000 | Breese et al. | 6,147,975 | A | 11/2000 | Bowman-Amuah |
| 6,021,114 | A | 2/2000 | Shaffer et al. | 6,148,065 | A | 11/2000 | Katz |
| 6,021,190 | A | 2/2000 | Fuller et al. | 6,151,387 | A | 11/2000 | Katz |
| 6,021,202 | A | 2/2000 | Anderson et al. | 6,154,528 | A | 11/2000 | Bennett et al. |
| 6,021,399 | A | 2/2000 | Demers | 6,154,535 | A | 11/2000 | Velamuri et al. |
| 6,021,428 | A | 2/2000 | Miloslavsky | RE37,001 | E | 12/2000 | Morganstein et al. |
| 6,026,149 | A | 2/2000 | Fuller et al. | 6,157,655 | A | 12/2000 | Shtivelman |
| 6,026,156 | A | 2/2000 | Epler et al. | 6,157,711 | A | 12/2000 | Katz |
| 6,026,379 | A | 2/2000 | Haller et al. | 6,170,011 | B1 | 1/2001 | Beck et al. |
| 6,029,150 | A | 2/2000 | Kravitz | 6,170,742 | B1 | 1/2001 | Yacoob |
| 6,029,151 | A | 2/2000 | Nikander | 6,173,052 | B1 | 1/2001 | Brady |
| 6,029,161 | A | 2/2000 | Lang et al. | 6,173,053 | B1 * | 1/2001 | Bogart et al. .......... 379/266.01 |
| 6,031,899 | A | 2/2000 | Wu | 6,175,563 | B1 | 1/2001 | Miloslavsky |
| 6,035,021 | A | 3/2000 | Katz | 6,175,564 | B1 | 1/2001 | Miloslavsky et al. |
| 6,035,402 | A | 3/2000 | Vaeth et al. | 6,177,932 | B1 | 1/2001 | Galdes et al. |
| 6,041,116 | A | 3/2000 | Meyers | 6,178,240 | B1 | 1/2001 | Walker et al. |
| 6,041,118 | A | 3/2000 | Michel et al. | 6,185,283 | B1 | 2/2001 | Fuller et al. |
| 6,044,135 | A | 3/2000 | Katz | 6,185,292 | B1 | 2/2001 | Miloslavsky |
| 6,044,146 | A | 3/2000 | Gisby et al. | 6,185,683 | B1 | 2/2001 | Ginter et al. |
| 6,044,149 | A | 3/2000 | Shaham et al. | 6,192,121 | B1 | 2/2001 | Atkinson et al. |
| 6,044,355 | A | 3/2000 | Crockett et al. | 6,192,413 | B1 | 2/2001 | Lee et al. |

| | | |
|---|---|---|
| 6,201,950 B1 | 3/2001 | Fuller et al. |
| 6,205,207 B1 | 3/2001 | Scherer |
| 6,208,970 B1 | 3/2001 | Ramanan |
| 6,212,178 B1 | 4/2001 | Beck et al. |
| 6,223,165 B1 | 4/2001 | Lauffer |
| 6,226,287 B1 | 5/2001 | Brady |
| 6,226,289 B1 | 5/2001 | Williams et al. |
| 6,226,360 B1 | 5/2001 | Goldberg et al. |
| 6,229,888 B1 | 5/2001 | Miloslavsky |
| 6,230,197 B1 | 5/2001 | Beck et al. |
| 6,233,332 B1 | 5/2001 | Anderson et al. |
| 6,236,978 B1 | 5/2001 | Tuzhilin |
| 6,236,980 B1 | 5/2001 | Reese |
| 6,243,684 B1 | 6/2001 | Stuart et al. |
| 6,253,193 B1 | 6/2001 | Ginter et al. |
| 6,256,648 B1 | 7/2001 | Hill et al. |
| 6,266,649 B1 | 7/2001 | Linden et al. |
| 6,308,175 B1 | 10/2001 | Lang et al. |
| 6,314,420 B1 | 11/2001 | Lang et al. |
| 6,317,718 B1 | 11/2001 | Fano |
| 6,317,722 B1 | 11/2001 | Jacobi et al. |
| 6,321,179 B1 | 11/2001 | Glance et al. |
| 6,321,221 B1 | 11/2001 | Bieganski |
| 6,327,590 B1 | 12/2001 | Chidlovskii et al. |
| 6,333,979 B1 | 12/2001 | Bondi et al. |
| 6,333,980 B1 | 12/2001 | Hollatz et al. |
| 6,334,127 B1 | 12/2001 | Bieganski et al. |
| 6,334,131 B1 | 12/2001 | Chakrabarti et al. |
| 6,345,264 B1 | 2/2002 | Breese et al. |
| 6,347,139 B1 | 2/2002 | Fisher et al. |
| 6,353,813 B1 | 3/2002 | Breese et al. |
| 6,356,899 B1 | 3/2002 | Chakrabarti et al. |
| 6,389,372 B1 | 5/2002 | Glance et al. |
| 6,400,996 B1 | 6/2002 | Hoffberg et al. |
| 6,405,922 B1 | 6/2002 | Kroll |
| 6,412,012 B1 | 6/2002 | Bieganski et al. |
| 6,418,424 B1 | 7/2002 | Hoffberg et al. |
| 6,421,709 B1 | 7/2002 | McCormick et al. |
| 6,430,558 B1 | 8/2002 | Delano |
| 6,446,035 B1 | 9/2002 | Grefenstette et al. |
| 6,449,367 B1 | 9/2002 | VanWie et al. |
| 6,453,038 B1 | 9/2002 | McFarlane et al. |
| 6,459,784 B1 | 10/2002 | Humphrey et al. |
| 6,463,299 B1 | 10/2002 | Macor |
| 6,466,654 B1 | 10/2002 | Cooper et al. |
| 6,466,909 B1 | 10/2002 | Didcock |
| 6,466,970 B1 | 10/2002 | Lee et al. |
| 6,470,077 B1 | 10/2002 | Chan |
| 6,477,245 B1 | 11/2002 | Chevet et al. |
| 6,477,246 B1 | 11/2002 | Dolan et al. |
| 6,477,494 B1 | 11/2002 | Hyde-Thomson et al. |
| 6,480,844 B1 | 11/2002 | Cortes et al. |
| 6,484,123 B1 | 11/2002 | Srivastava |
| 6,487,289 B1 * | 11/2002 | Phan et al. ............... 379/243 |
| 6,487,533 B1 | 11/2002 | Hyde-Thomson et al. |
| 6,493,432 B1 | 12/2002 | Blum et al. |
| 6,493,696 B1 | 12/2002 | Chazin |
| 6,496,568 B1 | 12/2002 | Nelson |
| 6,510,221 B1 | 1/2003 | Fisher et al. |
| 6,519,259 B1 | 2/2003 | Baker et al. |
| 6,519,459 B1 | 2/2003 | Chavez et al. |
| 6,522,726 B1 | 2/2003 | Hunt et al. |
| 6,529,870 B1 | 3/2003 | Mikkilineni |
| 6,529,891 B1 | 3/2003 | Heckerman |
| 2001/0000458 A1 | 4/2001 | Shtivelman et al. |
| 2001/0024497 A1 | 9/2001 | Campbell et al. |
| 2002/0006191 A1 | 1/2002 | Weiss |
| 2002/0009190 A1 | 1/2002 | McIllwaine et al. |
| 2002/0019846 A1 | 2/2002 | Miloslavsky et al. |
| 2002/0021693 A1 | 2/2002 | Bruno et al. |
| 2003/0002646 A1 | 1/2003 | Gutta et al. |

* cited by examiner

TELEPHONY CONTROL SYSTEM WITH INTELLIGENT CALL ROUTING

RELATED APPLICATIONS

The present application claims benefit of priority from U.S. Provisional Patent Application No. 60/363,027, filed Mar. 7, 2002, the entirety of which is expressly incorporated herein by reference.

TECHNICAL FIELD

The present invention relates generally to computer integrated telecommunications systems and more particularly to a system and method employing an intelligent switching architecture.

BACKGROUND OF THE INVENTION

The description of the invention herein is intended to provide information for one skilled in the art to understand and practice the full scope of the invention, but is not intended to be limiting as to the scope of available knowledge, nor admit that any particular reference, nor the combinations and analysis of this information as presented herein, is itself a part of the prior art. It is, in fact, a part of the present invention to aggregate the below cited information as a part of the disclosure, without limiting the scope thereof. All of the below-identified references are therefore expressly incorporated herein by reference, as if the entirety thereof was recited completely herein. It is particularly noted that the present invention is not limited by a narrow or precise discussion herein, nor is it intended that any disclaimer, limitation, or mandatory language as applied to any embodiment or embodiments be considered to limit the scope of the invention as a whole. The scope of the invention is therefore to be construed as the entire literal scope of the claims, as well as any equivalents thereof as provided by law. It is also understood that the title, abstract, field of the invention, and dependent claims are not intended to, and do not, limit the scope of the independent claims.

Real-time communications are typically handled by dedicated systems which assure that the management and control operations are handled in a manner to keep up with the communications process, and to avoid imposing inordinate delays. In order to provide cost-effective performance, complex processes incidental to the management or control of the communication are typically externalized. Thus, the communications process is generally unburdened from tasks requiring a high degree of intelligence, for example the evaluation of complex algorithms and real time optimizations. One possible exception is least cost routing (LCR), which seeks to employ a communications channel which is anticipated to have a lowest cost per unit. In fact, LCR schemes, when implemented in conjunction with a communications switch, either employ simple predetermined rules, or externalize the analysis.

Modern computer telephone integrated systems typically employ a general purpose computer with dedicated voice-communication hardware peripherals, for example boards made by Dialogic, Inc. (Intel Corp.). The voice communication peripherals execute the low level processing and switching of the voice channels, under control from the general purpose processor. Therefore, the voice-information is generally not communicated on the computer bus.

This architecture typically allows the computing platform to run a modern, non-deterministic operating system, such as Windows 2000, without impairing the real-time performance of the system as a whole, since the communications control functions are not as time critical as the voice processing functions. However, as is well known, non-deterministic operating systems, such as Windows 2000, are subject to significant latencies, especially when multiple tasks are executing, and when contention exists between resources, especially hard disk access and virtual memory. Therefore, in order to assure that system operation is unimpeded by inconsistent demands on the platform, typically the host computer system for the telephony peripherals is "dedicated", and attempts are made to eliminate extraneous software tasks. On the other hand, externalizing essential functions imposes potential latencies due to communications and external processing.

The Call Center

A "call center" is an organization of people, telecommunications equipment and management software, with a mission of efficiently handling electronic customer contact. A typical call center must balance competing goals. Customers should experience high quality and consistent service as measured, for example, by how long the customer's call must wait in queue before being answered and receiving satisfactory service. At the same time, this service should be provided to make efficient use of call center resources.

Strategies for Call Center Management

"Workforce management" systems provide important tools for meeting the goals of the call center. These systems generate forecasts of call volumes and call handling times based on historical data, to predict how much staff will be needed at different times of the day and week. The systems then create schedules that match the staffing to anticipated needs.

Typically, an Automatic Call Distribution (ACD) function is provided in conjunction with a computerized Private Branch Exchange (PBX). This ACD function enables a group of agents, termed ACD agents, to handle a high volume of inbound calls and simultaneously allows a queued caller to listen to recordings when waiting for an available ACD agent. The ACD function typically informs inbound callers of their status while they wait and the ACD function routes callers to an appropriate ACD agent on a first-come-first-served basis.

Today, all full-featured PBXs provide the ACD function and there are even vendors who provide switches specifically designed to support the ACD function. The ACD function has been expanded to provide statistical reporting tools, in addition to the call queuing and call routing functions mentioned above, which statistical reporting tools are used to manage the call center. For example, ACD historical reports enable a manager to identify times: (a) when inbound callers abandon calls after long waits in a queue because, for example, the call center is staffed by too few ACD agents and (b) when many ACD agents are idle. In addition, ACD forecasting reports, based on the historical reports, allow the manager to determine appropriate staffing levels for specific weeks and months in the future.

Queue Management

ACD systems experience high traffic periods and low traffic periods. Consequently, ACD systems must be capable of automating two major decisions. The first major decision may be referred to as the "agent selection decision," i.e., when more than one agent is available to handle the next transaction, which agent should be chosen? The second major decision may be referred to as the "transaction selection decision," i.e., when more than one transaction is waiting for the next available agent and an agent becomes available, which transaction should the agent handle?

One approach to the agent selection decision is to set up a sequencing scheme, so that the switch of the ACD system follows the same sequence of agents until the first available agent in the sequence is found. The concern with this approach is that it creates "hot seats," i.e. an inequitable distribution of inbound calls to ACD agents who are high in the sequence. Most current ACD systems solve the agent selection decision by using a longest-idle-eligible-agent approach to provide a more equitable distribution of transactions.

There are also different approaches to the transaction selection decision in which there are more available transactions than there are ACD agents. One approach is to create one or more first-in, first-out (FIFO) queues. Under this approach, each transaction may be marked with a priority level by the switch of the ACD system. When an agent becomes available, the transaction with the highest priority is routed to the agent. If several calls of equal priority are waiting in a queue, the call which has been waiting the longest is routed to the available agent. If the call center conducts outbound transactions, each transaction is similarly submitted to a FIFO queue with a priority designation, with the switch routing transactions from the queue to the agents.

Queue/Team Management

Calls that arrive at a call center generally are classified into "call types" based on the dialed number and possibly other information such as calling number or caller responses to prompts from the network. The call center is typically served by an automatic call distributor (ACD), which identifies the call type of each incoming call and either delivers or queues it. Each call type may have a separate first-in-first-out queue in the ACD. In most existing call centers, the agents answering calls are organized into one or more "teams," with each team having primary responsibility of the calls in one or more queues. This paradigm is sometimes referred to as "queue/team."

In the queue/team model, scheduling for each team can be done independently. Suppose, for example, that the call center handles calls for sales, service, and billing, and that each of these call types is served by a separate team. The schedule for sales agents will depend on the forecast for sales call volume and on various constraints and preferences applicable to the agents being scheduled, but this schedule is not affected by the call volume forecast for service or billing. Further, within the sales team, agents are typically considered interchangeable from a call handling viewpoint. Thus, within a team, schedule start times, break times and the like, may be traded freely among agents in the team to satisfy agent preferences without affecting scheduled call coverage. See, U.S. Pat. No. 5,325,292, expressly incorporated herein by reference.

In a queue/team environment, when a new call arrived, the ACD determines the call type and places it in the queue, if all agents are busy, or allocates this call to the team member who had been available the longest.

Skill-Based Routing

Skill-based routing of agents is a well known principle, in which the agent with the best match of skills to the problem presented is selected for handling the matter. Typically, these matters involve handling of telephone calls in a call center, and the technology may be applied to both inbound and outbound calling, or a combination of each. The skill-based routing algorithms may also be used to anticipate call center needs, and therefore be used to optimally schedule agents for greatest efficiency, lowest cost, or other optimized variable.

In the case of multi-skill criteria, the optimality of selection may be based on a global minimization of the cost function or the like.

The longest-idle-agent approach and the FIFO approach function well in applications having little variation in the types of transactions being handled by the ACD agents. If all agents can handle any transaction, these approaches provide a sufficiently high level of transactional throughput, i.e., the number of transactions handled by the call center in a particular time interval. However, in many call center environments, the agents are not equally adept at performing all types of transactions. For example, some transactions of a particular call center may require knowledge of a language other than the native language of the country in which the call center is located. As another example, some transactions may require the expertise of "specialists" having training in the specific field to which the transaction relates, since training all agents to be knowledgeable in all areas would be cost-prohibitive. For ACD applications in which agents are not equally adept at performing all transactions, there are a number of problems which at least potentially reduce transactional throughput of the call center. Three such problems may be referred to as the "under-skilled agent" problem, the "over-skilled agent" problem, and the "static grouping" problem.

The under-skilled agent problem reduces transactional throughput when the switch routes transactions to ACD agents who do not have sufficient skills to handle the transactions. For example, a call may be routed to an English-only speaking person, even though the caller only speaks Spanish. In another example, the transaction may relate to product support of a particular item for which the agent is not trained. When this occurs, the agent will typically apologize to the customer and transfer the call to another agent who is capable of helping the customer. Consequently, neither the agent's nor the customer's time is efficiently utilized.

Inefficient utilization is also a concern related to the over-skilled agent problem. A call center may have fixed groupings of agents, with each group having highly trained individuals and less-experienced individuals. Call-management may also designate certain agents as "specialists," since it would be cost prohibitive to train all agents to be experts in all transactions. Ideally, the highly skilled agents handle only those transactions that require a greater-than-average skill level. However, if a significant time passes without transactions that require highly skilled agents, the agents may be assigned to calls for which they are overqualified. This places the system in a position in which there is no qualified agent for an incoming call requiring a particular expertise because the agents having the expertise are handling calls that do not require such expertise. Again, the transactional throughput of the call center is reduced.

Current ACD systems allow agents to be grouped according to training. For example, a product support call center may be divided into four fixed, i.e., "static," groups, with each group being trained in a different category of products sold by the company. There are a number of potentially negative effects of static grouping. Firstly, the call center management must devise some configuration of agents into groups. This may be a costly process requiring extensive analysis and data entry. Secondly, the configuration that is devised is not likely to be optimal in all situations. The pace and mix of transactions will change during a typical day. At different times, the adverse effects of the under-skilled agent problem and the adverse effects of the over-skilled agent problem will vary with respect to the transactional throughput of the call center. Thirdly, when a new product is released, the devised configuration likely will be less valuable. In response to changes in the size, pace and mix of the transaction load over the course of time, call management must monitor and adjust the performance of the current grouping configuration on an ongoing basis. When trends are detected, the grouping configuration should be changed. This requires the time and attention of call center managers and supervisors. Again, the transactional throughput is reduced.

It is thus known in the prior art to provide ACD systems that depart from the queue/team model described above. Calls are still categorized into call types. In place of queues for the call types, however, queues associated with "skills" are provided. The ACD's call distribution logic for the call type determines which queue or queues a call will occupy at various times before it is answered. Agents are not organized into teams with exclusive responsibility for specific queues. Instead, each agent has one or more identified "skills" corresponding to the skills-based queues. Thus, both a given call and a given agent may be connected to multiple queues at the same time. Agent skills designations may be further qualified, for example, as "primary" or "secondary" skills, or with some other designation of skill priority or degree of skill attainment. The ACD call distribution logic may take the skill priority levels into account in its call distribution logic.

In a skills-based routing environment, the "matching" of calls to agents by the ACD becomes more sophisticated and thus complicated. Agents who have more than one skill no longer "belong" to a well-defined team that handles a restricted set of calls. Instead, the skills definitions form "implicit" teams that overlap in complex ways. If, for example, a call center has 10 skills defined, then agents could in principle have any of 1024 possible combinations ($2^{10}$) of those skills. Each skill combination could be eligible to handle a different subset of the incoming calls, and the eligible subset might vary with time of day, number of calls in queue, or other factors used by the ACD in its call routing decisions.

Today, call center managers want to connect a call to an ACD agent having exactly the right skills to serve the caller. However, "skills based" ACD agent groups are often small and, as a result, whenever an inbound call arrives, all such "skills based" ACD agents may be busy. In such instances, the ACD function can take call back instructions from the caller and the ACD function can manage the call back functions, for example, by assigning such calls, in accordance with the caller instructions, to a "skills based" ACD agent whenever one becomes available.

Scheduling of agents in a skills-based environment is thus a much more difficult problem than it is in a queue/team environment. In a skills-based environment, call types cannot be considered in isolation. Thus, for example, a heavy volume of Services calls might place higher demands on multi-skilled agents, causing an unforeseen shortage of coverage for Billing calls. Further, agents with different skills cannot be considered interchangeable for call handling. Thus, trading lunch times between a Sales-only agent and a multi-skill agent might lead to over-staffing Sales at noon while under-staffing Service at 1:00 p.m. This would lead to undesirable results. Moreover, with respect to the needs of a particular call type, a multi-skilled agent might provide no help over a given span of time, might be 100% available for calls of that type, or might be available part of the time and handling other call types for another part of time.

All agents having a particular combination of skills may be deemed a "skill group." A central problem of skills-based scheduling is then finding a way to predict what fraction of scheduled agents from each skill group will be available to each call type during each time interval being scheduled. If these fractions are known, then the effect of different agent schedules can be generated. Unfortunately, it is difficult or impossible to calculate the skill group availability fractions directly. These functions depend on the relative and absolute call volumes in each call type, on the particulars of the skills-based call distribution algorithms in the ACD, and on the skills profiles of the total scheduled agent population. Particularly as ACD skills-based routing algorithms themselves evolve and become more sophisticated, the factors affecting skill group availability become too complex for direct analysis. One proposed solution provides a feedback mechanism involving call handling simulation and incremental scheduling, to schedule agents in a skills-based routing environment. See, U.S. Pat. No. 6,044,355, expressly incorporated herein in its entirety.

In accordance with this "skills-based scheduling" method, a computer implemented tool is used to determine an optimum schedule for a plurality of scheduled agents in a telephone call center, each of the plurality of scheduled agents having a combination of defined skills. The plurality of scheduled agents are organized into "skill groups" with each group including all scheduled agents having a particular combination of skills. The method begins by generating a plurality of net staffing arrays, each net staff array associated with a given call type and defining, for each time interval to be scheduled, an estimate of a difference between a given staffing level and a staffing level needed to meet a current call handling requirement. In addition to the net staffing arrays, the method uses a plurality of skills group availability arrays, each skills group availability array associated with the given call type and defining, for each combination of skill group and time interval to be scheduled, an estimate of a percentage of scheduled agents from each skill group that are available to handle a call. According to the method, the plurality of arrays are used to generate a proposed schedule for each of the plurality of scheduled agents. Thereafter, a call handling simulation is then run against the proposed schedule using a plurality of ACD call distribution algorithms (one for each call type being scheduled). Based on the results of the call handling simulation, the net staffing arrays and the skills availability arrays are refined to more accurately define the net staffing and skills usage requirements. The process of generating a schedule and then testing that schedule through the simulator is then repeated until a given event occurs. The given event may be a determination that the schedule meets some given acceptance criteria, a passage of a predetermined period of time, a predetermined number of iterations of the process, or some combination thereof. A proposed schedule is "optimized" when it provides an acceptable call handling performance level and an acceptable staffing level in the simulation. Once the proposed schedule is "optimized," it may be further adjusted (within a particular skill group) to accommodate agent preferences.

U.S. Pat. No. 5,206,903 to Kohler et al. describes ACD equipment which uses static grouping. Each static group of agents is referred to as a "split," and each split is associated with a different queue. The agents are assigned to splits according to skills. Within a single split, the agents may be limited to knowledge of different subtypes of transactions. Preferably, there is at least one agent in each split who is trained to handle calls of any of the subtypes within the particular split. This "expert" may also be trained to efficiently handle calls of other types, i.e., other splits. Each agent possesses up to four skill numbers that represent various abilities of the agent with respect to handling transactions related to subtypes and types of transactions. The ACD equipment assigns each incoming call three prioritized skill numbers that estimate skill requirements of the incoming call. The skill numbers of the incoming call are considered "prioritized," since they are viewed sequentially in searching for a match of the call with an agent, so that the second skill number of the call is unnecessary if a match is found using the first prioritized skill number. The incoming call is assigned the one, two or three prioritized skill numbers and is placed in the appropriate queue of the appropriate static group of agents. A search is made among the available agents for an agent-skill number that matches the first skill number of the call. If no match is found after a predetermined time delay, the second prioritized skill number of the call is used to find a match. If no match is found after a second predetermined time delay, the third prioritized skill number is considered. Then, if no match is still found, the ACD equipment of Kohler et al. expands the search of available agents to other groups of agents.

While the Kohler et al. patent does not directly address the problems associated with static groups, it does consider the skills of the individual agents. The prioritized skill numbers assigned to the incoming calls are logically ordered. The patent refers to the first skill number of a call as the primary call-skill indicator. This primary indicator is used to define the minimal skill level that is required for an agent to competently handle the call. Consequently, if a match is made with the primary indicator, the ACD agent may not be over-skilled or under-skilled. However, if the search is unsuccessful, the secondary call-skill indicator is utilized. The search for a match to the secondary indicator may cause the call to be routed to an agent having more than the minimal required skill. The third prioritized skill number that is assigned to the incoming call is referred to as the "tertiary" call-skill indicator. The tertiary indicator is yet another skill level beyond what is minimally required to competently handle a call. Since the tertiary indicator is utilized only if a match is not found for either of the primary or secondary indicators, an overly skilled agent of the appropriate group will handle the call only if that agent is the only available capable agent. Thus, more highly skilled agents are assigned only when their skills are required, or no lesser-skilled agent is available to handle the call.

See, 6,529,870 Identifying voice mail messages under speaker identification 6,522,726 Speech-responsive voice messaging system and method 6,519,459 Use of immediate handover to achieve multi-head zones 6,519,259 Methods and apparatus for improved transmission of voice information in packet-based communication systems 6,510,221 System for automatically routing calls to call center agents in an agent surplus condition based on delay probabilities 5,496,568 Method and apparatus for providing automated notification to a customer of a real-time notification system 6,493,696 Message forwarding of multiple types of messages based upon a criteria 6,493,432 System for ensuring calling party privacy in a call screening system 6,487,533 Unified messaging system with automatic language identification for text-to-speech conversion 5,477,494 Unified messaging system with voice messaging and text messaging using text-to-speech conversion 6,477,245 Method for the management of a telephone automatic branch exchange, external management device and corresponding automatic branch exchange 6,470,077 Apparatus and method for storage and accelerated playback of voice samples in a call center 6,466,909 Shared text-to-speech resource 6,466,654 Personal virtual assistant with semantic tagging 6,463,299 Method and apparatus providing an integral computer and telephone system 6,459,784 Method for the definition of a call forward operation within a telecommunications system 6,453,038 System for integrating agent database access skills in call center agent assignment applications 2003/0002646 Intelligent Phone Router Group Routing Various types of conventional automatic distributors (ACDs) are available to distribute incoming calls to a group. Reservation and information services may be provided by large companies, such as major airlines, and may consist of geographically separated groups of agents that answer incoming calls distributed to the agents by separate ACDs. Agent communication terminals (ACTs) which are connected to an ACD are utilized by the agents to process incoming calls routed to a particular ACT by the ACD.

A public branch exchange (PBX) type ACD such as a Definity® ACD available from AT&T functions as a conventional PBX and further functions as an ACD to distribute incoming calls to local agents connected to the PBX. Another type of ACD consists of the utilization of an electronic telecommunication switch such as a 5ESS® switch available from AT&T which is capable of providing ACD service when supposed by ACTs coupled to the switch. Both types of ACD typically function as independent systems which handle incoming calls and make internal decisions concerning which agent will receive a given call. Both types of ACD systems are capable of generating statistical reports which can be monitored by a workstation coupled to the ACD system to allow a supervisor to monitor call handling statistics. Such data typically represents an average of statistics for a given system.

Telephone call centers that handle calls to toll-free "800" numbers are well-known in the art. Typically, a company may have many call centers, all answering calls made to the same set of 800 numbers. Each of the company's call centers usually has an automatic call distributor (ACD) or similar equipment capable of queuing calls. ACD management information systems keep statistics on agent and call status, and can report these statistics on frequent intervals. Such capabilities are in use today for centralized reporting and display of multi-location call center status.

In such systems, the company will want to distribute the calls to its call centers in a way that will optimally meet its business goals. Those goals might include low cost of call handling, answering most calls within a given amount of time, providing customized handling for certain calls, and many others. It is also known in the prior art that certain call routing criteria and techniques support a broad range of business goals. These include "load balancing," "caller segmentation" and "geographic routing." Load balancing refers to distribution of calls so that the expected answer delay for new calls is similar across all the call centers. If other considerations do not dictate otherwise, load balancing is desirable because it provides optimum efficiency in the use of agents and facilities, and it provides the most consistent grade of service to callers. In special situations it might be desirable to unbalance the load in a particular way, but control over the distribution of call load is still desired.

If the caller's identity can be inferred from the calling number, caller-entered digits, or other information, that identity may influence the choice of destination for the call. Call routing based on such information is referred to as caller segmentation. Also, it has been found desirable for particular call centers to handle calls from particular geographic areas. The motivation may be to minimize call transport costs, to support pre-defined call center "territories", or to take advantage of agents specifically trained to handle calls from given locations. Such techniques are known as geographic routing.

The interexchange carriers who provide 800 service today generally support some form of "routing plan" to help achieve load balancing, caller segmentation and geographic routing. Typically these routing plans allow 800 call routing based on time of day, day of week, the caller's area code, caller-entered digits, and fixed percentage allocations. Predominately, however, the routing plans supported by the carriers are static in the sense that they do not automatically react to unexpected variations in incoming call volume or distribution, nor to actual call delays being experienced at each destination. Reaction to changing conditions is done via manual modification of the plan, on a time scale of minutes or hours.

Recent service offerings from some interexchange carriers offer some degree of automatic reaction to changing conditions. One such offering, called "alternate termination sequence" or "ATS" (from AT&T), allows customers to establish maximum numbers of calls to be queued for each destination, with a pre-defined alternative when a primary destination is overloaded. Another offering, referred to as "intelligent routing control" or "IRC" (from MCI), allows an ACD to refuse a call from the network, again resulting in pre-defined alternative call handling. A third kind of service, AT&T's Intelligent Call Processing, lets the interexchange network pass call-by-call data to a computer.

In a conventional ACD, phone calls are processed on a first-in, first-out basis: the longest call waiting is answered by the next available agent. Answering calls across multiple automated call distributors (ACD) is typically done on a first-in, first-out basis dependent upon time of receipt of the call by each ACD, whether the call is directly connected or forwarded.

Another call distribution scheme is provided in Gechter et al., U.S. Pat. No. 5,036,535. This patent discloses a system for automatically distributing telephone calls placed over a network to one of a plurality of agent stations connected to the network via service interfaces, and providing status messages to the network. Gechter et al.'s disclosed system includes means for receiving the agent status messages and call arrival messages from the network, which means are connected via a network service interface to the network. Routing means responsive to the receiving means is provided for generating a routing signal provided to the network to connect the incoming call to an agent station through the network. In the system disclosed in Gechter et al, when an incoming call is made to the call router, it decides which agent station should receive the call, establishes a call with that agent station, and then transfers the original call onto the second call to connect the incoming caller directly to the agent station and then drops out of the connection.

U.S. Pat. No. 5,193,110 issued to Jones et al discloses an integrated services platform for a telephone communications system which platform includes a plurality of application processing ports for providing different types of information services to callers. In Jones et al's disclosed system, a master control unit and a high speed digital switch are used to control processing of incoming phone calls by recognizing the type of service requested by the caller and then routing the call to the appropriate processing port. The Jones et al system is disclosed as an adjunct to current switching technology in public and private networks.

Intelligent Call Management

Call centers are also used to make outbound calls, for example for telemarketing. Agents making outbound calls, referred to as outbound agents, are typically separate from ACD agents handling inbound calls and call center software separately manages outbound call lists for outbound agents to ensure that each outbound agent wastes little time in dialing or in performing overhead operations.

A call center typically has multiple agents for answering incoming calls and placing outgoing calls. A call center may also have agents participating in outgoing call campaigns, typically in conjunction with an outbound call management system. Each agent may be assigned to a particular group, such as an inbound group or an outbound group. Agents can also be assigned to a supervisor team, which represents multiple agents that report to the same supervisor.

In certain situations, it is necessary to restrict an agent's activity to answering calls or handling a particular type of call (e.g., answering only incoming calls). For example, during an outbound campaign, the system placing the outbound calls and controlling the rate at which the calls are placed, e.g., a so-called predictive dialer, relies on the availability of the agent to handle an answered call. If the system places outbound calls expecting the agent to be available, but the agent instead places their own call to another agent or a supervisor, or has an incoming call connected to them, the outbound system may not have an agent available to handle an answered outbound call. Additionally, if an agent is assigned to handle incoming calls, but instead places a call to another agent or listens to voice mail messages, the number of queued incoming calls may increase, thereby increasing the waiting time experience by the callers.

One document which provides considerable information on intelligent networks is "ITU-T Recommendation Q.1219, Intelligent Network User's Guide for Capability Set 1", dated April, 1994. This document is incorporated herein by reference.

One known system proposes a call-management method and system for distributing calls to a plurality of individuals, such as automatic call distribution (ACD) agents, which routes calls to the individuals based upon a correlation of attributes of the individuals with calls that are tagged with identification of abilities that are advantageous to efficiently processing the calls. That is, for each call that is to be distributed, one or more skills that are relevant to efficient handling of the call are determined and then used to route the call to an appropriate individual. In addition, call management preferences may also be accommodated.

Personalization and Collaborative Filtering

Known systems allow personalization or prediction of user type, preferences or desires based on historical data or limited information available. These known systems have been applied to a number of different domains.

In a non-collaborative personalization system, the available information about a person is analyzed, and based on this information, conclusions are drawn. In a collaborative system, the available information is used to associate the person with a group of other users having common attributes. By grouping users, the data sets are more dense, permitting more detailed inferences to be drawn. The groups are defined by mapping user attributes in a multidimensional space, and then defining clusters of users having correlated traits. Further, the use of data relating to past transactions of other users allows prediction of outcomes and sequences of actions, without having a true past example of the activity from that particular user.

The following references are expressly incorporated herein by reference:

6,418,424 Ergonomic man-machine interface incorporating adaptive pattern recognition based control system
6,400,996 Adaptive pattern recognition based control system and method
6,081,750 Ergonomic man-machine interface incorporating adaptive pattern recognition based control system
5,920,477 Human factored interface incorporating adaptive pattern recognition based controller apparatus
5,903,454 Human-factored interface corporating adaptive pattern recognition based controller apparatus
5,901,246 Ergonomic man-machine interface incorporating adaptive pattern recognition based control system
5,875,108 Ergonomic man-machine interface incorporating adaptive pattern recognition based control system
5,867,386 Morphological pattern recognition based controller system
5,774,357 Human factored interface incorporating adaptive pattern recognition based controller apparatus
6,529,891 Automatic determination of the number of clusters by mixtures of Bayesian networks
6,466,970 System and method for collecting and analyzing information about content requested in a network (World Wide Web) environment
6,449,367 Steganographic techniques for securely delivering electronic digital rights management control information over insecure communication channels
6,446,035 Finding groups of people based on linguistically analyzable content of resources accessed
6,430,558 Apparatus and methods for collaboratively searching knowledge databases
6,412,012 System, method, and article of manufacture for making a compatibility-aware recommendations to a user
6,389,372 System and method for bootstrapping a collaborative filtering system
6,356,899 Method for interactively creating an information database including preferred information elements, such as preferred-authority, world wide web pages
6,334,131 Method for cataloging, filtering, and relevance ranking frame-based hierarchical information structures
6,334,127 System, method and article of manufacture for making serendipity-weighted recommendations to a user
6,327,590 System and method for collaborative ranking of search results employing user and group profiles derived from document collection content analysis
6,321,221 System, method and article of manufacture for increasing the user value of recommendations
6,321,179 System and method for using noisy collaborative filtering to rank and present items
6,317,722 Use of electronic shopping carts to generate personal recommendations
6,317,718 System, method and article of manufacture for location-based filtering for shopping agent in the physical world
6,266,649 Collaborative recommendations using item-to-item similarity mappings
6,256,648 System and method for selecting and displaying a hyperlinked information resources
6,253,193 Systems and methods for the secure transaction management and electronic rights protection
6,236,980 Magazine, online, and broadcast summary recommendation reporting system to aid in decision making
6,236,978 System and method for dynamic profiling of users in one-to-one applications
6,185,683 Trusted and secure techniques, systems and methods for item delivery and execution
6,177,932 Method and apparatus for network based customer service
6,170,742 Method for using a smart card for recording operations, service and maintenance transactions and determining compliance of regulatory and other scheduled events
6,146,026 System and apparatus for selectively publishing electronic-mail
6,138,119 Techniques for defining, using and manipulating rights management data structures
6,112,186 Distributed system for facilitating exchange of user information and opinion using automated collaborative filtering
6,112,181 Systems and methods for matching, selecting, narrowcasting, and/or classifying based on rights management and/or other information
6,078,928 Site-specific interest profiling system
6,016,475 System, method, and article of manufacture for generating implicit ratings based on receiver operating curves
5,999,908 Customer-based product design module
5,560,011 Computer system for monitoring a user's utilization pattern to determine useful tasks
6,484,123 Method and system to identify which predictors are important for making a forecast with a collaborative filter
6,480,844 Method for inferring behavioral characteristics based on a large volume of data
6,477,246 Method and apparatus for providing expanded telecommunications service
6,421,709 E-mail filter and method thereof
6,405,922 Keyboard signature security system
6 6,353,813 Method and apparatus, using attribute set harmonization and default attribute values, for matching entities and predicting an attribute of an entity
6,345,264 Methods and apparatus, using expansion attributes having default, values, for matching entities and predicting an attribute of an entity
6,314,420 Collaborative/adaptive search engine
6,308,175 Integrated collaborative/content-based filter structure employing selectively shared, content-based profile data to evaluate information entities in a massive information network
6,144,964 Methods and apparatus for tuning a match between entities having attributes
6,029,161 Multi-level mindpool system especially adapted to provide collaborative filter data for a large scale information filtering system
6,018,738 Methods and apparatus for matching entities and for predicting an attribute of an entity based on an attribute frequency value 6,016,475 System, method, and article of manufacture for generating implicit ratings based on receiver operating curves 6,006,218 Methods and apparatus for retrieving and/or processing retrieved information as a function of a user's estimated knowledge 5,983,214 System and method employing individual user content-based data and user collaborative feedback data to evaluate the content of an information entity in a large information communication network 5,867,799 Information system and method for filtering a massive flow of information entities to meet user information classification needs 5,790,935 Virtual on-demand digital information delivery system and method B. M. Sarwar, G. Karypis, J. A. Konstan, and J. Riedl. Item-based collaborative filtering recommendation algorithms. In Proceedings of the 10*th International World Wide Web Conference (WWW*10), Hong Kong, May 2001.

Rashid, A. M., Albert, I., Cosley, D., Lam, S. K., McNee, S., Konstan, J. A., & Riedl, J. (2002). Getting to Know You: Learning New User Preferences in Recommender Systems. In Proceedings of the 2002 *International Conference on Intelligent User Interfaces,* San Francisco, Calif., pp. 127–134. [Word format]

O'Connor, M., Cosley, D., Konstan, J. A., & Riedl, J. (2001). PolyLens: A Recommender System for Groups of Users. In Proceedings of *ECSCW* 2001, Bonn, Germany, pp. 199–218. [Word format]

Schafer, J. B., Konstan, J., and Riedl, J., Electronic Commerce Recommender Applications. *Journal of Data Mining and Knowledge Discovery,* vol. 5 nos.1/2, pp. 115–152.

Herlocker, J., Konstan, J., and Riedl, J., Explaining Collaborative Filtering Recommendations. In proceedings of *ACM* 2000 *Conference on Computer Supported Cooperative Work,* Dec. 2–6, 2000, pp. 241–250.

Sarwar, B. M., Karypis, G., Konstan, J. A., and Riedl, J. "Analysis of Recommender Algorithms for E-Commerce". In proceedings of the *ACM E-Commerce* 2000 *Conference.* Oct. 17–20, 2000, pp. 158–167.

Sarwar, B. M., Konstan, J. A., and Riedl, J. "Distributed Recommender Systems: New Opportunities for Internet Commerce". In the book "*Internet Commerce and Software Agents: Cases, Technologies and Opportunities*" Rahman, S., and Bignall, R. eds.

Sarwar, B. M., Karypis, G., Konstan, J. A., and Riedl, J. "Application of Dimensionality Reduction in Recommender System—A Case Study". Full length paper at *ACM WebKDD* 2000 *Web Mining for E-Commerce Workshop.*

Schafer, J. B., Konstan, J., and Riedl, J., Recommender Systems in E-Commerce. *Proceedings of the ACM Conference on Electronic Commerce,* Nov. 3–5, 1999.

Good, N., Schafer, J. B., Konstan, J., Borchers, A., Sarwar, B., Herlocker, J., and Riedl, J., Combining Collaborative Filtering with Personal Agents for Better Recommendations, *Proceedings of the* 1999 *Conference of the American Association of Artifical Intelligence (AAA*1-99), pp 439–446.

Herlocker, J., Konstan, J., Borchers, A., Riedl, J. An Algorithmic Framework for Performing Collaborative Filtering. To appear in *Proceedings of the* 1999 *Conference on Research and Development in Information Retrieval.* August 1999.

Sarwar, B., Konstan, J., Borchers, A., Herlocker, J., Miller, B., and Riedl, J. Using Filtering Agents to Improve Prediction Quality in the GroupLens Research Collaborative Filtering Systems. *Proceedings of the* 1998 *Conference on Computer Supported Cooperative Work.* November 1998.

Konstan, J., Miller, B., Maltz, D., Herlocker, J., Gordon, L., and Riedl, J. GroupLens: Applying Collaborative Filtering to Usenet News. *Communications of the ACM* 40,3 (1997), 77–87.

Miller, B., Riedl, J., and Konstan, J. Experiences with GroupLens: Making Usenet useful again. *Proceedings of the* 1997 *Usenix Winter Technical Conference,* January 1997.

Resnick, P., Iacovou, N., Sushak, M., Bergstrom, P., an Riedl, J. GroupLens: An open architecture for collaborative filtering of netnews. *Proceedings of the* 1994 *Computer Supported Collaborative Work Conference.* (1994)

Combining Content-Based and Collaborative Filters.—Claypool . . . (1999) www.cs.umbe.edu/~ian/sigir99-rec/papers/claypool_m.ps.gz Distributing Information for Collaborative Filtering on Usenet Net . . . —Maltz (1994) www.cs.cmu.edu/afs/cs.cmu.edu/user/dmaltz/Doc/mit-thesis.ps.gz Integrating Knowledge-based and Collaborative-filtering . . . —Burke (1999) www.ics.uci.edu/~burke/research/papers/burke-aiec99.pdf Analysis of the Axiomatic Foundations of Collaborative Filtering—Pennock, Horvitz (1999) www.eecs.umich.edu/~dpennock/homepage/papers/imposs-CF.ps Social Choice Theory and Recommender Systems: Analysis of . . . —Pennock, Horvitz, Giles (2000) www.neci.nj.nec.com/homepages/dpennock/papers/CF-imposs-aaai-00.ps Developing Trust in Recommender Agents—Montaner, López, Rosa (2002) eia.udg.es/~mmontane/montaner-aamas02.pdf RecTree: An Efficient Collaborative Filtering Method—Sonny Han Seng www.cs.sfu.ca/~wangk/pub/dawakfin.pdf Content-Boosted Collaborative Filtering for Improved . . . —Melville, Mooney . . . (2002) www.cs.utexas.edu/users/ml/papers/cbcf-aaai-02.ps.gz Knowledge Pump: Community-centered Collaborative Filtering—Natalie Glance www.ereim.org/publication/ws-proceedings/DELOS5/arregui.ps.gz Empirical Analysis of Predictive Algorithms for . . . —Breese, Heckerman, Kadie (1998) www.cs.auc.dk/research/DSS/papers/ALM002a.ps GroupLens: An Open Architecture for Collaborative . . . —Resnick, Iacovou, . . . (1994) www.cs.kun.nl/is/research/filter/literature/GroupLens.ps Learning Collaborative Information Filters—Daniel Billsus Michael (1998) www.ics.uci.edu/~dbillsus/papers/icml98.pdf NewsWeeder: Learning to Filter Netnews—Lang (1995) www.fi.muni.ez/usr/popelinsky/newsweeder.ps.gz Combining Collaborative Filtering with Personal . . . Good, Schafer . . . (1999) www-users.cs.umn.edu/~herlocke/aaai-99.pdf Towards Adaptive Web Sites: Conceptual Framework and Case Study—Perkowitz, Etzioni (2000) www.cs.washington.edu/homes/map/research/papers/www8.ps Web Mining: Information and Pattern Discovery on the . . . —Cooley, Mobasher . . . (1997) (46 maya.cs.depaul.edu/~mobasher/papers/webminer-tai97.ps PHOAKS: A System for Sharing Recommendations—al. (1997) (38 www.pensivepuffin.net/%7Edavid/papers/Terveen.CACM97.pdf Latent Semantic Indexing: A Probabilistic Analysis—Papadimitriou, Raghavan . . . (1998) (27 lsa.colorado.edu/papers/lsi.math.prob_analysis.ps Automatic Personalization Based on Web Usage Mining—Mobasher, Cooley, Srivastava (1999) maya.cs.depaul.edu/~mobasher/personalization/personalization.ps Just Talk to Me: A Field Study of Expertise Location—Mcdonald, Ackermann (1998) www.ics.uei.edu/~dmedonal/papers/cscw98.final.pdf Application of Dimensionality Reduction in . . . Sarwar, Karypis . . . (2000) www-users.cs.umn.edu/~karypis/publications/Papers/PDF/webkdd.pdf Content-Based Book Recommending Using Learning for Text . . . Mooney, Roy (2000) ftp.cs.utexas.edu/pub/mooney/papers/libra-dl-00.ps.gz Document Categorization and Query Generation on . . . —Boley, Gini . . . (1999) www-users.cs.umn.edu/~gross/papers/aij.agent.ps The Emerging Role of Electronic Marketplaces on the Internet—Bakos (1998) www.ec.njit.edu/~bartel/B2Breports/EmergingRoleOfElectronicMarketplaces.pdf ReferralWeb: Combining Social Networks and Collaborative . . . —Kautz, Selman, Shah (1997) akpublic.research.att.com/~kautz/papers-ftp/refwebCACM.ps Content-Boosted Collaborative Filtering—Melville, Mooney, Nagarajan (2001) www.cs.utexas.edu/users/ml/papers/cbef-sigir-wkshp-01.ps.gz Intelligent Internet Systems—Levy, Weld (2000) www.cs.auc.dk/research/DSS/papers/levyweld00.pdf Using Data Mining Methods to Build Customer Profiles—Adomavicius, Tuzhilin (2001) www.eng.auburn.edu/users/wenchen/mining.pdf Tailoring the Interaction with Users in Web Stores—Ardissono, Goy (2001) www.di.unito.it/~liliana/EC/umuai-per-www.ps.gz Using Filtering Agents to Improve Prediction . . . —Sarwar, Konstan . . . (1998) www.cs.umn.edu/Research/GroupLens/filterbot-CSCW98.pdf Latent Semantic Indexing: A Probabilistic Analysis—Papadimitriou, Raghavan . . . (1997) (26 www.cs.berkeley.edu/~christos/ir.ps Horting Hatches an Egg: A New Graph-Theoretic Approach to . . . —Aggarwal, Wolf, Wu, Yu (1999) web.mit.edu/charu/www/kdd386.ps An Efficient Boosting Algorithm for Combining Preferences—Iyer, Jr. (1998) www.les.mit.edu/publications/pubs/pdf/MIT-LCS-TR-8111.pdf Implicit Rating and Filtering—Nichols (1998) www.ercim.org/publications/ws-proceedings/DELOS5/nichols.ps.gz Item-based Collaborative Filtering Recommendation . . . —Sarwar, Karypis, Konstan, . . . (2001)

www-users.itlabs.umn.edu/~karypis/publications/Papers/Postscript/www10_sarwar.ps Discovery of Aggregate Usage Profiles for Web . . . —Mobasher, Dai, Luo . . . (2000) maya.cs.depaul.edu/~mobasher/papers/webkdd2000.pdf Combining Content-Based and Collaborative Filters . . . —Claypool . . . (1999) www.cs.umbc.edu/~ian/sigir99-rec/papers/claypool_m.ps.gz Clustering Methods for Collaborative Filtering—Ungar, Foster (1998) www.cis.upenn.edu/datamining/Publications/clust.pdf A Framework Of Knowledge Management Systems: Issues And . . . —Jungpil Hahn Mani (2000) www.akindofmagic.com/~jhahn/./papers/hs_icis2000.pdf Identification of Web User Traffic Composition using Multi-Modal . . . —Heer, Chi (2000) www-users.es.umn.edu/~echi/papers/SIAM-data-mining-2001/SIAM-Data-Mining-MMC2.pdf Using User Models in Music Information Retrieval Systems—Wei Chai Barry (2000) www.media.mit.edu/~chaiwei/papers/usermodeling.pdf Finding Interesting Associations without Support Pruning—Edith Cohen Mayur www.stanford.edu/~datar/papers/icde00.ps A Design Process for Embedding Knowledge Management . . . —Hoffmann, Loser . . . (1999) iundg.informatik.uni-dortmund.de/Daten/pubs/HoffLosWalHerr_Group99.pdf Joining Collaborative and Content-based Filtering—Baudisch (1999) ipsi.fhg.de/~baudisch/publications/1999-Baudisch-RecSys99-JoiningCollaborativeAndContent-basedFiltering.pdf Intelligent Software Agents: Turning a Privacy Threat into a . . . —Borking, al. (1999) www.ipc.on.ca/english/pubpres/papers/isat.pdf High Performance Computing with the Array Package . . . —Moreira, Midkiff . . . (1999) www.sc99.org/proceedings/papers/moreiral.pdf To Each and Everyone an Agent: Augmenting Web-Based . . . —Eriksson, Finne, Janson (1998) www.sics.se/~sverker/public/papers/agentweb.pdf Collaborative filtering approach for software function . . . —Ohsugi, Monden, Morisaki (2002) se.aist-nara.ac.jp/~akito-m/home/research/paper/ohsugi_collaborativeFiltering_isese2002.pdf A Survey On Web Information Retrieval Technologies—Lan Huang Computer ranger.uta.edu/~alp/ix/readings/SurveyOfWebSearch-Engines.pdf On the Effects of Idiotypic Interactions for Recommendation—Communities In Artificial www.aber.ac.uk/icaris-2002/Proceedings/paper-16/paper16.pdf A Concept-Based Retrieval Tool:—The Cooperative Web di002.edv.uniovi.cs/~dani/publications/gayoicwi02.PDF Centers for IBM e-business Innovation—Adaptive Marketing Building www.systemicbusiness.org/pubs/2000_IBM_e-Business_Wittenstein_Adaptive_Marketing.pdf A Recommender System based on the Immune Network—Steve Cayzer And www-uk.hpl.hp.com/people/steve cayzer/Publications/020514Immune_Recommender.pdf Applying Natural Language Processing (NLP) Based—Metadata Extraction To ranger.uta.edu/~alp/ix/readings/p116-paik-metadata-extraction-from-communications.pdf
Augmenting the Knowledge Bandwidth and Connecting . . . —Novak, Wurst . . . (2002)
maus.gmd.de/~jas/papers/kmn02.pdf
A recommendation system for software function discover—Ohsugi, Monden, Matsumoto (2002)
se.aist-nara.ac.jp/~ukito-m/home/research/paper/ohsugi_apsec2002_recommendation.pdf
The Role of Semantic Relevance in Dynamic User Community . . . Papadopoulos . . . (2002)
www.mm.di.uoa.gr/~rouvas/ssi/caise2002/23480200.pdf
Personalisation—How Computer Can
mms.ecs.soton.ac.uk/papers/14.pdf
Evaluating Emergent Collaboration on the Web—Terveen, Hill (1998)
www.research.att.com/~terveen/cscw98.ps
The Decision-Theoretic Video Advisor—Nguyen, Haddawy (1998)
www.cs.uwm.edu/faculty/haddawy/pubs/hien-aaai98wkshp.ps.Z
The Order of Things: Activity-Centred Information Access—Chalmers, Rodden, Brodbeck (1998)
www.ubs.com/e/index/about/ubilab/print_versions/ps/cha98.ps.gz
Alleviating the Latency and Bandwidth Problems in WWW Browsing—Tong Sau (1997)
bbcr.uwaterloo.ca/~brecht/courses/756/readings/prefetching/alleviating-USITS97.ps
A Case-Based Reasoning View of Automated Collaborative . . . —Conor Hayes Pdraig (2001)
ftp.cs.tcd.ie/pub/tech-reports/reports.01/TCD-CS-2001-09.pdf
Beyond Algorithms: An HCI Perspective on Recommender Systems—Kirsten Swearingen Rashmi (2001)
www.sims.berkeley.edu/~sinha/papers/BeyondAlgorithms.pdf
Collaborative Learning for Recommender Systems—Lee (2001)
www.comp.nus.edu.sg/~leews/publications/icml01.ps
A Multi-Agent TV Recommender—Kaushal Kurapati Srinivas (2001)
www.cs.umbc.edu/~skaush1/um_2001.pdf
Web Dynamic—Levene, Poulovassilis (2001)
www.dcs.bbk.ac.uk/~mark/download/web_focus_final.pdf
Capturing knowledge of user preferences: ontologies in . . . —Middleton, De Roure . . . (2001)
www.ecs.soton.ac.uk/~sem99r/keap-paper.pdf
Data mining models as services on the internet—Sarawagi, Nagaralu (2000)
www.it.iitb.ernet.in/~sunita/papers/sigkdd.pdf
Effective Personalization Based on Association Rule . . . —Mobasher, Dai, Luo . . . (2001)
maya.cs.depaul.edu/~mobasher/papers/widm01.pdf
A Customer Purchase Incidence Model Applied to . . . —Geyer-Schulz, Hahsler . . . (2001)
wwwai.su-wien.ac.at/~hahsler/research/recomm_webKDD2001/paper/geyerschulz.pdf
On the Value of Private Information—Jon Kleinberg Cornell (2001)
http.cs.Berkeley.edu/~christos/tark.ps
Inferring User Interest—Claypool, Brown, Le, Waseda (2001)
ftp.cs.wpi.edu/pub/techreports/01-07.ps.pz
Probabilistic Models for Unified Collaborative and . . . —Popescul, Ungar . . . (2001)
www.cis.upenn.edu/~popescul/Publications/popescul01probabilistic.ps
Evaluation of Item-Based Top-N Recommendation Algorithms—Karypis (2000)
www-users.itlabs.umn.edu/~karypis/publications/Papers/Postscript/itemrs.ps
Expertise Recommender: A Flexible Recommendation System and . . . —McDonald, Ackerman (2000)
www.ics.uci.edu/~ackerman/pub/00b30/cscw00.er.pdf
A Regression-Based Approach For Scaling-Up Personalized . . . —Vucetic, Obradovic (2000)
robotics.stanford.edu/~ronnyk/WEBKDD2000/papers/vucetic.ps
Clustering the Users of Large Web Sites into Communities—Georgios Paliouras . . .
gdit.iiit.net/wdkm/2.pdf
Matching—van der Putten (2002)
www.liacs.nl/~putten/library/2002stt_65_part_3_2_6.pdf
Technical Solutions for Controlling Spam—Shane Hird Distributed
security.dstc.edu.au/papers/technical_spam.ps
Mining Web Logs for Personalized Site Maps—Toolan, Kushmerick (2002)
www.cs.ucd.ie/staff/nick/home/research/download/toolan-mews2002.pdf
Electronic Commerce Software Agents: How to Increase Their—Machine Iq Luis
fie.engrng.pitt.edu/iie2002/proceedings/ierc/papers/2080.pdf
SimRank: A Measure of Structural-Context Similarity—Jeh, Widom (2002)
www-cs-students.stanford.edu/~glenj/simrank.ps
Bayesian Mixed-Eeets Models for Recommender Systems—Michelle Keim Condli
www.stat.rutgers.edu/~madigan/PAPERS/collab.ps
Enhancing Web-Based Configuration With . . . —Coster . . .
ectrl.itc.it/rpec/RPEC-Papers/04-coster.pdf
Experiments on Query Expansion for Internet Yellow . . . —Ohura, Takahashi, . . . (2002)
www.tkl.iss.u-tokyo.ac.jp/Kilab/Research/Paper/2002/ohura/VLDB2002Ohura.pdf
Dynamic Modeling and Learning User Profile In Personalized News . . . —Widyantoro
students.es.tamu.edu/dhw7942/thesis.ps
Optimizing Return-Set Size for Requirements Satisfaction and . . . —Branting (2002)
www.karlbranting.net/papers/isec-2002.ps
Taxonomy of Large Margin Principle—Algorithms For Ordinal (2002)
leibniz.cs.huji.ac.il/tr/acc/2002/HUJI-CSE-LTR-2002-43_k-planes-long.ps
Collaborative Preference Elicitation in a Group—Travel Recommender System
ectrl.ite.it/rpec/RPEC-Papers/17-plua.pdf
Case-Based Reasoning to Improve Adaptability of Intelligent . . . —Funk, Conlan
www.mrtc.mdh.se/publications/0420.pdf
An on-Line Evaluation Framework for Recommender Systems—Hayes, Massa, Avesani . . . (2002)
ectrl.itc.it/rpec/RPEC-Papers/06-hayes.pdf
Under consideration for publication in Knowledge and . . . —Learning Feature Weights
www.karlbranting.net/papers/kais.ps
A Formal Model for User Preference—Jung, Hong (2002)
mobigen.com/~chopin/research/publish/ICDM2002/syjung_IEEE_ICDM2002_A_Formal_Mode 1_for_Preference.ps Building Recommender Systems using a Knowledge Base of Product . . . —Ghani, Fano
ectrl.ite.it/rpec/RPEC-Papers/05-ghani.pdf
Evaluation of Recommender Algorithms for an Internet . . . —Geyer-Schluz, Hahsler (2002)
wwwai.wu-wien.ac.at/~hahsler/research/recomm_webkdd2002/final/webkdd2002.pdf
How Is an Agent Like a Wolf?: Dominance and Submission in . . . —Bill Tomlinson Bruce
badger.www.media.mit.edu/people/badger/Publications/MAMA-175.pdf
Improving Learning Accuracy in Information Filtering—de Kroon, Mitchell, Kerekhoffs (1996)
www.ics.forth.gr/~moustaki/ICML96_HCI_ML/kroon.ps
Data Manipulation Services in the Haystack IR System—Asdoorian (1998)
grebe.lcs.mit.edu/papers/Asdoorian.thesis.ps.gz
Condensing Image Databases when Retrieval is based on . . . —David Jacobs (1998)
cs.nyu.edu/cs/faculty/weinshal/papers/nonmetric-ret.ps.gz
Report on the CONALD Workshop on Learning from Text . . . —Carbonell, Craven . . . (1998)
www.cs.cmu.edu/~yiming/papers.yy/conald98-report.ps
ConCall: An information service for researchers based . . . —Waern, Tierney . . . (1998)
ftp.sics.se/pub/SICS-reports/Reports/SICS-T--98-04--SE.ps.Z
Book Recommending Using Text Categorization with Extracted . . . —Mooney (1998)
ftp.cs.utexas.edu/pub/mooney/papers/libra-textcat98.ps.gz
SOAP: Live Recommendations through Social Agents—Guo (1997)
www.sztaki.hu/conferences/delosbudapest/papers/guo.ps
Agent Based Personalized Information Retrieval—Kramer (1997)
grebe.lcs.mit.edu/papers/kramer-thesis.ps.gz
Feature-Guided Automated Collaborative Filtering—Lashkari (1995)
ftp.media.mit.edu/pub/yezdi/proposal.ps
Let's stop pushing the envelope and start addressing . . . —Whittaker, Terveen . . . (2000)
www.research.att.com/~stevew/reference_task_hei2000.pdf
Integrating Web Usage and Content Mining for More . . . —Mobasher, Dai, Luo . . . (2000)
maya.cs.depaul.edu/~mobasher/papers/ecweb2000.ps
A Framework Of Knowledge Management Systems: Issues And . . . —Jungpil Hahn Mani (2000)
www.akindofmagic.com/~jhahn/./papers/hs_icis2000.pdf
Identification of Web User Traffic Composition using Multi-Modal . . . —Heer, Chi (2000)
www-users.cs.umn.edu/~echi/papers/SIAM-data-mining-2001/SIAM-Data-Mining-MMC2-.pdf
Using User Models in Music Information Retrieval Systems—Wei Chai Barry (2000)
www.media.mit.edu/~chaiwei/papers/usermodeling.pdf
Learning about Users from Observation—Schwab, Kobsa, Koychev (2000)
fit.gmd.de/~koychev/papers/AAAI00.ps
Case-Based User Profiling for Content Personalisation—Bradley, Rafter, Smyth (2000)
kermit.ucd.ie/casper/ah2000bradley.ps
Automated Collaborative Filtering Applications for Online . . . —Rafter, Bradley, Smyth (2000)
kermit.ucd.ie/casper/AH2000.ps
A Case-Based Reasoning Approach to Collaborative Filtering—Burke (2000)
www.ics.uci.edu/~burke/research/papers/burke-ewcbr00.pdf
Social Choice Theory and Recommender Systems: Analysis of . . . —Pennock, Horvitz, Giles (2000)
www.neci.nj.nec.com/homepages/dpennock/papers/CF-imposs-aaai-00.ps
Robustness Analyses of Instance-Based Collaborative Recommendation—Kushmerick (2002)
www.cs.ued.ie/staff/nick/home/research/download/kushmerick-ecml2002.pdf
Collaborative recommendation: A robustness analysis—O'Mahony, Hurley . . . (2002)
www.cs.ued.ie/staff/nick/home/research/download/omahony-acmtit2002.pdf
Impact and Potential of User Profiles Used for Distributed Query . . . —Schmitt
www.cg.cs.tu-bs.de/v3d2/pubs.collection/edbt02.pdf
Document Classification as an Internet service: Choosing the best . . . —Godbole (2001)
www.it.iitb.ac.in/~shantanu/work/mtpsg.pdf
Improving Collaborative Filtering with Multimedia Indexing . . . —Arnd Kohrs Bernard (1999)
www.eurecom.fr/~kohrs/publish/ACMMM99.ps.gz
Content-Boosted Collaborative Filtering for Improved . . . —Melville, Mooney . . . (2002)
www.cs.utexas.edu/users/ml/papers/cbef-aaai-02.ps.gz
Exploiting Synergy Between Ontologies and Recommender . . . —Middleton, Alani . . . (2002)
www.esc.soton.ac.uk/~sem99r/www-paper.ps
Clustering for Collaborative Filtering Applications—Kohrs, Merialdo (1999)
www.eurecom.fr/~kohrs/publish/CIMCA99.ps.gz
Dynamic Information Filtering—Baudisch (2001)
ipsi.fhg.de/~baudisch/publications/2001-Baudisch-Dissertation-DynamicInformationFiltering.pdf
Collaborative Filtering With Privacy—Canny (2002)
www.cs.berkeley.edu/~jfc/papers/02/IEEESP02.pdf
Using Color and Texture Indexing to improve Collaborative . . . —Arnd Kohrs And (1999)
www.eurecom.fr/~kohrs/publish/CBMI99.ps.gz
TV Scout: Lowering the entry barrier to personalized TV . . . —Baudisch, Brueckner (2002)
ipsi.thg.de/~baudisch/publications/2002-Baudisch-AH2002-TVScoutLoweringTheEntryBarrier.pdf
A Cooperating Hybrid Neural-CBR Classifiers for Building . . . —Malek, Kanawati (2001)
www.aic.nrl.navy.mil/papers/2001/AIC-01-003/ws5/ws5toc8.PDF
Using Category-Based Collaborative Filtering In The Active . . . —Arnd Kohrs And (2000)
www.eurecom.fr/~kohrs/publish/ICME2000.ps.gz
Enhancing Product Recommender Systems on Sparse Binary Data—Demiriz
www.rpi.edu/~demira/productrecommender.ps.gz
Query Expansion using Collaborative Filtering Algoritm—Brandberg (2001)
ftp.csd.uu.se/pub/papers/masters-theses/0207-brandberg.pdf
Adaptivity through Unobstrusive Learning—Ingo Schwab Alfred (2002)
www.ics.uci.edu/%7Ekobsa/papers/2002-KI-kobsa.pdf
Compositional Cbr Via Collaborative Filtering—Aguzzoli, Avesani, Massa (2001)
sra.itc.it/tr/AAM01.ps.gz
Application of ART2 Networks and Self-Organizing Maps to . . . —Guntram Graef And (2001)
wwwis.win.tue.nl/ah2001/papers/graef-schaefer-1.pdf A Theoretical Analysis of Query Selection for Collaborative . . . —Lee, Long
www.comp.nus.edu.sg/~leews/publications/colt01.pdf
Electronic Commerce: a technological perspective—Rocha, Oliveira (1999)
www.fe.up.pt/~eol/PUBLICATIONS/ec98.ps
A Brief Comparison of News Filtering Software—Fredrik Kilander (1995)
www.cs.kun.nl/is/research/filter/literature/Comparison.ps
SOaP: Social Agents Providing People with Useful Information—Voss, Kreifelts (1997)
www.gmd.de/fit/publications/ebk-publications/SOaP.pdf
Choices in the Implementation of Rating—Palme (1997)
www.ercim.org/publication/ws-proceedings/DELOS5/palme.pdf
The Virtual Participant: Lessons to be Learned from a Case-Based . . . —Masterton (1997)
kmi.open.ac.uk/techreports/papers/kmi-tr-47.ps.gz
Shared Web Annotations as a Platform for Third-Party . . . —Röscheisen . . . (1994)
www-diglib.stanford.edu/diglib/pub/reports/commentor.ps
Collaborative Browsing and Visualisation of the Search Process—Twidale, Nichols (1996)
ftp.comp.lanes.ac.uk/pub/reports/1996/CSEG.3.96.ps.Z
WebWatcher: Machine Learning and Hypertext—Thorsten Joachims (1995)
mobile.csie.ntu.edu.tw/~yjhsu/courses/ul760/papers/webwatcher.ps.gz
To Each and Everyone an Agent: Augmenting Web-Based . . . —Eriksson, Finne, Janson (1998)
www.sics.se/~sverker/public/papers/agentweb.pdf
A Survey of Applications of CSCW for Digital Libraries—Twidale, Nichols (1998)
ftp.comp.lanes.ac.uk/pub/reports/1998/CSEG.4.98.pdf
Campiello—New user interface approaches for community . . . —Antonietta Grasso Michael (1998)
wwwll.informatik.tu-muenchen.de/publications/pdf/Grasso1998a.pdf
Automatic learning of user profiles—towards the . . . —Soltysiak, Crabtree (1998)
www.labs.bt.com/projects/agents/publish/papers/bttj98-profiling.pdf
ParaSite: Mining the Structural Information on the World-Wide Web—Spertus (1998)
www.mills.edu/ACAD_INFO/MCS/SPERTUS/Thesis/thesis.pdf
Information Filtering—Palme (1998)
dsv.su.se/jpalme/select/information-filtering.pdf
Recommending TV Programs: How far can we get at zero user effort?—Baudisch (1998)
www-cui.darmstadt.gmd.de/~baudisch/Publications/baudisch1998bRecommendingTVProgramsAtZeroUserEffort.ps
References for: Machine learning on non-homogeneous, distributed . . . —Mladenic (1998)
www.cs.cmu.edu/afs/es/project/theo-4/text-learning/www/pww/papers/PhD/PhDBib.ps.gz
Class Representation and Image Retrieval with Non-Metric . . . —Jacobs, Weinshall . . . (1998)
www.neci.nj.nec.com/homepages/dwj/non-metric.ps
The Profile Editor: Designing a direct manipulative tool for . . . —Baudisch (1997)
www.ercim.org/publication/ws-proceedings/DELOS5/delos5.pdf
A Visual Tagging Technique for Annotating . . . —Chandrinos . . . (1997)
www.ics.forth.gr/~kostel/papers/delos5.ps.gz
Social Filtering and Social Reality—Lueg (1997)
ftp.ifi.unizh.ch/pub/institute/ailab/papers/lueg/delos97.ps.gz
SOaP: Social Filtering through Social Agents—Hui Guo (1997)
www.ereim.org/publication/ws-proceedings/DELOS5/guo.ps.gz
GRAS: An Adaptive Personalization Scheme for Hypermedia . . . —Kahabka, Korkea-aho . . . (1997)
www3.informatik.tu-muenchen.de/public/mitarbeiter/specht/lit/97-HIM-gras.ps
A Collaborative Filtering Agent System for Dynamic Virtual . . . —de Vel, Nesbitt
www.cs.jcu.edu.au/~olivier/projects/web/conald98.ps
Explaining Collaborative Filtering Recommendations—Herlocker, al.
www.es.umn.edu/Research/GroupLens/explain-CSCW.pdf
WebACE: A Web Agent for Document Categorization and Exploration—Eui-Hong Sam
www-users.es.umn.edu/~gross/papers/agents98.ps
Collaborative filtering approach for software function . . . —Ohsugi, Monden, Morisaki (2002)
se.aist-nara.ac.jp/~akito-m/home/research/paper/ohsugi_collaborativeFiltering_isese2002.pdf
A Survey On Web Information Retrieval Technologies—Lan Huang Computer
ranger.uta.edu/~alp/ix/readings/SurveyOfWebSearchEngines.pdf
On the Effects of Idiotypic Interactions for Recommendations—Communities In Artificial
www.aber.ac.uk/icaris-2002/Proceedings/paper-16/paper16.pdf
A Concept-Based Retrieval Tool:—The Cooperative Web
di002.edv.uniovi.es/~dani/publications/gayoicwi02.PDF
Centers for IBM e-business Innovation—Adaptive Marketing Building
www.systemicbusiness.org/pubs/2000_IBM_e-Business_Wittenstein_Adaptive_Marketing.pdf
A Recommender System based on the Immune Network—Steve Cayzer And
www-uk.hpl.hp.com/people/steve_cayzer/Publications/020514Immune_Recommender.pdf
Applying Natural Language Processing (NLP) Based—Metadata Extraction To ranger.uta.edu/~alp/ix/readings/p116-paik-metadata-extraction-from-communications.pdf
Augmenting the Knowledge Bandwidth and Connecting . . . —Novak, Wurst . . . (2002)
maus.gmd.de/~jas/papers/kmn02.pdf
A recommendation system for software function discovery—Ohsugi, Monden, Matsumoto (2002)
se.aist-nara.ac.jp/~akito-m/home/research/paper/ohsugi_apsec2002_recommendation.pdf
The Role of Semantic Relevance in Dynamic User Community . . . —Papadopoulos . . . (2002)
www.mm.di.uoa.gr/~rouvas/ssi/caise2002/23480200.pdf
Personalisation—How Computer Can
mms.ecs.soton.ac.uk/papers/14.pdf
Online Queries for Collaborative Filtering—Boutilier, Zemel
www.cs.toronto.edu/~cebly/Papers/_download_/querycf.ps
Efficient and Tunable Similar Set Retrieval—Aristides Gionis Stanford
diglib.stanford.edu/~gionis/papers/sigmod01.ps
IntelliShopper: A Proactive, Personal, Private Shopping . . . —Menczer, Street . . .
dollar.biz.uiowa.edu/~fil/Papers/intellishopper.pdf Semantic ratings and heuristic similarity for collaborative . . . —Burke
ecommerce.cbe.fullerton.edu/~rburke/pubs/burke-kbem00.pdf
Adaptive-FP: An Efficient And Effective Method For Multi-Level . . . —Mao (2001)
fas.sfu.ca/pub/cs/theses/2001/RunyingMaoMSc.ps.gz
Classification and Clustering Study in Incomplete Data Domain.—Rodas, Gramajo
www.lsi.upc.es/dept/techreps/ps/R01-11.pdf.gz
Modeling e-business with cBML—Lagha
inforge.unil.ch/yp/Pub/01-cimre.pdf
Engineering an Ontology for a Multi-Agents Corporate Memory System—Acacia (2001)
www-sop.inria.fr/acacia/personnel/Fabien.Gandon/research/ismick2001/article_fabien_gandon_ismick2001.pdf
A Rapidly Acquired Domain Model Derived from Markup Structure—Udo Kruschwitz Department
cswww.essex.ac.uk/staff/udo/papers/esslli.ps.gz
eBusiness Model Design, Classification and Measurements—Dubosson-Torbay
inforge.unil.ch/yp/Pub/01-thunderbird.pdf
Beyond Document Similarity: Understanding . . . —Paepcke . . .
www-db.stanford.edu/~cho/papers/info-filter.pdf
Lightweight Collaborative Filtering Method for . . . —Lightweight . . .
www.research.ibm.com/dar/papers/pdf/weiss_pkdd01.pdf
Mechanisms For Coping With Unfair Ratings And . . . —Chrysanthos . . . (2000)
ccs.mit.edu/dell/icis2000.pdf
The MARS Adaptive Social Network for Information Access . . . —Results Bin Yu
www4.nesu.edu/~byu/papers/mars-experiments.pdf
An adaptive system for the personalized access to news—Ardissono, Console, Torre
www.di.unito.it/~liliana/EC/aiComm01.pdf
Web Usage Mining for a Better Web-Based Learning Environment—Zaïane (2001)
www.cs.ualberta.ca/~zaiane/postscript/CATE2001.pdf
Augmenting Recommender Systems by Embedding Interfaces . . . —Antonietta Grasso . . . (1990)
www.xrce.xerox.com/research/ct/publications/Documents/P10226/content/HICSS-33.ps
Extending Recommender Systems: A Multidimensional Approach—Adomavicius, Tuzhilin
www.mineit.com/lc/ijcai/papers/adomavicius.pdf
MOVIES2GO—A new approach to online movie recommendation—Mukherjee, Dutta, Sen
www.mineit.com/lc/ijcai/papers/mukherjee.pdf
Passive Profiling from Server Logs in an Online Recruitment . . . —Barry
www.mineit.com/lc/ijcai/papers/rafter.pdf
A Theoretical Analysis of Query Selection for Collaborative . . . —Lee, Long
www.comp.nus.edu.sg/~leews/publications/colt01.ps
Experience in Ontology Engineering for a Multi-Agents Corporate . . . —Gandon (2001)
www-sop.inria.fr/acacia/personnel/Fabien.Gandon/research/IJCAI2001/article_fabien_gandon_ijcai2001.ps
Agent-Mediators In Media-On-Demand Eletronic Commerce—Joo Paulo Andrade
wwwhome.cs.utwente.nl/~guizzard/mod-amec-cuba.pdf
Improving the Effectiveness of Collaborative Filtering . . . —Mobasher, Dai, Luo . . .
www.mineit.com/lc/ijcai/papers/mobasher.pdf
Similarity Measures on Preference Structures, Part II . . . —Ha, Iiaddawy, al.
www.cs.uwm.edu/~vu/papers/uai01.ps.gz
Towards a Multiagent System for Competitive Website Ratings—Nickles (2001)
wwwbrauer.informatik.tu-muenchen.de/fki-berichte/postscript/fki-243-01.ps.gz
A Framework For Personalizable Community Web Portals—Lacher, Koch, Wörndl (2001)
wwwll.intum.de/publications/pdf/lacher2001a.pdf
Data Mining At The Interface Of Computer Science And Statistics—Smyth (2001)
www.ics.uci.edu/~datalab/papers/dmchap.ps
Technical Paper Recommendation: A Study in . . . —Basu, Hirsh . . . (2001)
www.cs.washington.edu/research/jair/volume14/basu01a.ps
Learning about User in the Presence of Hidden Context—Koychev
www.dfki.de/~rafer/um01-ml4um-ws/papers/IK.pdf
Construction of Adaptive Web-Applications from Reusable . . . —Graef, Gaedke (2000)
www.teco.edu/~graef/paper/ecweb-graef-gaedke-sv2.pdf
Educational and scientific recommender systems . . . —Geyer/Schulz, Hahsler, . . . (2001)
wwwai.wu-wien.ac.at/~hahsler/research/recomm_ijee2001/paper.pdf
Dynamic Recommendations In Internet Retailing—Ai Li Ng (2001)
www.eltrun.aucb.gr/papers/ecis2001.pdf
Data Mining, Decision Support and Meta-Learning . . . —Blanzieri . . .
www.science.unitnit/~pgiorgio/ic/ws01.ps.gz
Some Issues in the Learning of Accurate, Interpretable User . . . —Wittig
www.dfki.de/~rafer/um01-ml4um-ws/papers/FW.ps.gz
Designing for Social Navigation of Food Recipes—Höök, Laaksolahti, Svensson . . .
www.sics.se/~martins/publications/hook.pdf
Collaborative Filtering via Implicit Culture Support—Blanzieri, Giorgini, Massa . . . (2001)
www.science.unitn.it/~pgiorgio/ic/ic-um2001.ps.gz
Web Usage Mining with Inductive Logic Programming—Tveit (2000)
cavenan.idi.ntnu.no/amund/publications/2000/WebMining-WithILP.pdf
Personalization by Partial Evaluation—Ramakrishnan, Rosson
www.cs.vt.edu/TR/pipe-techreport.ps
Finding Relevant Litterature for Agent Research—Tveit (2000)
cavenan.idi.ntnu.no/amund/publications/2000/AgentLitteratureSearch.pdf
Temporary User Modeling for Adaptive Product Presentations in the . . . —Joerding
www.cs.usask.ca/UM99/Proc/DJ/joerding.pdf
A Recipe Based On-Line Food Store—Svensson, Laaksolahti, Waern, Höök (2000)
www.sics.se/~martins/publications/chi99.pdf
Towards An Adaptive Mail Classifier—Manco, Masciari, Ruffolo, Tagarelli (2002)
www-dii.ing.unisi.it/aiia2002/paper/APAUT/manco-aiia02.pdf
A Knowledge Discovery Methodology for the—Performance Evaluation Of
www.cs.purdue.edu/homes/verykios/personal/papers/kais98.ps Dynamic Profiling in a Real-Time Collaborative . . . —Kurhila . . . (2002)
cosco.hiit.fi/edutech/publications/its2002.pdf
EDUCO—A Collaborative Learning Environment based . . . —Kurhila . . . (2002)
cosco.hiit.fi/edutech/publications/ah2002.pdf
Using Ontologies to Discover Domain-Level Web Usage Profiles—Dai, Mobasher
maya.cs.depaul.edu/~mobasher/papers/swm02.pdf
Bayesian Learning For Personlization In—Information Retrieval Varun
dcs.vein.hu/CIR/cikkek/paper_acmsig.pdf
Unknown—If Adopted These
www.kdnuggets.com//gpspubs/ieee-intelligent-dec-1999-x6032.pdf
Collaborative Filtering with Privacy via Factor Analysis—Canny
www.cs.berkeley.edu/~jfc/papers/02/SIGIR02.pdf
RecTree: An Efficient Collaborative Filtering Method—Sonny Han Seng
www.cs.sfu.ca/~wangk/pub/dawakfin.pdf
Ratings in Distributed Systems: A Bayesian Approach—Lik Mui Mojdeh
www.les.mit.edu/publications/pubs/pdf/MIT-LCS-TM-617.pdf
An Information Architecture-based Framework for . . . —Keith Instone Argus (2000)
www.zurich.ibm.com/~mrs/chi2000/contributions/instone.pdf
Swe88] J. A. Swets, Measuring the accuracy of diagnostic . . . —June Tha Tereen (2000)
fas.sfu.ca/pub/cs/theses/2000/SonnyHanMengCheeM-Sc.pdf
Implicit Culture for Information Agents—Blanzieri, Giorgini
www.science.unitn.it/~pgiorgio/ic/blanzieri-giorgini.pdf.gz
Personalization and Community Communication for Customer Support—Koch, Schubert (2002)
www11.in.tum.de/publications/pdf/Koch2002.pdf
Foundations for building a digital sister-in-law: explicity . . . —Groves, Kay
www.ted.cmis.csiro.au/ades01/012_Groves.pdf
Immunizing Online Reputation Reporting Systems Against . . . —Chrysanthos . . .
ccs.mit.edu/dell/ec00reputation.pdf
Virtual Reviewers for Collaborative Exploration—Of Movie Review
lieber.www.media.mit.edu/people/lieber/IUI/Tatemura/Tatemura.pdf
Social Network Analysis of Information Sharing Networks in . . . —Hichang Cho Michael
newmedia.colorado.edu/cscl/88.pdf
Robustness Analyses of Instance-Based Collaborative Recommendation—Kushmerick (2002)
www.cs.ucd.ie/staff/nick/home/research/download/kushmerick-ecml2002.pdf
Collaborative recommendation: A robustness analysis—O'Mahony, Hurley . . . (2002)
www.cs.ucd.ie/staff/nick/home/research/download/omahony-acmtit2002.pdf
Impact and Potential of User Profiles Used for Distributed Query . . . —Schmitt
www.cg.cs.tu-bs.de/v3d2/pubs.collection/edbt02.pdf
Document Classification as an Internet service: Choosing the best . . . —Godbole (2001)
www.it.iitb.ac.in/~shantanu/work/mtpsg.pdf Improving Collaborative Filtering with Multimedia Indexing . . . —Arnd Kohrs Bernard (1999)
www.eurecom.fr/~kohrs/publish/ACMMM99.ps.gz
Content-Boosted Collaborative Filtering for Improved . . . —Melville, Mooney . . . (2002)
www.cs.utexas.edu/users/ml/papers/cbcf-aaai-02.ps.gz
Exploiting Synergy Between Ontologies and Recommender . . . —Middleton, Alani . . . (2002)
www.ecs.soton.ac.uk/~sem99r/www-paper.ps
Clustering for Collaborative Filtering Applications—Kohrs, Merialdo (1999)
www.eurecom.fr/~kohrs/publish/CIMCA99.ps.gz
Dynamic Information Filtering—Baudisch (2001)
ipsi.fhg.de/~baudisch/publications/2001-Baudisch-Dissertation-DynamicInformationFiltering.pdf
Collaborative Filtering with Privacy—Canny (2002)
www.cs.berkeley.edu/~jfc/papers/02/IEEESP02.pdf
Using Color and Texture Indexing to improve Collaborative . . . —Arnd Kohrs And (1999)
www.eurecom.fr/~kohrs/publish/CBMI99.ps.gz
TV Scout: Lowering the entry barrier to personalized TV . . . —Baudisch, Brueckner (2002)
ipsi.fhg.de/~baudisch/publications/2002-Baudisch-AH2002-TVScoutLoweringTheEntryBarrier.pdf
A Cooperating Hybrid Neural—CBR Classifiers for Building . . . —Malek, Kanawati (2001)
www.aic.nrl.navy.mil/papers/2001/AIC-01-003/ws5/ws5toc8.PDF
Using Category-Based Collaborative Filtering In The Active . . . —Arnd Kohrs And (2000)
www.eurecom.fr/~kohrs/publish/ICME2000.ps.gz
Enhancing Product Recommender Systems on Sparse Binary Data—Demiriz
www.rpi.edu/~demira/productrecommender.ps.gz
Query Expansion using Collaborative Filtering Algorithm—Brandberg (2001)
ftp.csd.uu.se/pub/papers/masters-theses/0207-brandberg.pdf
Adaptivity through Unobstrusive Learning—Ingo Schwab Alfred (2002)
www.ics.uci.edu/%7Ekobsa/papers/2002-KI-kobsa.pdf
Compositional Cbr Via Collaborative Filtering—Aguzzoli, Avesani, Massa (2001)
sra.itc.it/tr/AAM01.ps.gz
Application of ART2 Networks and Self-Organizing Maps to . . . —Guntram Graef And (2001)
wwwis.win.tue.ml/ah2001/papers/graef-schaefer-1.pdf
A Theoretical Analysis of Query Selection for Collaborative . . . —Lee, Long
www.comp.nus.edu.sg/~leews/publications/colt01.pdf
COOL-TOUR: A Case Based Reasoning System for Tourism Culture . . . —Blanzieri, Ebranati
sra.itc.it/tr/BE00.ps.gz
Using Content-Based Filtering for Recommendation—van Meteren, van Someren
www.ics.forth.gr/~potamias/mlnia/paper_6.pdf
Systems That Adapt to Their Users—Description of an IJCAI 01 . . . —Jameson
www.cs.uni-sb.de/users/jameson/ijcai01-tutorial-jameson.pdf
On the Effects of Dimensionality Reduction on High Dimensional . . . —Aggarwal (2001)
web.mit.edu/charu/www/dim.ps
A System for Collaborative Web Resource Categorization and Ranking—Lifantsev
www.escl.cs.sunysb.edu/~maxim/cgi-bin/Get/SCWR-CR.ps.gz User Interface Research Center 380 Gui Lane Hillsville, N.Y. . . . —Mary Smith Computer (2001)
www.dcs.gla.ac.uk/equator/2001/09/workshop.pdf
Designing User-Adaptive Systems—Description of an IUI 2001 . . . —Jameson
www.cs.uni-sb.de/users/jameson/iui01-tutorial-jameson.pdf
Learning a Gaussian Process Prior for . . . —Platt, Burges . . .
research.microsoft.com/~jplatt/autoDJ.pdf
FEATURES: Real-Time Adaptive Feature and Document Learning . . . —Chen, Meng, Fowler
www.cs.panam.edu/~chen/./paper-file/features/ps.Z
TalkMine: a Soft Computing Approach to Adaptive Knowledge . . . —Luis Mateus Rocha
wwwc3.lanl.gov/~rocha/ps/softagents.pdf
Combining Dynamic Agents and Collaborative Filtering . . . —Saranya Maneeroj Hideaki
www.ercim.org/publication/ws-proceedings/DelNoe02/Saranya.pdf
Collaborative Filtering as means to reduce information overload—Hughes, O'Riordan
www.it.nuigalway.ie/TR/abstracts/./papers/sh.ps.gz
Shopping Anytime Anywhere—O'Hara, Perry
www.brunel.ac.uk/~cssrmjp/homefiles/selected-publications/oharaandperry.PDF
Zhang, J. (Unpublished)—Distributed Representation Approach
www.brunel.ac.uk/~cssrmjp/MP_thesis/references.pdf
A Bidding Mechanism for Web-Based Agents Involved in . . . —Rajeev Raje Snehasis (1998)
www.avl.iu.edu/~mjboyles/papers/bidding.ps
Association Models For Web Mining—Giudici, Castelo (2001)
www.cs.uu.nl/~roberto/kddj2kl.pdf
A Framework for Implicitly Tracking Data—Robert Villa And
www.ercim.org/publication/ws-proceedings/DelNoe02/RobertVilla.pdf
D-SIFTER: A Collaborative Information Classifier—Rajeev Raje Snehasis
www.avl.iu.edu/~mjboyles/papers/dsifter.ps
Knowledgescapes: A Probabilistic Model for Mining Tacit Knowledge . . . —Cheng
www.es.berkeley.edu/~jfc/papers/01/heyning/ms_knowledgescapes.pdf
Integrating User Data and Collaborative Filtering . . . —Buono, Costabile, . . . (2001)
wwwis.win.tue.nl/ah2001/papers/costabile.pdf
A Performance Evaluation of the Acorn Architecture—Bhavsar, Ghorbani, Marsh (2000)
www.cs.unb.ca/profs/ghorbani/ali/./papers/hpcs00.ps
Collaborative Filtering—Griffith, O'Riordan (2000)
www.it.nuigalway.ie/TR/./rep00/NUIG-IT-160900.ps.gz
Information Filtering and Retrieval: An Overview—Riordan, Sorensen
www.it.nuigalway.ie/TR/abstracts/./papers/cor.ps.gz
Content Personalisation for WAP-Enabled Devices—Smyth, Cotter
www.ics.forth.gr/~potamias/mlnia/paper_8.pdf
Getting to Know Each Other on the Web: Using Web Server Access . . . —Lueg (2001)
www-staff.it.uts.edu.au/~lueg/papers/www2001.ps.gz
Rank Aggregation Revisited—Dwork, Kumar, Naor, Sivakumar
www.cs.berkeley.edu/~christos/games/readings/rank.ps
User Interfaces for All—Kobsa, (eds.) (1999)
www.gmd.de/publications/report/0074/Text.pdf
User Modeling and Adaptivity in Nomadic Information Systems—Specht, Oppermann
fit.gmd.de/~oppi/publications/ABIS-hip.pdf
Collaborative Filtering with the Simple Bayesian Classifier—Miyahara, Pazzani
www.ics.uci.edu/~pazzani/Publications/koji.pdf
Combining Content-based and Collaborative Filtering—Polcicova, Navrat
www.dcs.elf.stuba.sk/emg/filter.ps
Paths and Contextually Specific Recommendations—Matthew Chalmers University
www.ercim.org/publication/ws-proceedings/DelNoe02/MathewChalmers.pdf
Comparing Recommendations Made by Online Systems and Friends—Rashmi Sinha And
www.sims.berkeley.edu/~sinha/papers/Recommenders_Delos01.PDF
An Economic Framework For Web-Based Collaborative . . . —Rajeev Raje Snehasis (1997)
www.avl.iu.edu/~mjboyles/papers/economic.ps
Intelligent Agents in Electronic Markets for . . . —Aron. Sundararajan . . . (2001)
ox.stern.nyu.edu/papers/agent.pdf
Flycasting: Using Collaborative Filtering to Generate a . . . —Hauver, French (2001)
www.cs.virginia.edu/~cyberia/papers/wedelmusic.ps
Design and Development of a Cooperative Shopping System . . . —Umeda, Tarumi . . .
www.isse.kuis.kyoto-u.ac.jp/~tarumi/research/papers/iwc-mc.pdf
Flycasting: On the Fly Broadcasting—James French And
www.cs.virginia.edu/~cyberia/papers/flycast.pdf
The Use of Case-Based Reasoning (CBR) For Knowledge Enablement Of . . . —Hodgson (2000)
www.ifcomputer.co.jp/sol2000/papers/hodgson.pdf
Unknown—(1998)
gregridgeway.homestead.com/files/jsm1998.pdf
Human Language Technologies for Knowledge Management . . . —Mark Maybury Information
www.mitre.org/support/papers/tech_papers_01/maybury_humanlanguage/maybury_hlt.pdf
IntelliShopper: A Proactive, Personal, Private Shopping . . . —Menczer, Street . . .
dollar.biz.uiowa.edu/~fil/Papers/intellishopper.pdf
Semantic ratings and heuristic similarity for collaborative . . . —Burke
ecommerce.cbe.fullerton.edu/~rburke/pubs/burke-kbem00.pdf
Content-Based Techniques—That Filter Content (2000)
www.cs.vt.edu/~ramakris/papers/ic2000.pdf
SWAMI: A Framework for Collaborative Filtering Algorithm . . . —Danyel Fisher Kris
www.cs.berkeley.edu/~richie/swami/sigir00-final/report.ps
Online Clustering for Collaborative Filtering—Wee Sun Lee
hal.comp.nus.edu.sg/recommender/Papers/online/online.ps.gz
DEMOIR: A Hybrid Architecture for Expertise Modeling and . . . —Yimam, Kobsa (2000)
www.ics.uci.edu/~kobsa/papers/2000-IEEE-kobsa.pdf
Usage, Rating & Filtering—Nichols
www.sztaki.hu/conferences/delosbudapest/papers/DELOS-dmn.ps
The Pivotal Role of Community Building in Electronic Commerce—Schubert
studnet.fhbb.ch:8081/pschubert/publications/pdf-files/clesp04.pdf Collaborative Filtering Methods based on Fuzzy Preference . . . —Patrice Perny And
www-poleia.lip6.fr/~zucker/Papers/PPJDZ99.pdf
Does "Authority" Mean Quality? Predicting Expert Quality . . . —Amento, Terveen, Hill (2000)
www.research.att.com/~terveen/sigir2000.ps
Dependency Networks for Inference, Collaborative Filtering . . . —Heckerman, al. (2000)
www.ai.mit.edu/projects/jmlr/papers/volume1/heckerman00a/heckerman00a.ps.gz
Reference Task Agenda—Let's Stop Pushing
www.research.att.com/~terveen/envelope.ps
Involving Remote Users in Continuous Design of Web Content—Hill, Terveen
www.research.att.com/~terveen/dis97.ps
Informing the Design of Shared Bookmark Systems—Rushed Kanawati Maria (2000)
133.23.229.11/~ysuzuki/Proceedingsall/RIAO2000/Wednesday/15API.pdf
Virtual Communities of Transaction: The Role of . . . —Schubert, al. (1999)
studnet.fhbb.ch:8081/pschubert/publications/pdf-files/ta-community_schubert_ginsburg.pdf
The "ebay Of Blank": Digital Intermediation In Electronic . . . —Chircu, Kauffman (2000)
webfoot.csom.umn.edu/faculty/phds/achircu/researchweb/ck_bh_2000.pdf
A Comparative Study of Approaches to Chance Discovery—Prendinger, Ishizuka
www.miv.t.u-tokyo.ac.jp/papers/helmut-sigfai00.pdf
The Adaptive Place Advisor: A Conversational Recommendation . . . —Göker, Thompson
www.cs.utah.edu/~cindi/papers/gwcbr.ps.gz
Buy and Sell—Pattie Maes Robert
www.cis.upenn.edu/~lec/00cis640/papers/maes.pdf
Less is More—When IT Comes to Knowledge Management—Gunnarsson, Lindroth . . . (2000)
iris23.htu.se/proceedings/PDF/110final.PDF
Behind-the-Scenes Data Mining:—Report On The
diagnosis.xjtu.edu.cn/kdd/john.ps
Recom Syst—High Volume And
www.ics.uci.edu/~pratt/courses/papers/p77-konstan.pdf
Mixtures of Gaussian Processes—Tresp (2001)
dnkweb.denken.or.jp/boosting/papers/upload_7245_moe_gpr2.ps
Distributing digital music over the internet—a chance for the . . . —Schulz (2000)
www.ebs.de/Kehrstuehle/Wirtschaftsinformatik/Lehre/Seminar00/p_schulz.pdf
Dynamic Modeling and Learning User Profile in Personalized News . . . —Widyantoro (1999)
www.cs.tamu.edu/research/CFL/current/thesis.ps.gz
Using Narratives, Humor, and Social Navigation: An . . . —Svensson, Persson, Höök
www.sics.se/~perp/UserModelling99.pdf
Learning User Interests through Positive Examples Using . . . —Schwab, Kobsa, Koychev
fit.gmd.de/~koychev/papers/MLJ-paper.pdf
Adaptation to Drifting User's Interests—Koychev, Schwab (2000)
fit.gmd.de/~koychev/papers/MLNIA00.ps
Active Exploration in Instance-Based Preference Modeling—Branting (1999)
pyramid.cs.uwyo.edu/~karl/papers/iccbr99a.ps
Dependency Networks for Inference, Collaborative . . . —Heckerman . . . (2000)
www.cs.brown.edu/people/amygreen/seminar/dependency.pdf
Cognitive Filtering of Information by Evolutionary . . . —Höfferer, Knaus, Winiwarter
ftp.ifs.univie.ac.at/pub/werner.winiwarter/ki94if.ps.gz
Collaborative—Filtering Thomas Hofmann
www.cs.brown.edu/people/th/papers/HofmannPuzicha-IJCAI99.pdf
Accurate Recasting of Parameter Estimation Algorithms . . . —Demonstrated For . . .
www.hpl.hp.com/org/stl/dmsd/publications/ParaPKDD.pdf
A multiagent architecture for a web-based adaptive . . . —Boticario, Gaudioso
newatlantis.isle.org/~aui/papers/JBoticario00.ps
Improvements to Collaborative Filtering Algorithms—Gokhale (1999)
www.cs.wpi.edu/~claypool/ms/cf-improve/cf-improve.ps
Self-Adaptive Web-Applications—Graef, Gaedke (2000)
www.teco.edu/~gaedke/paper/2000-www9-poster.pdf
Networked Distributed Collaboration for Information Activity . . . —Murthy Murthy Csa
bheeshma.csa.iisc.ernet.in/~krish/docs/NDC.ps.gz
Let's stop pushing the envelope and start addressing it: . . . —Whittaker, Terveen . . . (2000)
www.research.att.com/~stevew/envelope-5-15-00-FINAL.pdf
Getting to Know Each Other on the Web: Using Web Server Access . . . —Leug (2000)
ftp.ifi.unizh.ch/pub/institute/ailab/papers/lueg/aus2000.ps
Sandip Sen—Mathematical Computer Sciences
euler.mes.utulsa.edu/~sandip/aa00-ba.ps
MiBiblio: Personal Spaces in a Digital Library Universe—Fernández . . .
ict.pue.udlap.mx/pubs/Mibiblio.ps.gz
Dealing With Community Data—Bruckman, Erickson, Fisher, Lueg
www.cs.berkeley.edu/~danyelf/research/cscw-workshop.pdf
A Hyperlink-Based Recommender System Written in Squeal—Spertus, Stein
www.mills.edu/ACAD_INFO/MCS/SPERTUS/widm98.pdf
Collaborative Maintenance—Maria-Angela Ferrario Barry (1999)
www.cs.ucd.ic/pubs/1999/../../staff/bsmyth/home/crc/aics99b.ps
A Recipe Based On-line Food Store—Svensson, Laaksolahti, Höök, Waern (2000)
lieber.www.media.mit.edu/people/lieber/IUI/Svensson/Svensson.pdf
Mining the Web's Hyperlinks for Recommendations—Spertus, Stein
www.mills.edu/ACAD_INFO/MCS/SPERTUS/recommender-workshop.pdf
IntraNews: A News Recommending Service for Corporate Intranets—Fagrell
www.viktoria.informatik.gu.se/groups/mi3/results/papers/intranews.pdf
Recommendation systems: a probabilistic analysis—Kumar, Raghavan . . . (1998)
www.almaden.ibm.com/cs/k53/./algopapers/focs98rec.ps
From Instances to Classes in Probabilistic Relational Models—Getoor, Koller, Friedman (2000)
www.informatik.uni-freiburg.de/~ml/icml2000_workshop/getoor.ps
Client-Side Proxies—Better Way To
cmc.dsv.su.se/select/csp/thesis.pdf Integrating Community Services—A Common Infrastructure Proposal—Koch, Lacher (2000)
wwwll.in.tum.de/publications/pdf/Koch2000.pdf
Design Principles For Social Navigation Tools—Forsberg, Höök, Svensson
www.ics.forth.gr/proj/at-hei/UI4ALL/UI4ALL-98/forsberg.pdf
Discovering Collaborators by Analyzing Trails Through an . . . —Payton
eksl-www.cs.umass.edu/aila/payton.pdf
The Experimental Study of Adaptive User Interfaces—Langley, Fehling
www.isle.org/~langley/papers/adapt.exper.ps.gz
Smart Radio—a proposal—Conor Hayes Dr (1999)
ftp.cs.tcd.ie/pub/tech-reports/reports.99TCD-CS-1999-24.pdf
Reasoning with Partial Preference Models—Ha (2000)
cs.uwm.edu/~vu/papers/proposal.pdf
Parallel Data Mining using the Array Package for Java—Moreira, Midkiff, Gupta . . .
www.research.ibm.com/people/g/gupta/sc99.ps
Bulletin of the Technical Committee on—March Vol No
ftp.research.microsoft.com/pub/debull/marA00-a4final.ps
Scalable Techniques for Clustering the Web (Extended . . . —Haveliwala, Gionis, Indyk (2000)
www.research.att.com/conf/webdb2000/PAPERS/8c.ps
Recommending Expertise in an Organizational Setting—McDonald
www.ics.uci.edu/~dmcdonal/papers/chi99.final.pdf
A Countermeasure to Duplicate-detecting Anti-spam Techniques—Robert Hall Att
www.research.att.com/resources/trs/./TRs/99/99.9/99.9.1.body.ps
Personalized Decentralized Communication—Olsson, Rasmusson, Janson
www.sics.se/~tol/publications/s3-business-processes.pdf
The MARS Adaptive Social Network for Information Access . . . —Bin Yu Mahadevan
www.csc.ncsu.edu/faculty/mpsingh/papers/mas/mars-experiments.ps
Knowledge-based recommender systems—Burke (2000)
www.ics.uci.edu/~burke/research/papers/kb-recommender-reprint.ps.gz
From Collaborative Filtering to Implicit Culture: a general . . . —Blanzieri, Giorgini (2000)
www.cs.unitn.it/~pgiorgio/papers/wars2000.ps.gz
Web-Collaborative Filtering: Recommending Music by Spidering The . . . —Cohen, Fan (2000)
www.cs.columbia.edu/~wfan/papers/www9.ps.gz
i3 Annual Conference COVER SHEET for—Submissions Category Of
freak.gmd.de/NIS/Docs/i3secondAnnualConference.pdf
Using Probabilistic Relational Models for Collaborative Filtering—Getoor, Sahami (1999)
viror.wiwi.uni-karlsruhe.de/webmining/bib/pdf/Getoor1999.pdf
Information Awareness and Representation—Chalmers
www.dcs.glasgow.ac.uk/personal/personal/matthew/papers/awarenessRepn.pdf
Extending a Collaborative Architecture to Support . . . —Garcia, Favela . . .
www.ai.mit.edu/people/jvelas/ebaa99/garcia-ebaa99.pdf
Michael J. Wright—Michael Wrig Ht
www.cs.colorado.edu/~sumner/cs3202/kmi-tr-75.pdf
Clustering Items for Collaborative Filtering—Connor, Herlocker
www.cs.umbc.edu/~ian/sigir99-rec/papers/oconner_m.pdf
Recommending HTML-documents using Feature Guided . . . —Polcicova, Slovak . . . (1999)
www.cs.umbc.edu/~ian/sigir99-rec/papers/polcicova_g.ps.gz
Reasoning With Conditional Ceteris Paribus Preference . . . —Boutilier, Brafman . . . (1999)
www.cs.ubc.ca/spider/hoos/Publ/uai99.ps.gz
Correlation Thresholds for More Accurate Collaborative . . . —Anuja Gokhale Mark
ftp.cs.wpi.edu/pub/techreports/99-17.ps.gz
Combining Content and Collaboration in Text Filtering—Nicholas (1999) www.cs.umbc.edu/~ian/pubs/mlif.ps.gz
Collaborative Maintenance—Ferrario, Smyth (1999)
www.cs.tcd.ie/Conor.Hayes/cbrnet/pub/UCD-CBRNET-1999.ps
A Use Centred Framework For Evaluation Of The Web—Pejtersen, Dunlop, Fidel
www.dei.unipd.it/~ims/sigir99/papers/3-pejtersen.ps
Using Semi-intelligent Filtering Agents to Improve Prediction—Sarwar (1998)
www-users.cs.umn.edu/~sarwar/ms.ps
Supporting Collaborative Information Activities in . . . —Glance, Grasso, al. (1999)
int2-www.informatik.unibw-muenchen.de/People/borghoff/pspapers/hci99.ps
Personalising On-Line Information Retrieval Support with a Genetic . . . —Er (1996)
www.cee.hw.ac.uk/~jeff/files/changing.ps.Z
Information Services Based on User Profile Communication—Waern, Averman, Tierney . . . (1999)
www.sics.se/~annika/papers/UM99.ps
Bibliography—Agrawal Mannila
www.cs.cmu.edu/~TextLearning/pww/papers/PhD/PhD-Bib.ps.gz
Radio CBR—An Application Proposal—Conor Hayes (1999)
www.cs.tcd.ie/Conor.Hayes/cbrnet/pub/TCD-CS-1999-24.ps
A Java-Based Approach to Active Collaborative Filtering—Lueg, Landolt (1998)
ftp.ifi.unizh.ch/pub/institute/ailab/papers/lucg/chi98_late.ps.Z
Text Categorization Through Probabilistic Learning: Applications . . . —Bennett (1998)
ftp.cs.utexas.edu/pub/mooney/papers/pbennett-ugthesis.ps.Z
Supporting Situated Actions in High Volume Conversational Data . . . —Lueg (1998)
ftp.ifi.unizh.ch/pub/institute/ailab/papers/lucg/chi98.ps.gz
Using d' to Optimize Rankings—Vogt, Cottrell (1998)
www.cs.ucsd.edu/~vogt/papers/dprime/dprime.ps
Intelligent Collaborative Information Retrieval—Actively . . . —Delgado, ISHII, URA (1998)
www-ishii.ics.nitech.ac.jp/~jdelgado/iberamia98.ps.gz
(Collaborative Filtering
cairo.aist-nara.ac.jp/~tomohi-f/Docs/cofil.ps.gz
An Adaptive Usenet Interface Supporting Situated Actions—Lueg (1997)
ftp.ifi.unizh.ch/pub/institute/ailab/papers/lueg/ercim97.ps.gz
PEFNA—The Private Filtering News Agent—Kilander, Fåhraeus, Palme (1997)
www.dsv.su.se/~ft/if_Doc/Pcfna/pefna.ps.Z
Knowing Me, Knowing You: Practical Issues in the . . . —Soltysiak, Crabtree (1998)
www.labs.bt.com/projects/agents/publish/papers/ss_bc-paam98.

EYE: Using Location-based Filtering for a Shopping Agent in the . . . —Fano
www.ac.com/services/cstar/documents/a086fano.ps
Reasoning With Conditional Ceteris Paribus Preference . . . —Boutilier, Brafman, al. (1999)
www.cs.ubc.ca/spider/cebly/Papers/CPnets.ps
Decentralised Social Filtering based on Trust—Tomas Olsson (1998)
www.sics.se/~tol/publications/socialfiltering.ps
Agent Mediated Collaborative Web Page Filtering—Shaw Green
www.cs.tcd.ie/research_groups/aig/iag/cia.ps
Intelligent Information Filtering—Kilander, Fåhracus, Palme (1997)
www.dsv.su.se/~tk/if_Doc/juni96/ifrpt.ps.Z
Experimental Investigation of High Performance Cognitive and . . . —Douglas Oard
www.cs.kun.nl/is/research/filter/literature/perf.ps
Collaborative Filtering with LSI: Experiments with Cranfield—Soboroff (1998)
www.cs.umbc.edu/~ian/pubs/tr9801.ps.gz
Unknown—
www.cs.pdx.edu/~kenrick/papers/infoproc.ps.gz
Profile—A Proactive Information Filter—Hoenkamp, Schomaker, van Bommel, . . . (1996)
ftp.cs.kun.nl/pub/SoftwEng.InfSyst/articles/FilterInit.ps.Z
Social Affordances and Implicit Ratings for Social Filtering . . . —Procter, McKinlay
www.ercim.org/publication/ws-proceedings/DELOS5/procter.ps.gz
Knowledge Pump: Community-centered Collaborative Filtering—Natalie Glance
www.ercim.org/publication/ws-proceedings/DELOS5/arregui.ps.gz
Personalization of the Automotive Information Environment—Seth Rogers (1997)
www.isle.org/~langley/papers/route.ml97.ps
Collaborative Information Gathering—Grasso, Borghoff, Glance, al. (1998)
inf2-www.informatic.unibw-muenchen.de/People/borghoff/pspapers/euromedia98.b.ps
Integrated Information Search In The Www And A Human Group—Seiji Yamada Motohiro (2000)
ftp.ymd.dis.titech.ac.jp/pub/doc/references/2000/INFORMS-2000-masc.ps.gz
Hypertext Information Retrieval for the Web—Brown, Smeaton
lorca.compapp.dcu.ic/SIGIR98-wshop/SIGIR-Forum-summary.ps
Features: Real-time Adaptive Feature Learning and . . . —Chen, Meng, Fowler, Zhu (2000)
bahia.cs.panam.edu/techrpt/features.ps
Evolving User Profiles to Reduce Internet Information Overload—Pagonis, Sinclair
esewww.essex.ac.uk/~mcs/ps/rasc00_pag.ps.gz
GroupLens: An Open Architecture for Collaborative Filtering—Miller (1995)
ftp.cs.umn.edu/dept/users/bmiller/prop.ps
Collaborative Aspects of Information Retrieval Tools . . . —Stenmark (2000)
w3.adb.gu.sc/~dixi/publ/iris23ca.pdf
A Logic-Based Approach for Adaptive Information Filtering . . . —Raymond Lau Arthur
www.icis.qut.edu.au/~arthur/articles/iia.ps.Z
Semantic ratings and heuristic similarity for collaborative . . . —Burke
www.igec.umbc.edu/kbem/final/burke.pdf
Learning Bayesian Networks from Data—Unknown (1998)
www.cs.huji.ac.il/~nir/tutorial/readings.ps
The SELECT Protocol for Rating and Filtering—Palme, Kaers (2000)
www.ietf.org/internet-drafts/draft-palme-select-00.ps
Knowledge Based Recommender Systems Using Explicit User Models—Towle, Quinn
www.igec.umbc.edu/kbem/final/towle.pdf
Searching The Web—Meta-Search Hybrid Approaches
www.cs.washington.edu/education/courses/cse574/98wi/toc.ps
Collaborative Document Monitoring via a Recommender System—Natalie Glance Damin
www.xrce.xerox.com/research/ct/publications/Documents/P87437/content/kpma-wars.pdf
A Multiagent system for Content Based Navigation of Music—De Roure, El-Beltagy . . . (1999)
www.bib.ecs.soton.ac.uk/data/4464/PDF/mascbnm.pdf
A system to restructure hypertext networks into valid user . . . —Bollen, Heylighen (1998)
lib-www.lanl.gov/~jbollen/pubs/JBollen_NRHM99.pdf
The Evolution of a Practical Agent-based Recommender System—Samhaa El-Beltagy David
www.bib.ecs.soton.ac.uk/data/4495/postscript/rec4.ps
Let's Get Personal—Personalised Television Listings on the . . . —Smyth, Cotter, O'Hare (1998)
www.cs.ucd.ie/pubs/1998/../../staff/bsmyth/home/crc/aics98a.ps
Collaboratively Searching the Web - - - An Initial Study . . . —Center for Intelligent
none-cs-umass.edu:1234/~schapira/thesis/report/report.ps.gz
Passive Profiling and Collaborative Recommendation—Rafter, Bradley, Smyth (1999)
www.cs.uce.ic/pubs/1999/../../staff/bsmyth/home/crc/aics99f.ps
Similarity Measures on Preference Structures, Part II . . . —Ha, Haddawy, al.
www.cs.uwm.edu/~vu/papers/uai01.ps.gz
Towards a Multiagent System for Competitive Website Ratings—Nickles (2001)
wwwbrauer.informatik.tu-muenchen.de/fki-berichte/postscript/fki-243-10.ps.gz
A Framework For Personalizable Community Web Portals—Lacher, Koch, Wörndl (2001)
wwwll.in.tum.de/publications/pdf/lacher2001a.pdf
Data Mining At The Interface Of Computer Science And Statistics—Smyth (2001)
www.ics.uci.edu/~datalab/papers/dmchap.ps
Technical Paper Recommendation: A Study in . . . —Basu, Hirsh . . . (2001)
www.cs.washington.edu/research/jair/volume14/basu01a.ps
Learning about User in the Presence of Hidden Context—Koychev
www.dfki.de/~rafer/um01-ml4um-ws/papers/IK.pdf
Construction of Adaptive Web-Applications from Reusable . . . —Graef, Gaedke (2000)
www.teco.edu/~graef/paper/ecweb-gaedke-sv2.pdf
Educational and scientific recommender systems . . . Geyer/Schulz, Hahsler, . . . (2001)
wwwai.wu-wien.ac.at/~hahsler/research/recomm_ijee2001/paper.pdf
Dynamic Recommendations In Internet Retailing—Ai Li Ng (2001)
www.eltrun.aueb.gr/papers/ecis2001.pdf
Data Mining, Decision Support and Meta-Learning . . . —Blanzieri . . .

www.science.unitn.it/~pgiorgio/ic/ws01.ps.gz
Some Issues in the Learning of Accurate, Interpretable User . . . —Wittig
www.dfki.de/~rafer/um01-ml4um-ws/papers/FW.ps.gz
Designing for Social Navigation of Food Recipes—Höök, Laaksolahti, Svensson . . .
www.sics.sc/~martins/publications/hook.pdf
Collaborative Filtering via Implicit Culture Support—Blanzieri, Giorgini, Massa . . . (2001)
www.science.unitn.it/~pgiorgio/ic/ic-um2001.ps.gz
Web Usage Mining with Inductive Logic Programming—Tveit (2000)
cavenan.idi.ntnu.no/amund/publications/2000/WebMining-WithILP.pdf
Personalization by Partial Evaluation—Ramakrishnan, Rosson
www.cs.vt.edu/TR/pipe-techreports.ps
Finding Relevant Literature for Agent Research—Tveit (2000)
cavenan.idi.ntnu.no/amund/publications/2000/AgentLitteratureSearch.pdf
Temporary User Modeling for Adaptive Product Presentations in the . . . —Joerding
www.cs.usask.ca/UM99/Proc/DC/joerding.pdf
A Recipe Based On-Line Food Store—Svensson, Laaksolahti, Waern, Höök (2000)
www.sics.se/~martins/publications/chi99.pdf
Individual Differences in Social Navigation—Höök, Laaksolahti, Svensson . . . (2000)
www.sics.se/~martins/publications/chi00_cfol.pdf
Matchmaking and Privacy in the Digital Library: Striking the . . . —Nichols, Twidale (1997)
ftp.comp.lancs.ac.uk/pub/reports/1997/CSEG.4.97.pdf
Adaptive-FP: An Efficient And Effective Method For Multi-Level . . . —Mao (2001)
fas.sfu.ca/pub/cs/theses/2001/RunyingMaoMSc.pg.gz
Classification and Clustering Study in Incomplete Data Domain.—Rodas, Gramajo
www.lsi.upc.es/dept/techreps/ps/R01-11.pdf.gz
Modeling e-business with eBML—Lagha
inforge.unil.ch/yp/Pub/01-cimre.pdf
Engineering an Ontology for a Multi-Agents Corporate Memory System—Acacia (2001)
www-sop.inria.fr/acacia/personnel/Fabien.Gandon/research/ismick2001/article_fabien_gandon_ismick2001.pdf
A Rapidly Acquired Domain Model Derived from Markup Structure—Udo Kruschwitz Department
cswww.essex.ac.uk/staff/udo/papers/esslli.ps.gz
eBusiness Model Design, Classification and Measurements—Dubosson-Torbay
inforge.unil.ch/yp/Pub/01-thunderbird.pdf
Beyond Document Similarity: Understanding . . . —Paepcke . . .
www-db.stanford.edu/~cho/papers/info-filter.pdf
Lightweight Collaborative Filtering Method for . . . —Lightweight . . .
www.research.ibm.com/dar/papers/pdf/weiss_pkdd01.pdf
Mechanisms For Coping With Unfair Ratings And . . . —Chrysanthos . . . (2000)
ccs.mit.edu/dell/icis2000.pdf
The MARS Adaptive Social Network for Information Access . . . —Results Bin Yu
www4.ncsu.edu/~byu/papers/mars-experiments.pdf
An adaptive system for the personalized access to news—Ardissono, Console, Torre
www.di.unito.it/~liliana/EC/aiComm01.pdf
Web Usage Mining for a Better Web-Based Learning Environment—Zaïane (2001)
www.cs.ualberta.ca/~zaiane/postscript/CATE2001.pdf
Augmenting Recommender Systems by Embedding Interfaces . . . —Antonietta Grasso . . . (1999) www.xrce.xerox.com/research/ct/publications/Documents/P10226/content/HICSS-33.ps
Extending Recommender Systems: A Multidimensional Approach—Adomavicius, Tuzhilin
www.mineit.com/lc/ijcai/papers/adomavicius.pdf
MOVIES2GO—A new approach to online movie recommendation—Mukherjee, Dutta, Sen
www.mineit.com/lc/ijcai/papers/mukherjee.pdf
Passive Profiling from Server Logs in an Online Recruitment . . . —Barry
www.mineit.com/lc/ijcai/papers/rafter.pdf
A Theoretical Analysis of Query Selection for Collaborative . . . —Lee, Long
www.comp.nus.edu.sg/~leews/publications/colt01.ps
Experience in Ontology Engineering for a Multi-Agents Corporate . . . —Gandon (2001)
www-sop.inria.fr/acacia/personnel/Fabien.Gandon/research/IJCAI2001/article_fabien_gandon_ijcai2001.ps
Agent-Mediators In Media-On-Demand Eletronic Commerce—Joo Paulo Andrade
wwwhome.cs.utwente.nl/~guizzard/mod-amec-cuba.pdf
Improving the Effectiveness of Collaborative Filtering . . . —Mobasher, Dai, Luo . . .
www.mineit.com/lc/ijcai/papers/mobasher.pdf
http://www.inference.phy.cam.ac.uk/mackay/Bayes_FAQ.html
http://www-2.cs.cmu.edu/Groups/AI/html/faqs/ai/neural/faq.html
http://www.cs.stir.ac.uk/~lss/NNIntro/InvSlides.html
http://dir.yahoo.com/Science/Engineering/Electrical_Engineering/Neural_Networks/
http://www.aist.go.jp/NIBH/~b0616/Links.html
http://www.creative.net.au/~adrian/mirrors/neural/
http://www.fi.uib.no/Fysisk/Teori/NEURO/neurons.html
http://aass.oru.se/~tdt/ann/faq/FAQ.html
http://www.cis.hut.fi/~jari/research.html
http://www.eg3.com/WebID/elect/neur-net/blank/overview/a-z.htm
http://directory.google.com/Top/Computers/Artificial_Intelligence/Neural_Networks/
http://directory.google.com/Top/Computers/Artificial_Intelligence/Neural_Networks/FAQs,_Help,_and_Tutorials/
http://dmoz.org/Computers/Artificial_Intelligence/Neural_Networks/
http://dmoz.org/Computers/Artificial_Intelligence/Neural_Networks/FAQs,_Help,_and_Tutorials/
http://www.cs.qub.ac.uk/~J.Campbell/myweb/book/nn.html
http://www.cere.pa.cnr.it/IDAschool/lectures/neural.html
http://cognet.mit.edu/MITECS/Entry/jordan2
http://www.faqs.org/faqs/ai-faq/neural-nets/part1/preamble.html
http://zhanshou.hypermart.net/thesis.htm
http://www.links999.net/hardware/neural.html
http://www-ra.informatik.uni-tuebingen.de/links/neuronal/welcome_e.html
http://www.cogneuro.ox.ac.uk/links/ann.html
http://faculty.cs.tamu.edu/choc/resources/
http://www.galaxy.com/galaxy/Engineering-and-Technology/Electrical-Engineering/Neural-Networks/
http://mu.dmt.ibaraki.ac.jp/yanai/neu/faq/
http://bubl.ac.uk/link/n/neuralnetworks.htm
http://www.webopedia.com/TERM/n/neural_network.html http://www.ie.ncsu.edu/fangroup/neural.dir/indexneural.html
http://www.geneticprogramming.com/AI/nn.html
http://www.cs.utk.edu/~yarkhan/neural_networks.html
http://www.physiol.ox.ac.uk/~ket/nn.html
http://www.aaai.org/AITopics/html/neural.html
http://www.inference.phy.cam.ac.uk/mackay/itprnn/book.html
http://www.hh.se/staff/nicholas/NN_Links.html
http://xpidea.com/products/neurovcl/neuroabout.htm
http://www.msm.ele.tue.nl/research/neural/
http://homepages.goldsmiths.ac.uk/nikolaev/Nnets.htm
http://www.triumf.ca/project_ETA/neural_network.html
http://personal.bgsu.edu/~suny/nn.html
http://www.icmc.sc.usp.br/~andre/ann_links.html
http://www.stud.ntnu.no/~hirpa/links/AI_links.htm
http://it.umary.edu/Library/research/www_subjects/neural_networks.html
http://cindy.cis.netu.edu.tw/NN/NN5/www.html
http://www.public.iastate.edu/~acl/links/links.html
http://www.cs.cf.ac.uk/User/O.F.Rana/neural.html
http://www.cs.unr.edu/~bebis/CS791S/
http://www.geocities.com/fastiland/NNwww.html
http://cns-web.bu.edu/pub/snorrason/bookmarks/neural.html
http://www.open.brain.riken.go.jp/~cao/index_work.html
http://svr-www.eng.cam.ac.uk/research/neural/other_neural_net_sites.html See, U.S. Pat. Nos. 4,048,452; 4,737,983; 4,757,529; 4,893,301; 4,953,204; 5,073,890; 5,278,898; 5,309,513; 5,369,695; 5,506,898; 5,511,117; 5,519,773; 5,524,147; 5,590,188; 5,633,922; 5,633,924; 5,715,307; 5,740,240; 5,768,360; 5,825,869; 5,848,143; 5,870,464; 5,878,130; 5,901,214; 5,905,792; 5,907,608; 5,910,982; 5,915,011; 5,917,903; 5,923,745; 5,926,539; 5,933,492, 5,940,947; 5,946,387; 5,953,332; 5,953,332; 5,953,405; 5,956,397; 5,960,073; 5,963,632; 5,970,134; 5,978,465; 5,982,868; 5,987,116; 5,987,118; 5,991,391; 5,991,392; 5,991,395; 5,995,614; 5,995,615; 5,999,965; 6,002,760; 6,005,931; 6,004,146; 6,058,435; 6,061,347; 6,064,667; 6,072,864; 6,104,801; 6,115,462; 6,118,865; 6,122,358; 6,122,360; 6,122,364; 6,128,380; 6,134,530; 6,147,975; 6,157,655; 6,175,563; 6,175,564; 6,185,292; 6,223,165; 6,226,289; 6,229,888; 6,230,197; 6,233,332, 6,333,979; 6,333,980; 6347,139; and U.S. patent application Nos. 010000458 A1; 0010024497 A1; 0020006191 A1; 0020009190 A1; 0020019846 A1; and 0020021693 A1, each of which is expressly incorporated herein by reference.

Internet Auctions

On-line electronic auction systems which allow efficient sales of products and services are well known, for example, EBAY.COM, ONSALE.COM, UBID.COM, and the like. Inverse auctions that allow efficient purchases of product are also known, establishing a market price by competition between sellers. The Internet holds the promise of further improving efficiency of auctions by reducing transaction costs and freeing the "same time-same place" limitations of traditional auctions. This is especially appropriate where the goods may be adequately described by text or images, and thus a physical examination of the goods is not required prior to bidding.

In existing Internet systems, the technological focus has been in providing an auction system that, over the course of hours to days, allow a large number of simultaneous auctions, between a large number of bidders to occur. These systems must be scalable and have high transaction throughput, while assuring database consistency and overall system reliability. Even so, certain users may selectively exploit known technological limitations and artifacts of the auction system, including non-real time updating of bidding information, especially in the final stages of an auction.

Because of existing bandwidth and technological hurdles, Internet auctions are quite different from live auctions with respect to psychological factors. Live auctions are often monitored closely by bidders, who strategically make bids, based not only on the "value" of the goods, but also on an assessment of the competition, timing, psychology, and progress of the auction. It is for this reason that so-called proxy bidding, wherein the bidder creates a preprogrammed "strategy", usually limited to a maximum price, are disfavored. A maximum price proxy bidding system is somewhat inefficient, in that other bidders may test the proxy, seeking to increase the bid price, without actually intending to purchase, or contrarily, after testing the proxy, a bidder might give up, even below a price he might have been willing to pay. Thus, the proxy imposes inefficiency in the system that effectively increases the transaction cost.

In order to address a flurry of activity that often occurs at the end of an auction, an auction may be held open until no further bids are cleared for a period of time, even if advertised to end at a certain time. This is common to both live and automated auctions. However, this lack of determinism may upset coordinated schedules, thus impairing efficient business use of the auction system.

In order to facilitate management of bids and bidding, some of the Internet auction sites have provided non-Hypertext Markup Language (HTML) browser based software "applet" to track auctions. For example, ONSALE.COM has made available a Marimba Castanet® applet called Bidwatch to track auction progress for particular items or classes of items, and to facilitate bidding thereon. This system, however, lacks real-time performance under many circumstances, having a stated refresh period of 10 seconds, with a long latency for confirmation of a bid, due to constraints on software execution, quality of service in communications streams, and bid confirmation dialogue. Thus, it is possible to lose a bid even if an attempt was made prior to another bidder. The need to quickly enter the bid, at risk of being too late, makes the process potentially error prone.

Proxy bidding, as discussed above, is a known technique for overcoming the constraints of Internet communications and client processing limitations, since it bypasses the client and telecommunications links and may execute solely on the host system or local thereto. However, proxy bidding undermines some of the efficiencies gained by a live market.

U.S. Pat. No. 5,890,138 to Godin, et al. (Mar. 30, 1999), expressly incorporated herein by reference in its entirety, relates to an Internet auction system. The system implements a declining price auction process, removing a user from the auction process once an indication to purchase has been received. See, Rockoff, T. E., Groves, M.; "Design of an Internet-based System for Remote Dutch Auctions", Internet Research, v 5, n 4, pp. 10–16, MCB University Press, Jan. 01, 1995.

A known computer site for auctioning a product on-line comprises a least one web server computer designed for serving a host of computer browsers and providing the browsers with the capability to participate in various auctions, where each auction is of a single product, at a specified time, with a specified number of the product available for sale. The web server cooperates with a separate database computer, separated from the web server computer by a firewall. The database computer is accessible to the web computer server computer to allow selective retrieval of product information, which includes a product description, the quantity of the product to be auctioned, a start price of the product, and an image of the product. The web server computer displays, updated during an auction, the current price of the product, the quantity of the product remaining available for purchase and the measure of the time remaining in the auction. The current price is decreased in a predetermined manner during the auction. Each user is provided with an input instructing the system to purchase the product at a displayed current price, transmitting an identification and required financial authorization for the purchase of the product, which must be confirmed within a predetermined time. In the known system, a certain fall-out rate in the actual purchase confirmation may be assumed, and therefore some overselling allowed. Further, after a purchase is indicate, the user's screen is not updated, obscuring the ultimate lowest selling price from the user. However, if the user maintains a second browser, he can continue to monitor the auction to determine whether the product could have been purchased at a lower price, and if so, fail to confirm the committed purchase and purchase the same goods at a lower price while reserving the goods to avoid risk of loss. Thus, the system is flawed, and may fail to produce an efficient transaction or optimal price.

An Internet declining price auction system may provide the ability to track the price demand curve, providing valuable marketing information. For example, in trying to determine the response at different prices, companies normally have to conduct market surveys. In contrast, with a declining price auction, substantial information regarding price and demand is immediately known. The relationship between participating bidders and average purchasers can then be applied to provide a conventional price demand curve for the particular product.

U.S. Pat. No. 5,835,896, Fisher, et al., issued Nov. 10, 1998, expressly incorporated herein by reference in its entirety, provides method and system for processing and transmitting electronic auction information over the Internet, between a central transaction server system and remote bidder terminals. Those bids are recorded by the system and the bidders are updated with the current auction status information. When appropriate, the system closes the auction from further bidding and notifies the winning bidders and losers as to the auction outcome. The transaction server posts information from a database describing a lot available for purchase, receives a plurality of bids, stored in a bid database, in response to the information, and automatically categorizes the bids as successful or unsuccessful. Each bid is validated, and an electronic mail message is sent informing the bidder of the bid status. This system employs HTTP, and thus does not automatically update remote terminal screens, requiring the e-mail notification feature.

The auction rules may be flexible, for example including Dutch-type auctions, for example by implementing a price markdown feature with scheduled price adjustments, and English-type (progressive) auctions, with price increases corresponding to successively higher bids. In the Dutch type auction, the price markdown feature may be responsive to bidding activity over time, amount of bids received, and number of items bid for. Likewise, in the progressive auction, the award price may be dependent on the quantity desired, and typically implements a lowest successful bid price rule. Bids that are below a preset maximum posted selling price are maintained in reserve by the system. If a certain sales volume is not achieved in a specified period of time, the price is reduced to liquidate demand above the price point, with the new price becoming the posted price. On the other hand, if a certain sales volume is exceeded in a specified period of time, the system may automatically increase the price. These automatic price changes allow the seller to respond quickly to market conditions while keeping the price of the merchandise as high as possible, to the seller's benefit. A "Proxy Bidding" feature allows a bidder to place a bid for the maximum amount they are willing to pay, keeping this value a secret, displaying only the amount necessary to win the item up to the amount of the currently high bids or proxy bids of other bidders. This feature allows bidders to participate in the electronic auction without revealing to the other bidders the extent to which they are willing to increase their bids, while maintaining control of their maximum bid without closely monitoring the bidding. The features assures proxy bidders the lowest possible price up to a specified maximum without requiring frequent inquiries as to the state of the bidding.

A "Floating Closing Time" feature may also be implemented whereby the auction for a particular item is automatically closed if no new bids are received within a predetermined time interval, assuming an increasing price auction. Bidders thus have an incentive to place bids expeditiously, rather than waiting until near the anticipated close of the auction.

U.S. Pat. No. 5,905,975, Ausubel, issued May 18, 1999, expressly incorporated herein by reference in its entirety, relates to computer implemented methods and apparatus for auctions. The proposed system provides intelligent systems for the auctioneer and for the user. The auctioneer's system contains information from a user system based on bid information entered by the user. With this information, the auctioneer's system determines whether the auction can be concluded or not and appropriate messages are transmitted. At any point in the auction, bidders are provided the opportunity to submit not only their current bids, but also to enter future bids, or bidding rules which may have the opportunity to become relevant at future times or prices, into the auction system's database. Participants may revise their executory bids, by entering updated bids. Thus, at one extreme, a bidder who wishes to economize on his time may choose to enter his entire set of bidding rules into the computerized system at the start of the auction, effectively treating this as a sealed-bid auction. At the opposite extreme, a bidder who wishes to closely participate in the auction may choose to constantly monitor the auction's progress and to submit all of his bids in real time. See also, U.S. patent application Ser. No. 08/582,901 filed Jan. 4, 1996, which provides a method for auctioning multiple, identical objects and close substitutes.

E-Commerce System

U.S. Pat. No. 5,946,669 (Polk, Aug. 31, 1999), expressly incorporated herein by reference, relates to a method and apparatus for payment processing using debit-based electronic funds transfer and disbursement processing using addendum-based electronic data interchange. This disclosure describes a payment and disbursement system, wherein an initiator authorizes a payment and disbursement to a collector and the collector processes the payment and disbursement through an accumulator agency. The accumulator agency processes the payment as a debit-based transaction and processes the disbursement as an addendum-based transaction. The processing of a debit-based transaction generally occurs by electronic funds transfer (EFT) or by financial electronic data interchange (FEDI). The processing of an addendum-based transaction generally occurs by electronic data interchange (EDI).

U.S. Pat. No. 6,005,939 (Fortenberry, et al., Dec. 21, 1999), expressly incorporated herein by reference, relates to a method and apparatus for storing an Internet user's identity and access rights to World Wide Web resources. A method and apparatus for obtaining user information to conduct secure transactions on the Internet without having to re-enter the information multiple times is described. The method and apparatus can also provide a technique by which secured access to the data can be achieved over the Internet. A passport containing user-defined information at various security levels is stored in a secure server apparatus, or passport agent, connected to computer network. A user process instructs the passport agent to release all or portions of the passport to a recipient node and forwards a key to the recipient node to unlock the passport information.

U.S. Pat. No. 6,016,484 (Williams, et al., Jan. 18, 2000), expressly incorporated herein by reference, relates to a system, method and apparatus for network electronic payment instrument and certification of payment and credit collection utilizing a payment. An electronic monetary system provides for transactions utilizing an electronic-monetary system that emulates a wallet or a purse that is customarily used for keeping money, credit cards and other forms of payment organized. Access to the instruments in the wallet or purse is restricted by a password to avoid unauthorized payments. A certificate form must be completed in order to obtain an instrument. The certificate form obtains the information necessary for creating a certificate granting authority to utilize an instrument, a payment holder and a complete electronic wallet. Electronic approval results in the generation of an electronic transaction to complete the order. If a user selects a particular certificate, a particular payment instrument holder will be generated based on the selected certificate. In addition, the issuing agent for the certificate defines a default bitmap for the instrument associated with a particular certificate, and the default bitmap will be displayed when the certificate definition is completed. Finally, the number associated with a particular certificate will be utilized to determine if a particular party can issue a certificate.

U.S. Pat. No. 6,029,150 (Kravitz, Feb. 22, 2000), expressly incorporated herein by reference, relates to a system and method of payment in an electronic payment system wherein a plurality of customers have accounts with an agent. A customer obtains an authenticated quote from a specific merchant, the quote including a specification of goods and a payment amount for those goods. The customer sends to the agent a single communication including a request for payment of the payment amount to the specific merchant and a unique identification of the customer. The agent issues to the customer an authenticated payment advice based only on the single communication and secret shared between the customer and the agent and status information, which the agent knows about the merchant, and/or the customer. The customer forwards a portion of the payment advice to the specific merchant. The specific merchant provides the goods to the customer in response to receiving the portion of the payment advice.

U.S. Pat. No. 6,047,269 (Biffar, Apr. 4, 2000), expressly incorporated herein by reference, relates to a self-contained payment system with creating and facilitating transfer of circulating digital vouchers representing value. A digital voucher has an identifying element and a dynamic log. The identifying element includes information such as the transferable value, a serial number and a digital signature. The dynamic log records the movement of the voucher through the system and accordingly grows over time. This allows the system operator to not only reconcile the vouchers before redeeming them, but also to recreate the history of movement of a voucher should an irregularity like a duplicate voucher be detected. These vouchers are used within a self-contained system including a large number of remote devices that are linked to a central system. The central system can e linked to an external system. The external system, as well as the remote devices, is connected to the central system by any one or a combination of networks. The networks must be able to transport digital information, for example the Internet, cellular networks, telecommunication networks, cable networks or proprietary networks. Vouchers can also be transferred from one remote device to another remote device. These remote devices can communicate through a number of methods with each other. For example, for a non-face-to-face transaction the Internet is a choice, for a face-to-face or close proximity transactions tone signals or light signals are likely methods. In addition, at the time of a transaction a digital receipt can be created which will facilitate a fast replacement of vouchers stored in a lost remote device.

Micropayments

U.S. Pat. No. 5,999,919 (Jarecki, et al., Dec. 7, 1999), expressly incorporated herein by reference, relates to an efficient micropayment system. Existing software proposals for electronic payments can be divided into "on-line" schemes which require participation of a trusted party (the bank) in every transaction and are secure against overspending, and "off-line" schemes which do not require a third party and guarantee only that overspending is detected when vendors submit their transaction records to the bank (usually at the end of the day). A new "hybrid" scheme is proposed which combines the advantages of both "on-line" and "off-line" electronic payment schemes. It allows for control of overspending at a cost of only a modest increase in communication compared to the off-line schemes. The protocol is based on probabilistic polling. During each transaction, with some small probability, the vendor forwards information about this transaction to the bank. This enables the bank to maintain an accurate approximation of a customer's spending. The frequency of polling messages is related to the monetary value of transactions and the amount of overspending the bank is willing to risk. For transactions of high monetary value, the cost of polling approaches that of the on-line schemes, but for micropayments, the cost of polling is a small increase over the traffic incurred by the off-line schemes.

Micropayments are often preferred where the amount of the transaction does not justify the costs of complete financial security. In the micropayment scheme, typically a direct communication between creditor and debtor is not required; rather, the transaction produces a result which eventually results in an economic transfer, but which may remain outstanding subsequent to transfer of the underlying goods or services. The theory underlying this micropayment scheme is that the monetary units are small enough such that risks of failure in transaction closure is relatively insignificant for both parties, but that a user gets few chances to default before credit is withdrawn. On the other hand, the transaction costs of a non-real time transactions of small monetary units are substantially less than those of secure, unlimited or potentially high value, real time verified transactions, allowing and facilitating such types of commerce. Thus, the rights management system may employ applets local to the client system, which communicate with other applets and/or the server and/or a vendor/rights-holder to validate a transaction, at low transactional costs.

The following U.S. Patents, expressly incorporated herein by reference, define aspects of micropayment, digital certificate, and on-line payment systems: 5,930,777 (Barber, Jul. 27, 1999, Method of charging for pay-per-access information over a network); 5,857,023 (Jan. 5, 1999, Demers et al., Space efficient method of redeeming electronic payments); 5,815,657 (Sep. 29, 1998, Williams, System, method and article of manufacture for network electronic authorization utilizing an authorization instrument); 5,793,868 (Aug. 11, 1998, Micali, Certificate revocation system), 5,717,757 (Feb. 10, 1998, Micali, Certificate issue lists); 5,666,416 (Sep. 9, 1997, Micali, Certificate revocation system); 5,677,955 (Doggett et al., Electronic funds transfer instruments); 5,839,119 (Nov. 17, 1998, Krsul; et al., Method of electronic payments that prevents double-spending); 5,915,093 (Berlin et al.); 5,937,394 (Wong, et al.); 5,933,498 (Schneck et al.); 5,903,880 (Biffar); 5,903,651 (Kocher); 5,884,277 (Khosla); 5,960,083 (Sep. 28, 1999, Micali, Certificate revocation system); 5,963,924 (Oct. 5, 1999, Williams et al., System, method and article of manufacture for the use of payment instrument holders and payment instruments in network electronic commerce); 5,996,076 (Rowney et al., System, method and article of manufacture for secure digital certification of electronic commerce); 6,016,484 (Jan. 18, 2000, Williams et al., System, method and article of manufacture for network electronic payment instrument and certification of payment and credit collection utilizing a payment); 6,018,724 (Arent); 6,021,202 (Anderson et al., Method and system for processing electronic documents); 6,035,402 (Vaeth et al.); 6,049,786 (Smorodinsky); 6,049,787 (Takahashi, et al.); 6,058,381 (Nelson, Many-to-many payments system for network content materials); 6,061,448 (Smith, et al.); 5,987,132 (Nov. 16, 1999, Rowney, System, method and article of manufacture for conditionally accepting a payment method utilizing an extensible, flexible architecture); 6,057,872 (Candelore); and 6,061,665 (May 9, 2000, Bahreman, System, method and article of manufacture for dynamic negotiation of a network payment framework). See also, Rivest and Shamir, "PayWord and MicroMint: Two Simple Micropayment Schemes" (May 7, 1996); Micro PAYMENT transfer Protocol (MPTP) Version 0.1 (22 Nov. 1995) et seq., http://www.w3.org/pub/WWW/TR/WD-mptp; Common Markup for web Micropayment Systems, http://www.w3.org/TR/WD-Micropayment-Markup (9 Jun. 1999); "Distributing Intellectual Property: a Model of Microtransaction Based Upon Metadata and Digital Signatures", Olivia, Maurizio, http://olivia.modlang.denison.edu/~olivia/RFC/09/, all of which are expressly incorporated herein by reference.

See, also: 4,977,595 (Dec. 11, 1990, Method and apparatus for implementing electronic cash); 5,224,162 (Jun. 29, 1993, Electronic cash system); 5,237,159 (Aug. 17, 1993, Electronic check presentment system); 5,392,353 (February 1995, Morales, TV Answer, Inc. Interactive satellite broadcast network); 5,511,121 (Apr. 23, 1996, Efficient electronic money); 5,621,201 (April 1997, Langhans et al., Visa International Automated purchasing control system); 5,623,547 (Apr. 22, 1997, Value transfer system); 5,679,940 (October 1997, Templeton et al., TeleCheck International, Inc. Transaction system with on/off line risk assessment); 5,696,908 (December 1997, Muehlberger et al., Southeast Phonecard, Inc. Telephone debit card dispenser and method); 5,754,939 (May 1998, Herz et al., System for generation of user profiles for a system for customized electronic identification of desirable objects); 5,768,385 (Jun. 16, 1998, Untraceable electronic cash); 5,799,087 (Aug. 25, 1998, Electronic-monetary system); 5,812,668 (Sep. 22, 1998, System, method and article of manufacture for verifying the operation of a remote transaction clearance system utilizing a multichannel, extensible, flexible architecture); 5,828,840 (Oct. 27, 1998, Server for starting client application on client if client is network terminal and initiating client application on server if client is non network terminal); 5,832,089 (Nov. 3, 1998, Off-line compatible electronic cash method and system); 5,850,446 (Dec. 15, 1998, System, method and article of manufacture for virtual point of sale processing utilizing an extensible, flexible architecture); 5,889,862 (Mar. 30, 1999, Method and apparatus for implementing traceable electronic cash); 5,889,863 (Mar. 30, 1999, System, method and article of manufacture for remote virtual point of sale processing utilizing a multichannel, extensible, flexible architecture); 5,898,154 (Apr. 27, 1999, System and method for updating security information in a time-based electronic monetary system); 5,901,229 (May 4, 1999, Electronic cash implementing method using a trustee); 5,920,629 (Jul. 6, 1999, Electronic-monetary system); 5,926,548 (Jul. 20, 1999, Method and apparatus for implementing hierarchical electronic cash); 5,943,424 (Aug. 24, 1999, System, method and article of manufacture for processing a plurality of transactions from a single initiation point on a multichannel, extensible, flexible architecture); 5,949,045 (Sep. 7, 1999, Micro-dynamic simulation of electronic cash transactions); 5,952,638 (Sep. 14, 1999, Space efficient method of electronic payments); 5,963,648 (Oct. 5, 1999, Electronic-monetary system); 5,978,840 (System, method and article of manufacture for a payment gateway system architecture for processing encrypted payment transactions utilizing a multichannel, extensible, flexible architecture); 5,983,208 (Nov. 9, 1999, System, method and article of manufacture for handling transaction results in a gateway payment architecture utilizing a multichannel, extensible, flexible architecture); 5,987,140 (Nov. 16, 1999, System, method and article of manufacture for secure network electronic payment and credit collection); 6,002,767 (Dec. 14, 1999, System, method and article of manufacture for a modular gateway server architecture); 6,003,765 (Dec. 21, 1999, Electronic cash implementing method with a surveillance institution, and user apparatus and surveillance institution apparatus for implementing the same); 6,021,399 (Feb. 1, 2000, Space efficient method of verifying electronic payments); 6,026,379 (Feb. 15, 2000, System, method and article of manufacture for managing transactions in a high availability system); 6,029,150 (Feb. 22, 2000, Payment and transactions in electronic commerce system); 6,029,151 (Feb. 22, 2000, Method and system for performing electronic money transactions); 6,047,067 (Apr. 4, 2000, Electronic-monetary system); 6,047,887 (Apr. 11, 2000, System and method for connecting money modules); 6,055,508 (Apr. 25, 2000, Method for secure accounting and auditing on a communications network); 6,065,675 (May 23, 2000, Processing system and method for a heterogeneous electronic cash environment); 6,072,870 (Jun. 6, 2000, System, method and article of manufacture for a gateway payment architecture utilizing a multichannel, extensible, flexible architecture), each of which is expressly incorporated herein by reference.

Game Theory
GEB: Games and Economic Behavior
EMA: Econometrica
JET: Journal of Economic Theory
IJGT: International Journal of Game Theory
AER: American Economic Review QJE: Quarterly Journal of Economics
JPE: Journal of Political Economy
REStud: Review of Economic Studies
Description of games
Roger Myerson, Nash Equilibrium and the History of Economic Theory, JEL 1999
Rationality, Dominance, Weak Dominance etc
Douglas Bernheim, Rationalizable strategic behavior, EMA 1984
David Pearce, Rationalizable strategic behavior and the problem of perfection. EMA 1984
Douglas Bernheim. Axiomatic characterization of rational choice of strategic environments.
Scand. J. of E. 1986
Shimoji and Watson, Conditional Dominance, rationalizability and game forms. JET 1998
David Roth, Rationalizable predatory pricing. JET 1996
Basu and Weibul, strategy subsets closed under rational behavior. E. Letters 1991
Larry Samuelson, Dominated strategies and common knowledge. GEB 1992
Marx and Swinkels, Order independence for iterated weak dominance. GEB 1997
Equilibrium: Nash, Refinements, Correlated
Selten, Reexamination of the Perfectness concept for equilibrium points in extensive form games. IJGT 1975.
Myerson, Refinements of the Nash equilibrium concept. IJGT 1975.
Kalai and Samet, Persistent equilibria in strategic games. IJGT 1984.
Kohlberg and Mertens, On the strategic stability of Equilibria. Econometrica, 1986.
Aumann, Correlated equilibria as an expression of baysian rationality. Econometrica, 1987.
Aumann and Brandenberger, Espitemic conditions for equilibrium. EMA 1995
Hal Varian, A model of Sales. AER 1980
The extensive form games for perfect information
Rubinstein, On the interpretation of game theory. Econometrica 1991
Reny, Common beleifs and the theory of games with perfect information. JET 1993.
Aumann Backward induction and common knowledge of rationality. GEB 1995
Binmore, A note on backware induction: Aumann, Reply to Binmore, GEB 1996
Selten, A Reexamination of the perfectness . . .
Hyperbolic Discounting
O'Donoghue and Rabin, Doing it now or doing it later. AER 1999
David Laibson, Golden Eggs and Hyperbolic Discounting. QJE 1997
The Economics of Altruism
Gary Becker, A theory of social interactions. JPE 1974
Ted Bergstrom, A fresh look at the rotten kid theorem and other household mysteries. JPE 1980
Bernheim and Stark, Altruism within the family reconsidered: do nice guys finish last. AER 1988
Lindbeck and Weibull, Altruism and time consistency: the economics of fait accompli. JPE 1988
Bruce and Waldman, Transfers in kind: why they can be efficient and non-paternalistic. AER 1991
Jack Robles, Paternal altruism or smart parent altruism? CU WP 98-10
Mathew Rabin, Incorperating fairness into economics and game theory. AER 1993
Ray and Ueda, Egalitarianism and incentives. JET 1996
Bernheim, Shleifer adn Summers, The strategic bequest motive. JPE 1985
Extensive form games without perfect information
Kreps and Wilson, Sequential Equilibrium. Econometrica, 1983
Van Damme, Stable Equilibria and forward induction. JET 1989.
Strategic Information Transmission
Crawford and Sobel, Strategic information transmission. Econometrica 1982.
Cho and Kreps, Signalling games and stable equilibria. QJE 1987
Mailath, Okuno-Fujiwara and Postlewaite, Beleif based refinements in signalling games. JET 1993
Milgrom and Roberts, Limit pricing and entry under incomplete information: an equilibrium analysis. EMA 1982 (pages 443–459)
Cho and Sobel, Strategic Stability and uniqueness in signalling games. JET 1990.
Farrell, Meaning and credibility in cheap talk gams. GEB
Milgrom and Roberts, Limit pricing and entry under incomplete information, an equilibrium analysis, EMA 1982
Milgrom, Good news and bad news, representation and applications, Rand.
Folk Theorems for Repeated Games
Dilip Abreu. On the theory of infinitely repeated games with Discounting. Econometrica 1988
Benoit and Krishna. Finitely Repeated games. Econometrica, 1985.
James Friedman. A noncooperative equilibrium for supergames. REStud 1971.
James Friedman. Cooperative equilibria in finite horizon supergames. JET 1985.
Fudenberg and Maskins. The Folk Theorem in repeated gmaes with discounting or with incomplete information. Econometrica 1986.
Roy Radner, Collusive Behavior in non-cooperative epsilon equilibria in oligopolies with long but finite lives. JET 1980.
Ariel Rubinstein. Equilibrium in supergames with the overtaking criterion. JET 1977.
Renegotiation
Benoit and Krisna, Renegotiation in finitely repeated games. EMA 1993
Bergin and MacCleod, Efficiency adn renegotiation in repeated games. JET 1993
Andreas Blume, Interplay communication in repeated games. GEB 1994
Geir Asheim, Extending renegotiation proofness to infinite horizon games. GEB 1991
Bernheim and Ray, Collective dynamic consistency in repeated games. GEB 1989
Furrel and Maskin, Renegotiation in Repeated Games. GEB 1989
Cooperative Game Theory
Freidman, Game theory with applications to economics chapter 6 and 7
Nash, The Bargaining problem. EMA 1950
Kalai and Smordinski, Other Solutions to Nash's problem. EMA 1975
Noncooperative Bargaining
Rubinstein, Perfect equiibrium in a bargaining model. EMA 1982
Joel Watson, Alternating offer bargaining with two sided incomplete information. REStud 1999

Reputation

Kreps, Milgrom, Roberts and Wilson, Reputation and imperfect information: predation, reputation and entry deterence: rational cooperation in the finitely repeated prisoner's dilemna. JET 1981

Aumann and Sorin, Cooperation and Bounded recal. GEB 1989

Klaus Schmidt, Reputation and equilibrium characterization in repeated games with conflicting interests, Econometrica 1993, 325–352

Cripps and Thomas, Reputation and Commitment in Two person games without discounting, EMA, 1995, 1401–1420

Joel Watson, A reputation refinement withough equilibrium, EMA 1993, 199–206

Celentani, Fudenberg and Levine, Maintaining a reputation against a long lived opponent EMA 1996, 691–704

Evolutionary Game Theory

Vince Crawford, An Evolutionary interpretation of VHBB's experimental results on coordination. GEB 1991

Gilboa and Matsui, Social Stability and Equilibrium, EMA 1991

Kandori, Mailath and Rob, Learning, Mutation, and Long Run Equilibria in games, EMA 1993.

Peyton Young, An Evolutionary Model of Bargaining, JET 1993

Peyton Young, The Evolution of Conventions, EMA 1993

Larry Samuelson, Stochastic Stability with alternative best replies. JET

Noldeke and Samuelson, The Evolution of Backwards and Forwards Induction, GEB 1993

Jack Robles, An Evolutionary Folk Theorem For Finitely Repeated Games CU WP 99–

Kim and Sobel, An Evolutionary Approach to Preplay Communication EMA 1995

General Game Theory

Bierman H. S. & Fernandez L., Game Theory with Economic Applications, Addison-Wesley, 1993.

Dixit A., & Nalebuff B., Thinking Strategically: the Competitive Edge in Business, Politics, and Everyday Life, New York: Norton, 1991.

McMillan J., Games, Strategies, and Managers, Oxford: OUP, 1992.

Baird D. G., Gertner R. H., and Picker R. C., Game Theory and the Law, Harvard U.P., 1994.

Rasmusen E., Games and Information: An Introduction to Game Theory, Oxford: B. Blackwell, 2nd edition, 1994.

Ghemawat P., Games Businesses Play: Cases and Models, New York: Wiley, 1995.

Gardner R., Games for Business and Economics, New York: Wiley, 1995.

Strategic Decision Making

Dixit & Nalebuff, Intro; Ch2 Anticipating your rival's response;

Ch3 Seeing through your rival's response.

Barnett, F. W. Making game theory work in practice, Wall Street Journal, 1995.

Bierman & Fernandez, Ch5 Nash equilibrium I, Ch11 Nash equilibrium II

O'Neill B., International escalation and the dollar auction, Journal of Conflict Resolution, 1986.

Schelling T. C., Ch7 Hockey helmets, daylight saving, and other binary choices, in his Micromotives and Macrobehavior, NY: Norton, 1978.

Marks R. E., Competition and common property, 1998.

McMillan J., Ch3 Understanding cooperation and conflict.

McAfee R. P. & J. McMillan, Competition and game theory, Journal of Marketing Research, 1996.

Baird, Gertner, & Picker, Ch1 Simultaneous decision-making and the normal form game.

Gardner, Ch1 Introduction, Ch2 Two-person games, Ch16 Voting games.

Rasmusen, Ch1 The rules of the game.

Schelling T. C., What is game theory? in his Choice and Consequence: Perspectives of an Errant Economist, Camb.: Harvard UP, 1980.

Decision Analysis—Games Against Nature

Apocalpse maybe, and An insurer's worst nightmare, The Economist, 1995/96

Bierman & Fernandez, Chs 1–3.

Ulvila, J. W. & R. Brown, Decision analysis comes of age, Harvard Buisness Review 1982.

Howard R. A., Decision analysis: practice and promise, Management Science, 1988.

Clemen R. T., Making Hard Decisions: An Introduction to Decision Analysis, Belmont, Calif.: Duxbury, 1996.

Samson D., Chs 2–6, 11, Managerial Decision Analysis, Chicago: R. D. Irwin, 1988.

Strategic Moves

Dixit & Nalebuff, Ch5 Strategic moves.

Brams S. J. & J. M. Togman, Cooperation through threats: the Northern Ireland cases, PS: Political Science & Politics, March 1998.

Gardner, Ch4 n-person games, Ch5 Non-cooperative games.

Colman A. M., Ch8 Multi-person games: social dilemmas, in his Game Theory and Experimental Games, Oxford: Pergamon, 1982.

Kay J., Ch3 Co-operation and Co-ordination, in his Foundations of Corporate Success: How Business Strategies Add Value, Oxford: OUP, 1993.

Brams S. J., Ch1 International relations games, in Game Theory and Politics, NY: Macmillan, 1975.

Credible Commitment

Dixit & Nalebuff, Ch6 Credible commitments.

Bierman & Fernandez, Ch23 Subgame-perfect equilibrium

Rasmusen, Ch4.1 Subgame perfection.

Gardner, Ch6 Credibility and subgame perfection.

Ghemawat, Ch3 Preemptive capacity expansion in the titanium dioxide industry.

Repetition and Reputation

Dixit & Nalebuff, Ch4 Resolving the Prisoner's Dilemma; Ch9 Cooperation and coordination.

Nowak, M., R. May, & K. Sigmund, The arithmetic of mutual help, Scientific American, 1995

Hofstadter D., Ch29 The Prisoner's Dilemma computer tournaments and the evolution of cooperation, in his Metamagical Themas, Penguin, 1985.

Marks R. E., Midgley FD. F., & Cooper L. G., Adaptive behaviour in an oligopoly, in Evolutionary Algorithms in Management Applications, ed. by J. Biethahn & V. Nissen, (Berlin: Springer-Verlag), 1995.

Baird Gertner & Picker, Ch2 Dynamic interaction and the extensive-form game, Ch5 Reputation and repeated games.

Gardner, Ch7 Repeated games, Ch8 Evolutionary stability and bounded rationality.

Rasmusen, Ch4 Dynamic games and symmetric information, Ch5 Reputation and repeated games with symmetric information.

Unpredictability

Dixit & Nalebuff, Ch7 Unpredictability; Ch8 Brinkmanship.

Bierman & Fernandez, Ch11.9

Gardner, Ch3 Mixed strategies.

Rasmusen, Ch3 Mixed and continuous strategies.

Bargaining

Dixit & Nalebuff, Ch10 The voting strategy; Ch11 Bargaining.

McMillan, Ch5 Gaining bargaining power; Ch6 Using information strategically.

Elster, J., Ch14 Bargaining, in Nuts and Bolts for the Social Sciences, Camb.: CUP, 1989

Murnighan J. K., Game's End, Chapter 15 in his: Bargaining Games: A New Approach to Strategic Thinking in Negotiations, NY: William Morrow, 1992.

Bierman & Fernandez, Ch6 Bargaining.

Schelling T. C., Ch2 Essay on bargaining, in The Strategy of Conflict. Camb.: Harvard UP, 1980.

Baird Gertner & Picker, Ch7 Noncooperative bargaining

Gardner, Ch12 Two-person bargains. Ch14 n-person bargaining and the core.

Rasmusen, Ch11 Bargaining.

Brams S. J., Negotiation Games: Applying Game Theory to Bargaining and Arbitration, NY: Routledge, 1990.

Using Information Strategically

McMillan, Ch6 Using information strategically

Bierman & Fernandez, Ch17 Bayesian equilibrium, Ch19 Adverse selection and credit rationing Rasmusen, Ch2 Information P-13

Baird Gertner & Picker, Ch4 Signalling, screening, and nonverifiable information Gardner, Ch9 Signaling games.

Bidding in Competition

Revenge of the nerds, It's only a game, and Learning to play the game, The Economist, 1994

Landsburg S. E., Cursed winners and glum losers, Ch18 of his The Armchair Economist: Economics and Everyday Life, New York: The Free Press, 1993.

Norton, R., Winning the game of business, Fortune, 1995.

Koselka, R., Playing poker with Craig McCaw, Forbes, 1995.

Dixit & Nalebuff, Ch12 Incentives.

McMillan, Ch11 Bidding in competition

McAfee R. P. & J. McMillan, Analyzing the airwaves auction, Journal of Economic Perspectives, 1996

R. Marks, Closed tender vs. open bidding auctions, 22 Dec., 1994.

The Economist, Secrets and the prize, 12 Oct. 1996, p.98.

Scientific American, Making honesty pay, January 1997, p.13.

Gardner, Ch11 Auctions.

Brams S. J. & A. D. Taylor, Fair division by auctions, Ch9 of their Fair Division: From Cake-Cutting to Dispute Resolution, Cambridge: CUP, 1996.

Rasmusen, Ch12 Auctions.

Contracting, or the Rules of the Game

Kay, Ch4 Relationships and contracts.

Dixit & Nalebuff, Ch12 Incentives.

McMillan, Ch8 Creating incentives; Ch9 Designing contracts; Ch10 Setting executives' salaries.

Williamson O. E., Strategizing, economizing, and economic organization, Strategic Management Journal, 1991.

Bierman & Fernandez, Ch7 Involuntary unemployment.

Gardner, Ch10 Games between a principal and an agent.

Milgrom P. & Roberts J., Ch5 Bounded rationality and private information; Ch6 Moral hazard and performance incentives. Economics, Organization and Management, Englewood Cliffs: Prentice-Hall, 1992.

Choosing the Right Game: Co-opetition

Brandenburger A. M. & B. J. Nalebuff, The right game: using Game Theory to shape strategy, Harvard Business Review, 1995 http://mayet.som.yale.edu/coopetition/index2.html

Koselka R., Businessman's dilemma, and Evolutionary economics: nice guys don't finish last, Forbes, Oct. 11, 1993.

Brandenburger A. M. & B. J. Nalebuff, Co-opetition: 1. A revolutionary mindset that combines competition and cooperation; 2. The Game Theory Strategy that's changing the game of business. New York: Currency Doubleday, 1996.

Brandenburger A. M. & Harborne W. S. Jr., Value-based business strategy, Journal of Economics and Management Strategy, 5(1), 1996.

Baird Gertner & Picker, Ch6 Collective action, embedded games, and the limits of simple models.

Morrow J. D., Game Theory for Political Scientists, Princeton: P.U.P., 1994.

Casson M., The Economics of Business Culture: Game Theory, Transaction Costs and Economic Performance, Oxford: OUP, 1991.

Schelling T. C., Altruism, meanness, and other potentially strategic behaviours, American Economic Review, 68(2): 229–231, May 1978.

Crawford V. P., Thomas Schelling and the analysis of strategic behavior, in Strategy and Choice, ed. by R. J. Zeckhauser, MIT Press, 1991.

For a history of game theory since Old Testament times, point your browser at the following URL: http://www-.canterbury.ac.nz/econ/hist.htm For further surfing on the 'Net about game theory, start at the following URLs: http://www.pitt.edu/~alroth/alroth.html Eddie Dekel, Drew Fudenberg and David K. Levine, Learning to Play Bayesian Games (Jun. 20, 2001).

http://www.gametheory.net/html/lectures.html

Drew Fudenberg and David K. Levine, The Nash Threats Folk Theorem With Communication and Approximate Common Knowledge in Two Player Games (Jun. 10, 2002).

See also,

PAT. NO. Title 6,243,684 Directory assistance system and method utilizing a speech recognition system and a live operator 6,230,197 Method and apparatus for rules-based storage and retrieval of multimedia interactions within a communication center 6,229,888 System and method for operating a plurality of call centers 6,226,360 System and method for delivery of pre-recorded voice phone messages 6,226,287 System and method for integrating voice on network with traditional telephony 6,212,178 Method and apparatus for selectively presenting media-options to clients of a multimedia call center 6,208,970 Method and system for estimation of a source of a voice signal 6,205,207 Telephone transaction processing as a part of a call transport 6,201,950 Computer-controlled paging and telephone communication system and method 6,192,413 Method and system for process queue communications routing 6,192,121 Telephony server application program interface API 6,185,283 Telephone system providing personalized telephone features 6,178,240 Method and apparatus for entertaining callers in a queue
6,173,052 Blending communications in a call center
6,170,011 Method and apparatus for determining and initiating interaction directionality within a multimedia communication center
RE37,001 Interactive call processor to facilitate completion of queued calls
6,157,711 Multiple party telephone control system
6,154,535 Methods and system for obtaining processing information relating to a communication
6,154,528 System and method for storing and transferring information tokens in a low network communication
6,151,387 Telephonic-interface game control system
6,148,065 Telephonic-interface statistical analysis system
6,144,737 Trunk interface circuit having function of battery feed to central office
6,137,870 System for providing caller information to called party via call standard data field
6,137,862 Failover mechanism for computer/telephony integration monitoring server
6,134,530 Rule based routing system and method for a virtual sales and service center
6,130,937 System and process for automatic storage, enforcement and override of consumer do-not-call requests
6,128,376 Change of equal access carrier notification
6,125,178 Method and apparatus for enabling interaction between callers with calls positioned in a queue
6,122,484 Method and apparatus for processing telephone calls
6,122,364 Internet network call center
6,122,358 Operator connection control method
6,115,693 Quality center and method for a virtual sales and service center
6,102,970 System and method for optimizing a program containing a number of the flows through flow branches
6,098,069 Data managing method and data managing device using the same for manipulating data independently from networks
6,097,806 ACD with multi-lingual agent position
6,084,943 Diagnostic device for a telephone system
6,070,142 Virtual customer sales and service center and method
6,067,348 Outbound message personalization
6,064,973 Context manager and method for a virtual sales and service center
6,064,731 Arrangement for improving retention of call center's customers
6,064,730 Customer-self routing call center
6,058,435 Apparatus and methods for responding to multimedia communications based on content analysis
6,055,307 System and method for selecting agent destinations and monitoring calls made to network customers
6,052,453 Coin operated telephone auditor
6,049,599 Churn amelioration system and method therefor
6,044,368 Method and apparatus for multiple agent commitment tracking and notification
6,044,149 Device for detecting DTMF tones
6,044,135 Telephone-interface lottery system
6,041,118 Architecture for telephone set
6,041,116 Method and apparatus for controlling outbound calls
6,035,021 Telephonic-interface statistical analysis system
6,031,899 Method and apparatus for identifying type of call
6,026,156 Enhanced call waiting
6,026,149 Method and apparatus for managing telecommunications
6,021,428 Apparatus and method in improving e-mail routing in an internet protocol network telephony call-in-center
6,021,190 Method and apparatus for receiving and processing an incoming call
6,021,114 Method and system for utilizing communications lines
6,018,579 Call center services for local calls using local number portability
6,016,344 Telephonic-interface statistical analysis system
6,014,439 Method and apparatus for entertaining callers in a queue
6,011,845 Method and system for two-way call holding using an intelligent communication device
6,009,149 Automated calling system with database updating by callee
6,005,928 Method and system for automatic distribution addressing
6,005,534 Digital information system
6,002,760 Intelligent virtual queue
5,995,948 Correspondence and chargeback workstation
RE36,416 Method and apparatus for dynamic and interdependent processing of inbound calls and outbound calls
5,991,761 Method of reorganizing a data entry database
5,991,604 Ring detecting circuit and method for wireless/wired composite telephone
5,991,393 Method for telephony call blending
5,987,116 Call center integration with operator services databases
5,987,115 Systems and methods for servicing calls by service agents connected via standard telephone lines
5,982,857 Voice recording method and system providing context specific storage and retrieval
5,978,471 Method and device for detecting a ringtrip
5,978,467 Method and apparatus for enabling interaction between callers with calls positioned in a queue
5,978,465 Method and apparatus for allocating resources in a call center
5,974,135 Teleservices computer system, method, and manager application for integrated presentation of concurrent interactions with multiple terminal emulation sessions
5,974,120 Telephone interface call processing system with call selectivity
5,970,132 Call distributor
5,966,429 Telephone transaction processing as a part of a call transport
5,963,635 Method and apparatus for providing result-oriented customer service
5,956,392 Private branch exchange apparatus
5,949,863 Coin operated telephone auditor
5,949,854 Voice response service apparatus
5,949,852 Method for recording messages for absent parties
5,946,394 Isolation amplifier with hook switch control
5,946,388 Method and apparatus for priority queuing of telephone calls
5,943,403 Customized, billing-controlled call bridging system
5,940,813 Process facility management matrix and system and method for performing batch, processing in an on-line environment
5,940,497 Statistically-predictive and agent-predictive call routing
5,940,493 System and method for providing directory assistance information
5,937,390 On-line advertising system and its method 5,937,055 Method and apparatus for routing telephone calls between alternate telephone service providers
5,933,480 Method for billing and controlling fraud in providing pay information services
5,930,339 Leaving a message on a held connection
5,926,528 Call pacing method
5,924,016 Control and monitoring apparatus and method for a telephone system
5,923,746 Call recording system and method for use with a telephonic switch
5,918,213 System and method for automated remote previewing and purchasing of music, video, software, and other multimedia products
5,917,893 Multiple format telephonic interface control system
5,914,951 System and method for controlling and monitoring communication between customers and customer service representatives
5,913,195 System and method for developing VRU voice dialogue
5,912,947 Public notification system and method
5,907,601 Call pacing method
5,905,979 Abstract manager system and method for managing an abstract database
5,903,641 Automatic dynamic changing of agents' call-handling assignments
5,901,209 Caller ID substitution for selected telephone callers
5,898,762 Telephonic-interface statistical analysis system
5,898,759 Telephone answering machine with on-line switch function
5,896,446 Coin operated telephone auditor
5,894,505 Telephone answering machine
5,893,902 Voice recognition bill payment system with speaker verification and confirmation
5,878,126 Method for routing a call to a destination based on range identifiers for geographic area assignments
5,872,833 Telephone transaction processing as a part of a call transport
5,867,572 Customer queuing arrangement
5,867,564 Time-of-day clock synchronization in communications networks
5,867,559 Real-time, on-line, call verification system
5,857,013 Method for automatically returning voice mail messages
5,854,832 Monitoring system and method used in automatic call distributor for timing incoming telephone calls
5,850,428 Message management system and method
5,848,143 Communications system using a central controller to control at least one network and agent system
5,841,852 Method and system for telecommunications language support
5,838,779 Adjunct controller for a telephone system
5,838,772 Voice services equipment
5,835,572 Customized, billing controlled call bridging system
5,828,734 Telephone interface call processing system with call selectivity
5,828,731 Method and apparatus for non-offensive termination of an outbound call and for detection of an answer of an outbound call by an answering machine
5,825,869 Call management method and system for skill-based routing
5,822,410 Churn amelioration system and method therefor
5,822,401 Statistical diagnosis in interactive voice response telephone system
5,822,400 Call record scheduling system and method
5,815,566 Apparatus and method for dynamic inbound/outbound call management and for scheduling appointments
5,815,554 Method and system for indicating operator availability
5,815,551 Telephonic-interface statistical analysis system
5,812,642 Audience response monitor and analysis system and method
5,806,071 Process and system for configuring information for presentation at an interactive electronic device
5,799,077 Method of and apparatus for automatic dialing
5,796,816 Device and method for cleaning telephone number list
5,796,791 Network based predictive dialing
5,793,846 Telephonic-interface game control system
5,787,159 Use of caller ID information
5,787,156 Telephonic-interface lottery system
5,774,537 Method and apparatus for displaying multiple languages in key phone system
5,768,355 Three-way call detection system
5,761,285 Universal telephony application client that is configurable from a profile for a telphone call campaign
5,748,711 Telephone transaction processing as a part of call transport
5,742,675 Method and apparatus for automatically distributing calls to available logged-in call handling agents
5,740,233 System and method for statistical diagnosis of the operation of an automated telephone system
RE35,758 Voice/data-formated telephone information storage and retrieval system
5,729,600 Automatic call distributor with automated voice responsive call servicing system and method
5,727,154 Program synchronization on first and second computers by determining whether information transmitted by first computer is an acceptable or unacceptable input to second computer program
5,724,418 Call distributor
5,717,741 Method for handling telephonic messages
5,703,935 Automated telephone operator services
5,701,295 Variable communication bandwidth for providing automatic call back and call hold
5,699,418 Telephone circuit
5,696,818 Delay announcement group and time controller for a telephone system
5,696,809 Advanced intelligent network based computer architecture for concurrent delivery of voice and text data using failure management system
5,692,034 Customized, billing-controlled call bridging system
5,692,033 AIN queuing for call-back system
5,687,225 System for adding outbound dialing to inbound call distributors
5,684,863 Telephonic-interface statistical analysis system
5,675,637 Method for automatically obtaining and presenting data from multiple data sources
5,661,283 Automated patching between ATM and consultant
5,657,074 Apparatus for reproducing still images with music
5,655,014 Switching device independent computer-telephone integration system
5,655,013 Computer-based method and apparatus for controlling, monitoring, recording and reporting telephone access
5,652,788 Key telephone apparatus
5,646,988 Incoming call controller for preferentially connecting a waiting call based on number of previous unsuccessful call attempts 5,646,986 Network communication system with global event calendar information and trunk allocation
5,638,436 Voice detection
5,636,268 Communication system with queues
5,636,267 Cleaning system for telephone number list
5,633,917 Remote-control telephone answering system and method
5,625,682 Help desk improvement
5,625,676 Method and apparatus for monitoring a caller's name while using a telephone
5,619,557 Telephone switching system and method for controlling incoming telephone calls to remote agents and for collecting and providing call data
5,610,978 Ring discriminator
5,610,774 Audio sound recording/reproducing apparatus using semiconductor memory
5,600,710 Method for providing a recorded message to a telephone caller when called number is busy
5,594,791 Method and apparatus for providing result-oriented customer service
5,594,790 Method for selecting and controlling the automatic dialing of a call record campaign
5,592,543 Method and system for allocating agent resources to a telephone call campaign
5,590,171 Method and apparatus for communications monitoring
5,588,049 Method for the automatic insertion of removal of a calling number identification (CNID) blocking prefix from within a telephone number in a personal computer based telephone management system
5,586,179 System and method for adding and integrating outbound calling and overall system control to an existing inbound telephone system
5,581,607 Customized, billing-controlled call bridging system
5,581,604 Method and apparatus for processing an incoming call in a communication system
5,581,602 Non-offensive termination of a call detection of an answering machine
5,579,383 Calling terminal controlled call coverage
5,579,377 Remote-control telephone answering system and method
5,577,112 Telephony system with supervisory management center and parameter testing with alerts
5,574,784 Dynamic admission control for telecommunications relay service with text-to-speech synthesis
5,572,586 Communication control apparatus and method and communication exchange apparatus and method
5,572,576 Telephone answering device linking displayed data with recorded audio message
5,570,419 System and method for an improved predictive dialer
5,568,540 Method and apparatus for selecting and playing a voice mail message
5,561,711 Predictive calling scheduling system and method
5,559,878 Telephonic communications answering and callback processing system
5,559,867 Automated calling system with database updating
5,557,668 Call distribution system with distributed control of calls and data distribution
5,555,295 Service and information management system for a telecommunications network
5,555,290 Long distance telephone switching system with enhanced subscriber services
5,546,456 Telecommunication system with inbound call responsive predictive outdialing system and method
5,546,452 Communications system using a central controller to control at least one network and agent system
5,544,232 Call distributor with automatic preannouncement system and method
5,544,220 System for integrating a stand alone inbound automatic call distributor and an outbound automatic call dialer
5,537,470 Method and apparatus for handling in-bound telemarketing calls
5,535,257 Method and apparatus for managing telephone calls in a selective call radio system controller
5,533,109 Telecommunication system with user modifiable PBX terminating call feature controller and method
5,533,107 Method for routing calls based on predetermined assignments of callers geographic locations
5,533,103 Calling system and method
5,530,931 Method and apparatus for providing a look ahead feature for enhanced cell forwarding in a telecommunications system
5,528,666 Personal phone expansion system
5,526,417 Automatic call distributor with automated post-conversation message system
5,524,140 Telephone answering device linking displayed data with recorded audio message
5,519,773 Call sharing for inbound and outbound call center agents
5,517,566 Method for allocating agent resources to multiple telephone calls campaigns
5,515,421 Automatic batch broadcast system
5,511,112 Automated voice system for improving agent efficiency and improving service to parties on hold
5,506,898 Expected wait-time indication arrangement
5,502,762 System and method for simultaneously controlling ringing at local and remote telephones
5,495,528 Digital telephone control interface system
5,495,523 Method for low priority telephony system assisted dialing
5,493,690 Foldable portable telephone set
5,485,506 Method for designating recorded messages
5,481,596 Auxiliary baseband telephone interface for an answering machine
5,479,501 Far-end disconnect detector for telephony systems
5,479,487 Calling center employing unified control system
5,467,391 Integrated intelligent call blending
5,465,286 Apparatus for supervising an automatic call distribution telephone system
5,459,781 Selectively activated dual tone multi-frequency detector
5,448,631 Apparatus for handling features in a telephone network
5,448,624 Telephone network performance monitoring method and system
5,442,693 Integrated operator console
5,436,967 Held party call-back arrangement
5,434,906 Method and apparatus for processing an incoming call in a communication system
5,432,835 Telephone device for amplifying opposite party's voice after user's telephone is placed on-hook
5,430,792 Automated telephone calling system
5,425,093 System for integrating a stand alone inbound automatic call distributor and a outbound automatic call dialer
5,420,919 Telephone line current modulator
5,420,852 Digital switching system connecting buses with incompatible protocols and telephone answering system and private automatic branch exchange with integrated voice and textual message recording 5,402,474 System, data processing method and program to provide a programmable interface between a workstation and an archive server to automatically store telephone transaction information 5,400,393 Voice mail digital telephone answering device 5,390,236 Telephone answering device linking displayed data with recorded audio message 5,381,470 Supervisory management center with parameter testing and alerts 5,365,575 Telephonic-interface lottery system 5,359,645 Voice-data telephonic interface control system 5,351,285 Multiple format telephonic interface control system 5,341,414 Calling number verification service 5,341,412 Apparatus and a method for predictive call dialing 5,333,190 Telephone ring detection method and apparatus 5,329,579 Modular adjunct processor made of identical multi-function modules adaptable under direction of one or them to perform any of the adjunct-processor functions 5,327,490 System and method for controlling call placement rate for telephone communication systems 5,321,745 Adaptive efficient single/dual tone decoder apparatus and method for identifying call-progression signals 5,319,703 Apparatus and method for identifying speech and call-progression signals 5,313,516 Telephone answering device with automatic function 5,311,577 Data processing system, method and program for constructing host access tables for integration of telephony data with data processing systems 5,311,574 Automatic customer call back for automatic call distribution systems 5,309,505 Automated voice system for improving agent efficiency and improving service to parties to hold 5,309,504 Automated identification of attendant positions in a telecommunication system 5,297,195 Method and apparatus for automatic telephone scheduling system 5,297,146 Communication terminal apparatus and its control method 5,289,530 Method and apparatus for vocally communicating to a caller at a remote telephone station synthesized speech of stored special service information 5,283,818 Telephone answering device linking displayed data with recorded audio message 5,279,732 Remote workstation use with database retrieval system 5,253,289 Terminal connection device 5,251,252 Telephone interface call processing system with call selectivity 5,239,574 Methods and apparatus for detecting voice information in telephone-type signals 5,224,153 Voice-data telephonic interface control system 5,218,635 Low-frequency alternating current signal detector, in particular for central office line interface circuits 5,214,688 Method and apparatus for dynamic and interdependent processing of inbound calls and outbound calls 5,185,786 Automatic call center overflow retrieval system 5,168,517 Apparatus and methods for selectively forwarding telephone calls 5,166,974 Interactive call processor to facilitate completion of queued calls 5,164,981 Voice response system with automated data transfer 5,163,087 Delivery of customer data base key using automatic number identification 5,163,083 Automation of telephone operator assistance calls 5,161,181 Automatic number identification blocking system 5,128,984 Telephone interface call processing system with call selectivity 5,121,422 Voice message storage device including at least two analog recording mediums 5,103,449 PBX transparent ANI and DNIS using VRU 5,097,528 System for integrating telephony data with data processing systems 5,081,711 Computer peripheral device control and communication system 5,077,789 Remotely commanded telephone switch enhancing system 5,073,929 Voice-data telephonic control system 5,070,526 Signal analyzing system 5,070,525 Method for avoiding call blocking 5,063,522 Multi-user, artificial intelligent expert system 5,048,075 Telephonic-interface statistical analysis system 5,040,208 Coordinated voice and data display having temporary storage of transaction data 5,020,097 Telephone with data setting by remote control 5,020,095 Interactive call distribution processor 5,016,270 Expanded telephone data organization system 5,014,298 Voice-data telephonic control system 5,007,078 Automated order entry recording method and apparatus 5,007,000 Classification of audio signals on a telephone line 4,998,272 Personal voice mail system 4,987,587 Method and apparatus for providing 800 number service 4,979,171 Announcement and tone code generator for telephonic network and method 4,975,841 Method and apparatus for reporting customer data 4,958,371 Method and apparatus for determining when a telephone handset is off-hook 4,941,168 System for the recognition of automated telephone answering devices and delivery of prerecorded messages to such devices 4,935,956 Automated public phone control for charge and collect billing 4,933,964 Pacing of telephone calls for call origination management systems 4,930,150 Telephonic interface control system 4,924,501 Dial pulse selection 4,894,857 Method and apparatus for customer account servicing 4,878,243 Call forwarding system and method 4,866,754 Automatic telephone answering machine utilizing voice synthesis 4,852,149 Automated call filter 4,807,279 Remotely programmable call forwarding control device 4,797,911 Customer account online servicing system 4,768,221 Remote reprogramming system for telephone call forwarding service 4,677,663 Telephone answering and call forwarding improvement 4,286,118 Data distribution system for private automatic branch exchange each of which is expressly incorporated herein by reference.

SUMMARY AND OBJECTS OF THE INVENTION

The summary description of the invention herein provides disclosure of a number of embodiments of the invention. Language describing one embodiment or set of embodiments is not intended to, and does not, limit or constrain the scope of other embodiments of the invention.

The present invention provides a system and method for intelligent communication routing within a low-level communication server system. Therefore, it allows replacement or supplementation of telephone numbers, IP addresses, e-mail addresses and the like, to identify targets accessible by the system with high-level definitions, which are contextually interpreted at the time of communications routing, to appropriately direct the communication. Therefore, the target of a communication is defined by an algorithm, rather than a predetermined address or simple rule, and the algorithm evaluated in real time for resolution of the target, to deliver the communication or establish a real or virtual channel.

Alternately, the intelligence of the server may be used to implement telephony or computer-telephony integration features, other than destination or target.

Therefore, according to the present invention, communications are, or may be, routed or other telecommunications features implemented, inferentially or intelligently, at a relatively low level within the communications management architecture. For example, in a call center, the software system which handles virtual or real circuit switching and management resolves the destination using an algorithm or the like, rather than an unambiguous target.

An embodiment according to the present invention, the control over switching in a circuit switch is partitioned together with intelligent functions.

Intelligent functions include, for example, but are not limited to, optimizations, artificial neural network implementation, probabilistic and stochastic process calculations, fuzzy logic, Baysian logic and hierachal Markov models (HMMs), or the like.

A particularly preferred embodiment provides a skill-based call automatic call director for routing an incoming call in a call center to an appropriate or optimal agent. While skill-based routing technologies are known in the art, the intelligence for routing the call is separate from the voice routing call management system. Thus, the prior art provides a separate and distinct process, and generally a separate system or partition of a system, for evaluation of the skill based routing functionality. For example, while the low level voice channel switching is performed in a PBX, the high level policy management if often performed in a separate computer system, linked to the PBX through a packet switched network and/or bus data link.

The present invention, however, integrates evaluation of intelligent aspects of the control algorithm with the communications management. This integration therefore allows communications to be established based on an inferential description of a target, rather than a concrete description, and allows a plurality of considerations to be applied, rather than a single unambiguous decision rule.

An aspect of the present invention therefore proposes an architectural change in the computer telephony integrated (CTI) systems, wherein the CTI host takes on greater responsibilities, for example intelligent tasks, than in known systems. In this case, the host is, for example, a PC server having a main processor, for example one or more Intel Pentium 4 Xeon or AMD Athlon MP processors, and one or more voice channel processors, such as Dialogic D/320-PCI or D/160SC/LS, or PrimeNet MM PCI, or the like. In this type of system, the voice channel processor handles connections and switching, but does not implement control. The control information is provided by the main processor over, for example, a PCI bus, although some or all control information may also be relayed over a mezzanine bus. Because the actual voice channel processing is offloaded from the main processor, real time response with respect to voice information is not required. Therefore, the main processor may operate and be controlled by a standard operating system, in contrast to a real time operating system. While the control processor does operate under certain latency constraints, these are quite long as compared to the response latency required of the voice channel processors. This, in turn, allows the main processor(s) to undertake a plurality of tasks which are not deterministic, that is, the time required to complete processing of a task is unknown and is not necessarily completed within a time window. However, by using state of the art processors, such as a 3.06 GHz Pentium processor, the amount of processing which may be undertaken, meeting a reasonable expectation of processing latency, is substantial. Thus, operating under the same instance of the operating system, for example sharing the same message queue, as the interface between the main processor and the voice channel processor(s), the system according to the present invention may process advanced and complex algorithms for implementing intelligent control. This architecture reduces the required bandwidth for communications with an external high level management system, as well as the processing load thereon. Likewise, since significant decisions and resource allocations are made within the switching system, the need for high quality of service communications channels between the switching system and management system is also reduced.

Preferably, the intelligent algorithm for controlling the voice channels requires minimal access to a disk or mass-storage based database. That is, for any transaction to be processed, preferably either all information is available to the main processor at the commencement of the process, or an initial request is made at commencement of the process, with no additional requests necessary to complete the process, although a stored database may be updated at the conclusion of the process. For example, as a call is received, sufficient information is gathered to define the caller, either by identity or characteristics. This definition may then trigger an initial database lookup, for example to recall a user transaction file or a user profile. Preferably, therefore, a table or other data structure is stored in low-latency memory, for example, double data rate dynamic random access memory (DDR-RAM), which holds the principal parameters and information necessary for execution of the algorithm. Therefore, preferably agent and system status information is present and maintained locally, and need not be recalled for each transaction.

According to a preferred embodiment of the invention, a process is provided for optimizing the selection of an agent within the voice channel switching system. This process is a multi step process. Only the later part of the process generally need be completed in a time-critical fashion, e.g., as a foreground task. The initial part(s) of the process may be implemented over an extended period of time, so long as the data available for transactions is sufficient current to avoid significant errors.

First, a set of skills are defined, which are generally independent skills, although high cross correlations between skills would not defeat the utility thereof. The skill definitions may be quite persistent, for example over a particular campaign, call center, or even multiple call centers and multiple campaigns. The skills generally are not subject to change after being defined, although through advanced processing or reprocessing of data, clusters in multidimensional space may be defined or revised, representing "skills". Likewise, a manual process may be employed to define the skill set.

Next, for any given task, the skills are weighted. That is, the importance of any skill with respect to the task is defined or predicted. This may also be a manual or automated process. In the case of an automated process for weighted the skills, past tasks similar in nature are analyzed to determine which skills were involved, and to what extent. Typically, since the skill set definitions are normative, the task-skill relationships are derived from data for various or all agents, and need not be limited to the data pertaining to a single or respective agent. The weighting may be adaptive, that is, the weighting need not be invariant, and may change over time based on a number of factors. The weightings may also be time dependent, for example following a diurnal variation.

Each agent is assigned a metric with respect to each skill. This process may be manual or automated, however, a number of advantages accrue from an automated analysis of agent skill level. Typically, an initial skill level will be assigned manually or as a result of an off-line assessment. As the agent is presented with tasks, the proficiency of the agent is analyzed, and the results used to define skill-specific metrics. As stated above, since the skill definitions are normative, the skills of one agent are compared or comparable to skills of others. For example, the skill sets are assigned using a multivariate analysis technique, based on analysis of a plurality of transactions, predicting the best set of skills consistent with the results achieved. In this analysis, each skill metric may be associated with a reliability indicia; that is, in some instances, where the outcome of clearly determinable, and a skill as defined is highly correlated with the outcome, the reliability of the determined skill value for a statistically significant sample size is high. On the other hand, where a particular skill is relatively unrelated to the tasks included within the data analysis set, that is, the outcome factor is relatively uncorrelated with the value of the skill, the reliability of a determination of an agent skill will be low.

A related issue relates to inferring an agent skill level for a skill parameter where little or no data is available. For this task, collaborative filtering may be appropriate. A collaborative filter seeks to infer characteristics of a person based on the characteristics of others having similar associated parameters for other factors. See references cited and incorporated by reference above. In this case, there is only a small analytic difference between a parameter for which data is available from a respective agent, but yields an unreliable measurement, and a parameter for which data is unavailable, but can be inferred with some reliability. Therefore, the skill determining process may employ both techniques in a composite; as more data becomes available relating to an actual skill level of an agent with respect to a skill parameter, reliance on inferred skill levels is reduced. It is therefore an aspect of one embodiment of the invention that a collaborative filter is used to infer agent skill levels where specific data is unavailable. It is also an aspect of an embodiment of the invention that in addition to a skill level metric, a reliability estimate for the measurement of the skill level metric is also made available.

It is noted that in defining a desired agent profile for a task, the skill metrics themselves are subject to unreliability. That is, the target skill levels themselves are but an estimate or prediction of the actual skills required. Therefore, it is also possible to estimate the reliability of the target skill level deemed desired. Where the target skill level is low or its estimate unreliable, two separate and distinct parameters, the selected agent may also have a low or unreliably determined skill level for that attribute. On the other hand, where a skill is reliably determined to be high, the agent skill profile should also be high and reliably determined.

In other instances, the metric of skill does not represent a quantitative metric, but rather a qualitative continuum. For example, the optimal speech cadence for each customer may differ. The metric, in this case, represents a speech cadence parameter for an agent. The idea is not to maximize the parameter, but rather to optimize it. Therefore, reliability in this instance does not equate to a reduction in estimated magnitude. It is also noted that a further ancillary parameter may be applied for each skill, that is, tolerance to mismatch. For example, while call received by a call center, for technical support, may seek an agent who is more knowledgeable than the caller is with respect to the problem, but not one who is so far advanced that a communication gap would be apparent. Thus, an optimum skill parameter as well as a range is defined. In like manner, other descriptors of a statistical function or distribution may be employed, for example, kurtosis and skew.

It is noted that there are a number of ways of scoring outcome of a call, and indeed, a number of parallel scoring systems may be employed, although they should be consistently applied; that is, if an agent is selected for handling a call based on one paradigm, care should be employed in scoring the agent or the call outcome using a different paradigm. Such cross analyses, however, may be useful in determining an optimum outcome analysis technique.

When a new matter is to be assigned to an agent, the pool of agents are analyzed to determine, based on the predefined skills, which is the best agent. Selecting the best agent for a task is dependent on a method of scoring outcome, as discussed above. In some instances, there is a relatively simple process. For example, agents entrusted to sell a single product can be scored based on number of units sold per unit time, or the time it takes to close a sale. However, where different products are for sale, optimization may look at different parameters, such as call duration, revenues per call or unit time, profit per call or unit time, or the like. As the variety of options for a user grows, so does the theoretical issues involved in scoring an agent.

It is also possible for agents to engage in an auction; that is, agents bid for a caller. In this case, an agent must be sufficiently competent to handle the call based on the information available, and agents with skills far in excess of those required may be excluded from the bidder pool. For example, agents may be compensated on a commission basis. The bidding may involve an agent bidding a commission rate (up to the maximum allowed). In this way, the employer gets the benefit of competition between agents. The bid, in this instance, may be a manual process entered into by the agent as a prior call is being concluded.

The bid may also be automatically generated at an agent station, based on both objective and subjective factors. See, U.S. Patent Application No. 60/445346 (Steven M. Hoffberg, inventor), filed Feb. 4, 2003, Express Mail No. EU865412254US, expressly incorporated herein by reference. That is, a bid may be automatically defined and submitted on behalf of an agent. The bid may be defined based on an economic or other criteria.

The optimization of agent selection may also be influenced by other factors, such as training opportunities. Therefore, in determining a cost benefit of selection of a particular agent, a training cost/benefit may also be included.

Thus, according to a simplistic analysis, the agent with the highest score is selected. This is, indeed an "optimum" condition, assuming that there is uniform incremental cost in selecting each agent, and that the system remains static as a result of the selection. On the other hand, if agent costs differ, or the system status is materially altered on the basis of the selection, or there are extrinsic factors, such as training, then the optimum may also differ.

A number of factors may also influence optimality of selection. While most are merely business-based considerations, some may be politically incorrect (bad public policy), or even illegal. For example, an optimization may take into account discrimination on an illegal basis, resulting in harm to either callers or agents within a protected class. That is, a traditionally discriminated-against minority may be subjected to automated and institutionalized discrimination as a result of an algorithm which favors a discriminatory outcome. In fact, the discriminatory outcome may be both efficient and optimal, under an economic or game theory analysis. However, this may be undesired. One way to counteract this is to estimate the discriminatory impact of the algorithm as a whole and apply a global antidiscriminatory factor. While this has the effect of correcting the situation on an overall level, it results in significant inefficiencies, and may result in a redistribution in an "unfair" manner. Further, the antidiscriminatory factor is itself a form of discrimination.

Another method for approaching this problem is to analyze the profile or skill vectors a the presumably discriminated-against agent or customer classes, and compare this to the corresponding vectors of non-discriminated-against class of agents or customers. Assuming that discrimination occurs on a class basis, then, a corrective factor may be used to normalize components of the vector to eliminate the discriminatory effect.

A further method of remediating the perceived discrimination is through training. In this case, the presumably objective outcome determinations are not adjusted, nor is the "economic" model for optimal agent selection disturbed. Instead, a mismatch of the skill profile of an agent with the caller is used as an opportunity to modify behavior (presumably of the agent), such that the deficiency is corrected.

For example, a call center agent may have a characteristically ethnic accent. In one case, the agent accent may be matched with a corresponding caller accent, assuming that data shows this to be optimum. However, assuming that vocal ethnicity relates to socioeconomic status, the result may be that the value of the transaction (or other score value) is associated with this status. The goal would therefore be for the agent to retrain his or her accent, and indeed use a different accent based on an inferred optimal for the caller, or to overcome this impediment by scoring well in transactions involving those other than a "corresponding" accent. Each of these is subject to modification through agent training.

Therefore, it is apparent that the optimization may be influenced by economic and non-economic factors, and the optimization may include objective and subjective factors.

The system may also intelligently analyze and control other aspects of telecommunications besides call routing. For example, it is particularly advantageous to characterize the caller, especially while the call is in the queue. However, increasing the amount of information which must be communicated between the switch control and a high-level system is undesirable, thus limiting the ability to extract low-level information from the caller. Such information may include preferred language, a voice stress analysis, word cadence, accent, sex, the nature of the call (IVR and/or speech recognition), personality type, etc. In fact, much of this information may be obtained through interaction and/or analysis of the caller during the queue period. Further, in some instances, it may be possible to resolve the caller's issues without ever connecting to an agent, or at least to determine whether a personal or automated resolution is preferred. According to an aspect of the invention, the switch itself may control and analyze the interaction with the caller. Advantageously, the switch may further perform a sensitivity analysis to determine which factors relating to the call are most useful with respect to selecting an appropriate agent, and more particularly by limiting this analysis to the agents within the pool which are likely to be available. Further information characterizing the user may also be gathered to construct a more detailed user profile.

It is noted that, in some cases, a caller prefers to remain passive in the queue, while in other instances, the caller would prefer to actively assist in optimizing the experience. This does not necessarily correlate with a universal caller profile, nor the optimal selection of agent. This can be quickly ascertained, for example through IVR.

It is noted that an efficient analysis performed by the switch may differ from an efficient analysis performed or controlled by a high level system. For example, a high level system may employ speech recognition technology for each caller in a queue. The switch, on the other hand, would likely not be able to implement speech recognition for each caller in a large queue internally. Further, since the profile of the caller and the correspondence thereof to the agent skill profile, as well as the correlation to the outcome, is dependent on the selection of characteristics for analysis and outcome metric, the parameters of each, according to the present invention, will also likely differ.

Returning now to the problem of routing a call using an intelligent switch, the condition of optimality in the case of equal incremental cost, a stationary system condition as a result of the selection, and scalar skill parameters having a magnitude correlated to value, is denoted by the formula:

$$A_n = \text{Max} \Sigma (rs_i a_n s_i)$$

Which denotes that Agent "n" is selected by maximizing the sum, for each of the required skills $s_i$, of the product of weighting for that skill $rs_i$, and the score for agent n $a_n s_i$. As stated above, this optimization makes two very important, and not always applicable assumptions. First, more highly skilled agents often earn higher salaries. While, once scheduled, presumably the direct cost is fixed, over the long term, the pool of agents must be adjusted to the requirements, and therefore the selection of an "expensive" agent leads to increased costs. On the other hand, by preferentially selecting the skilled agent over the unskilled agent, the job experience for the skilled agent may be diminished, leading to agent retention problems. Likewise, the unskilled agent is not necessarily presented with opportunities for live training. Thus, it is seen that the agent cost may therefore be a significant variable.

The formula is therefore modified with a cost function as follows:

$$An = \text{Max}[Ac_{n1} \Sigma(rs_i a_n s_i) + Ac_{n2}]$$

Wherein $Ac_{n1}$ and $Ac_{n2}$ are agent cost factors for agent n. To determine the anticipated cost, one might, for example, divide the daily salary by the average number of calls per day handled by the agent. This, however, fails to account for the fact that the average length of a call may vary based on the type of call, which is information presumed available, since the skill set requirements are also based on a classification of the type of call. Further, an agent highly skilled in some areas may be relatively unskilled in others, making an average call duration or average productivity quite misleading. Another cost to be considered is training cost. Since this is generally considered desirable, the actual value may be negative, i.e., an unskilled trainee may be selected over a highly skilled agent, for a given call, even though the simple incremental agent costs might tend toward a different result. Likewise, selection of an agent for a certain call may be considered a reward or a punishment for good or bad performance, and this may also be allocated a cost function. The key here is that all of these disparate factors are normalized into a common metric, "cost", which is then subject to numeric analysis. Finally, the optimization may itself evolve the skill sets and cost function, for example through training and reward/punishment.

The cost of the "connection" between a caller and an agent may also be considered, for example in a multi-location call center, or where agents are compensated on a per-call basis. Another factor to be considered in many cases is anticipated outcome. In some instances, the outcome is irrelevant, and therefore productivity alone is the criterion. On the other hand, in many cases, the agents serve a business purpose, and call outcomes may be graded in terms of achieving business goals. In many instances, the business goal is simple an economic parameter, such as sales volume, profit, or the like, and may be directly compared within a cost function normalized in economic units. On the other hand, some business goals, such as customer satisfaction, must be converted and normalized into economic terms prior to use in an optimization. In any case, the expected outcome resulting from a particular agent may be added as a factor in the cost function.

Another factor to consider in making a selection of an agent in a multi-skill call center is the availability of agents for other calls, predicted or actual. Thus, while a selection of an agent for one matter may be optimal in a narrow context, the selected agent might be more valuable for another matter. Even if the other matter is predicted or statistical, in some instances it is preferred to assign more specialized agents to matters that they can handle, rather than assigning multitalented agents.

This is represented as follows:

$$An = \text{Max} < (\{[Ac_{n1} \Sigma(rs_i a_n s_i) + Ac_{n2}] + Bc_n\} + Cc_n) + Dc_n >.$$

Wherein Bc represents a term for the anticipated change in value of agent n as a result of the selection, Cc represents a term which indicates the anticipated value of the transaction resulting from the selection of agent n, and Dc represents the opportunity cost for allocating agent n to the particular call.

In the case of competing requests for allocation, a slightly different formulation of the problem may be stated. In that case, one might compare all of the cost functions for the matters in the queue with respect to each permissible pairing of agent and matter. Instead of selecting an optimal agent for a given matter, the system selects an optimal pairing of respective multiple agents with multiple matters. In the case of a call center, often the caller hold time is considered a basic criterion for selection. In order to weight this factor, for example, the cost function includes an allocation for caller hold time, and possibly a non-linear function is applied. Thus, a caller may be taken out of order for paring with an optimal agent.

In some cases, the variance of a parameter is also considered, in addition to its mean value. More generally, each parameter may itself be a vector, representing different aspects.

It is noted that the various factors used in the system may be adaptive, that is, the predicted values and actual values are compared, and the formula or variables adjusted in a manner which is expected to improve the accuracy of the prediction. Since outcome is generally measured in the same metric as the cost function, the actual cost is stored along with the conditions of the predictive algorithm, and the parameters updated according to a particular paradigm, for example an artificial neural network or the like. Typically, there will be insufficient data points with respect to a system considered static to perform an algebraic optimization.

The present invention provides cost function optimization capabilities at a relatively low level within the call routing system. Thus, for example, prior systems provide relatively high level software, operating on massive customer relations management (CRM) database systems, to seek optimization.

On the other hand, according to the present invention, the parameters are supplied in advance, generally in a batch format, to the low level routing and computer integrated telephony (CTI) software, which computes the cost functions. Call outcome data is generally available during and after a call to the high level software, which can then set or adjust values as necessary for the future.

It is noted that, generally, the architecture according to the present invention would not generally provide agent scheduling information, since this represents a task separate from the call routing functions. Therefore, known systems which integrate both tasks are typically distinguished from the present invention. However, it would be possible as a separate process for this to be performed on the telephony server according to the present invention. More generally, the updating of agent skill tables or a database, and agent scheduling and call center management, are performed on high level systems which are discrete from the telephony server. These systems typically access large databases, generate reports, and integrate many different functions independent of the communications functions.

The advantage of a preferred architecture according to the present invention is that when a call is received, it can be routed in real time, rather than after a possibly significant delay. Further, this data processing partition reduces data communications bandwidth requirements and reduces transactional load on the CRM system. In addition, this architectural partition reduces the need for the CRM system to be involved in low level call management, and reduces the need for the CTI software to continually interact with the high level CRM software. This, in turn, potentially allows use of simple architecture CTI platforms using standard operating systems.

According to a preferred embodiment, the matter skill requirements, agent skill data, and other parameters, are provided to the CTI software, for example as an ASCII table. The CTI software may, for example, invoke a subprocess for each call received or in the queue, to determine the then-optimum agent selection, for a local optimization, i.e., a selection of the optimal agent without regard for the effect of this selection on other concurrent optimizations. In order to globally optimize, the processing is preferably unitary. As conditions change, for example, further calls are added to the queue, or calls are completed, the optimizations may be recomputed.

For example, in a call center with 500 agents, each classified with respect to 32 skills, with an average of 2000 calls in the queue, with about 50 agents available or anticipated to be available at any given time, the computational complexity for each optimization is on the order of $160 \times 10^6$ ($2000 \times 50 \times 50 \times 32$) multiplies, generally of 8 bit length. A 2 GHz Pentium 4 processor, for example, is capable of theoretical performance of about 2400 MFLOPS. Using a simplified calculation, this means that less than about 10% of the raw capacity of this processor would be required, and more powerful processors are being introduced regularly. For example, a 3.06 GHz Pentium 4 processor with "hyperthreading" has recently been introduced. In fact, in real-world situations, the processor would likely not be able to achieve its benchmark performance, but it is seen that a single modern processor can handle, in near real time, the required processing. Coprocessing systems are available which increased the processing capability, especially with respect to independent tasks, while allowing all processes to be coordinated under a single operating system. For example, Microsoft Windows and Linux both support multiprocessing environments, in case increased processing capacity is required.

On the other hand, if a high level CRM system is interrupted to process each call event to globally reoptimize agent selection, and communicate this with the CTI software, a significant communication and transaction burden would be encountered.

Thus, the present invention proposes that the skill-based call routing algorithm be executed in conjunction with the low level CTI process, as an integral part of the call routing function. Likewise, other call-process related algorithms may be implemented, in addition to or instead of a call routing calculation.

Advantageously, for example in many non-adaptive systems, no high level CRM system is required, and the entire skill-based routing functionality may be implemented in the CTI system, saving significant hardware expense and software complexity. Thus, where the cost function is relatively simple to calculate, the skills required for the call and the skills of each respective agent well known and relatively constant, a simple database may be provided for the CTI platform to route calls intelligently.

Another aspect of the invention provides optimization of communications management based on adaptive parameters, e.g., not only on the existing skills of the respective agents, but rather also based on an anticipated or predicted change in the agent's skills as a result of handling the call. Likewise, when considering an overall cost function for optimizing call directing, any variety of factors may be considered within its context. Therefore, it an another object to provide a consolidated cost function for communications management, wherein pertinent factors or parameters are or may be expressed in common terms, allowing unified consideration. According to a preferred embodiment of the invention, this is handled at a low level within the communications management system, although various aspects may be handled in real time or otherwise at various levels of the communications management system.

In the case of real time communications, such as traditional voice telephony, the switching must by definition occur in real time, so must the resolution of the parties to the communication. Therefore, another aspect of the invention involves communications and coordination in real time of the various system components, including the low level system. Preferably, the data upon which an optimization is based is available locally to the low level system before a real time communication is received, so that external communications to resolve the target are minimized. In some cases, communications with other system components will still be required, but preferably these do not require essentially non-deterministic systems to respond prior to resolution.

Another aspect of the invention seeks to optimize long term call center operations, rather than immediate efficiency per se. Thus, at various times, the system performs functions which are different or even opposite the result expected to achieve highest short term efficiency. Preferably, however, during peak demand periods, the system assures high short term efficiency by switching or adapting mode of operation.

Therefore, according to the present invention, a number of additional factors are applicable, or the same factors analyzed in different ways, beyond those employed in existing optimizations. Since most call centers are operational for extended periods of time, by analyzing and optimizing significant cost factors beyond those contemplated by the prior art, a more global optimization may be achieved.

In a service environment, the goal is typically to satisfy the customer at lowest cost to the company. Often, this comes through making a reasonable offer of compromise quickly, which requires understanding the issues raised by the customer. Delay leads to three costs: the direct and indirect operations cost; the possibility of increased demands by the customer (e.g., impaired business marginal utility of the communication); and the customer satisfaction cost.

In technical support operations, the agent must understand the technical issues of the product or service. The agent must also understand the psychology of the user, who may be frustrated, angry, apologetic, or even lonely. The agent must often remotely diagnose the problem, or understand the information provided by the caller, and communicate a solution or resolution.

In some instances, these seemingly abstract concepts are represented in relatively in relatively basic terms at the communications server level. For example, the cadence of a speaker may be available by a simple analysis of a voice channel for silence and word rate. Stress may also represented in a spectral analysis of voice or in other known manner. Alcoholism or other impairment may be detected by word slurring, which may also be detected by certain signature patterns in the voice pattern.

It is noted that, in some instances, the skill related parameters are not independent. That is, there is a high cross correlation or other relationship between the parameters. In other instances, there are non-linearities in the process. A simple summing of magnitude times weight for these parameters may introduce errors. Therefore, a more complex algorithm may be employed, without departing from the spirit or scope of the present invention.

Likewise, for each caller profile class, a different optimization may be employed. There are some traits, such as alcoholism, which may alter the optimal selection of agent, all other thing being equal.

Therefore, communications routing on seemingly sophisticated or abstract concepts may be efficiently handled at a low level without interrupting the basic call processing functions or requiring non-standard hardware. In this sense, "non-standard" refers to a general purpose type computing platform performing the communications routing functions. In fact, efficiency is generally enhanced according to the present invention by avoiding the need for remote communications of the call parameters and the resulting communications and processing latencies. Of course, in certain tightly coupled environments, the target resolution may be performed on a physically separate processor or system from the low level call processing, without deviating from the essential aspects of embodiments of the invention.

In many cases, the caller characteristics and issues will often have a significant effect on the duration of the call. While, in general, more skilled agents will have a higher productivity, in some cases, the caller restricts throughput. Therefore, even though the agent is capable of completing the call quickly, the caller may cause inordinate delays. According to the present invention, through a number of methods, the caller characteristics are determined or predicted, and an appropriate agent selected based on the anticipated dynamic of the call. Thus, for example, if the anticipated call duration for a successful outcome, based on the caller characteristics is a minimum of 5 minutes (depending on the agent), then an agent who is likely to complete the call in about 5 minutes may be selected as the optimum; agents who would be able to complete the call within 4 minutes, while technically more productive, may have little impact on the actual call duration, and thus would be inefficiently employed. Likewise, an agent anticipated to complete the call in 6 minutes might be deemed inefficient, depending on the availability of other agents and additional criteria. The call may be selected as a training exercise. In this case, an agent is selected for training whom would be expected to operate with a certain degree of inefficiency to complete the call. In some cases, unsupervised training is instituted. In other cases, a training agent (or automated system) is allowed to shadow the call, providing assistance, instruction and/or monitoring of the trainee agent during the call. In this case, it would be anticipated that the cell duration would be greater than 5 minutes, due to the training nature of the call. Further, the required trainer assistance further reduces immediate efficiency. However, as the agents in the pool become more skilled, long term efficiency increases.

Preferably, these characteristics are extracted through an analysis, by the communications control system, of the available data, although where appropriate, reference to higher level systems may be performed. Thus, in an interactive voice (or key) response system, there may be sufficient time and resources available to query a high level system for data or request analysis relating to a call. However, in many instances, significant analysis may be performed using the computing resources and information available to the low level communication processing system. Even when the information is not available, a DNIS or other type of lookup may provide this information based on a relatively simple query.

More highly skilled agents are both worth more and generally command higher compensation. A program which trains internally is either required, due to lack of specific external training programs, or is cost effective, since new hires can be compensated at a lower rate than trained and experienced hires. Thus, for long-term operations, there is an incentive to train agents internally, rather than seeking to hire trained agents. Therefore, according to another aspect of the invention, such training, past present and/or future, is monetized and employed in optimization of a cost function.

Agents may receive additional compensation for training activities, either for their training activities, performance based compensation based on the improvement of their trainees, or both. Thus, there is an incentive for agents to become skilled and to assist in the training. As a result, the average skill level and uniformity in a call center will increase. However, since the optimal skill palette within a call center typically is a moving target, the training process will never cease.

Often, live interaction is an important component of training. Therefore, a significant component of the training encompasses interaction with callers in real-world situations. Training often involves presenting agents with new challenges and experiences in order to assure breadth of exposure.

According to prior skill-based routing schemes, an agent skill level is considered a static upper limit on capabilities, and the ACD avoids distributing calls to agents below a threshold. Agents may be called upon to serve requests within their acknowledged skill set. Likewise, this allows a simple and discrete boundary condition to be respected in the optimization according to the present invention.

On the other hand, according to some embodiments of the present invention, each call is considered a potential training exercise, in order to expand the capabilities of the agent, and therefore the boundary is not concretely applied. Therefore, to the extent that the nature of the call can be determined in advance, the incentive according to this scheme is to route the call to an agent who is barely capable of handling the call, and to avoid routing only to the best available agents. This strategy has other implications. Because agents are challenged continually, there is reduced incentive for an agent to limit his skills to avoid the "tougher" assignments. Further, a self-monitoring scheme may be implemented to determine the status of an agent's skill with each call. For example, agent performance is typically determined on a call-throughput basis, since call centers are managed on a man-hour requirement basis and agents compensated on a per-hour basis. Therefore, based on a presumed agent skill set and an estimation of the skills required for a given call, a call duration may be predicted. The actual duration is then compared with the predicted duration, providing a performance metric for the agent.

This scheme also allows determination of the pertinent factors for call duration, both based on the information about the call or caller and the skill set of the agent. Thus, a variety of low-level data may be collected about a volume of calls, which may be statistically or otherwise analyzed to determine significant relations. For example, an artificial neural network or fuzzy-neural network may be implemented based on the data, which may then be automatically analyzed based on the independent criteria, e.g., call duration, cost function, or the like.

It is noted that, during peak demand periods, reduced productivity due to training exercises is preferably minimized. Thus, as demand increases, high skill set agents are preferably reassigned from training to most-efficient operational status, while lower skill set agents are assigned to calls well within their capabilities. Thus, during such peak demand periods, the staffing requirement will generally be no worse than traditional call centers. On the other hand, since training is integrated with operations, over a period of time, the average skill of all agents will increase. Thus, more skilled agents will be available at peak periods, reducing overall staffing requirements over a long term due to an expected decrease in average call duration and increase in agent productivity.

According to this embodiment of the invention, it is less critical to perform the call routing resolution in the low level system, since the real time criteria is not particularly limited by processing and communication latencies. On the other hand, corresponding skill routing functions may be performed by the communications processing system for both outbound and inbound communications, thus permitting a simplification of the external supporting systems.

An embodiment of the present invention provides an Internet Protocol Based communications architecture, permitting geographically dispersed physical communications locations to act as a single coordinated entity. In order to centrally manage a queue, the various pieces of information must be available for processing. As noted above, an interactive optimization may require a real time comparison of all available agents. In this architecture, in cases of an ad hoc organization or peak demand periods, freelance agents may be called upon dynamically as required. Thus, if a peak demand period is much shorter than an agent shift, off-site freelance agents may be dynamically called upon, for example through the Internet, ISDN, POTS, DSL, Cable modem, or a VPN, to handle calls. In this case, the optimal training of such off-site or freelance agents will generally differ from those who are in-house agents. For example, if freelance agents are called upon only during peak demand periods, these agents will be trained specifically for the skills in short supply during such periods, or for generic skills which are commonly required.

In order to gage the skill set required of an agent for a call, a number of methods may be employed. Using a menu or hierarchal menu, a series of questions may be asked of callers in the queue to determine the identity of the caller and the nature of the call. Likewise, ANI/DNIS information, IP address or the like, or other communications channel identifier may be employed to identify the calling telephone communications channel. This information may directly indicate the characteristics or desired characteristics of the communication, or be used to call an external database record associated with the identity of the caller or communications channel. While it is possible to associate such as database closely with the low level communications processing system, this is not generally done, since it may impair the deterministic characteristics of the communications processing system. Rather, if such information is required by the low level communications system for resolution, and cannot be stored locally in a data table, it is preferred that it be available through a closely coupled, but independent system. As discussed above, it is preferred that a call entering the queue require no more than a single database query and receipt of response prior to action, although other non-time critical access may occur both before and after action. The prior art, on the other hand, generally provides such information through independent and generally high level systems. High level systems are generally characterized by general purpose interfaces, broad range of functionality, and often a communications protocol having a rich and complex grammar. On the other hand, tightly coupled systems can often forgo extensibility and interoperability in favor of efficiency.

In many instances, call centers are implemented to provide support for computer systems. It is known to provide a message automatically generated by a computer to identify and report the status of the computer at a given time, and possibly the nature of a computer problem. One aspect of the present invention allows this message to be associated with a direct semantic communication session with the user, for example to predefine the nature of the call and possibly the skill set required to address the issues presented. Thus, for example, a caller may be prompted to specify information of particular relevance in the routing process, while not being prompted for information irrelevant to the selection. For example, if only one agent is available, the entire prompting process may be bypassed. If two agents are available, their profiles may be analyzed, and only the most critical distinctions probed. This entire process may be handled in the low level communications processing system, without substantial loss of efficiency or throughput in that system, and with substantial gains in overall architectural efficiency.

Often, a highly skilled agent will serve as mentor for the trainee, and "shadow" the call. Thus, the routing of a call may depend on availability of both trainee and skilled instructor. This dual-availability checking and pairing may be performed in the low level system.

Another aspect of call center efficiency impacted by this scheme is agent motivation. Because an agent with lower skill levels will be given assignments considered challenging, while more skilled agents given training assignments which may be considered desirable, there is an incentive for agents to progress, and likewise no incentive to avoid progressing. Thus, an agent will have no incentive to intentionally or subliminally perform poorly to avoid future difficult skill-based assignments. These factors may be accommodated in a cost function calculation, for example with an update of the agent vector after each call based on call characteristic vector, call outcome and duration, chronological parameters, and the like.

In operation, the system works as follows. Prior to call setup, the nature of the call is predicted or its requirements estimated, as well as the prospective issues to be encountered. This may be performed in standard manner, for example in an inbound call based on the number dialed, based on the ANI/DNIS of the caller (with possible database past history lookup), selections made through automated menus, voice messages, or other triage techniques. In the case of outbound calls, a database of past history, demographic information (both particular to the callee and for the region of the call) and nature of the call may all be used to determine the projected agent skill set required for the call. Alternately, only parameters available locally to the communications control system are employed, which, for example, may exclude a past history database lookup. Collaborative filtering may be used to assist in inferring a profile of a remote user.

It is noted that, after initial call setup, the actual skill set required may become apparent, and the call may be rerouted to another agent. For example, this may be performed at a high level, thus permitting correction of errors or inappropriate selections made by the low level system.

Once the predicted skill sets are determined, these are then compared against a database of available agents and their respective skill sets. A weighting is applied based on perceived importance of selection criteria, and the requirements correlated with the available agent skill sets.

When the call center is operating below peak capacity, marginally acceptable agents may be selected to receive the call, possibly with a highly acceptable agent available if necessary for transfer or handoff or to monitor the call. When the call center is operating near peak capacity, the agents are assigned to minimize the anticipated man-hour burden (throughput) and/or wait time. Thus, peak throughput operation generally requires that agents operate within their proven skill sets, and that training be minimized.

Each call is associated with a skill expression that identifies the skills that are relevant to efficient handling of the call. As previously noted, the preferred embodiment is one in which more than one relevant skill is identified, so that all of the factors that determine a "best" agent for handling a call can be considered. This is expressed, for example, as a call characteristic vector. The relevant skills required may be determined using different techniques.

The skill expression of a call includes the required skills and skill levels for efficiently handling the call. In one embodiment, the skills may be divided into two categories: mandatory and optional skills. Mandatory skills are those skills that an agent must possess in order to handle the call, even if the call remains in queue for an extended period of time. For example, language proficiency is often a mandatory skill for handling a call. Optional skills are those that are considered in the selection of the appropriate agent, but not critical. In operation, these mandatory skills are expressed as a high relevance rating with respect to a call characteristic having a non-linear (e.g., binary or sigmoid) characteristic. Therefore, in the absence of exceptional circumstances, other factors for qualified agents will determine resolution. Alternately, the mandatory skills may be specified as a pre-filter, with optional skills and cost function expressed through linear-type equations.

It is noted that the peak/non-peak considerations may be applied on a call-by-call basis. Thus, certain callers may be privileged to have a shorter anticipated wait and greater efficiency service than others. Thus, these callers may be treated preferentially, without altering the essential aspects of the invention.

The present invention may also generate a set of reports directed to management of the call center. Typically, the communications server generates a call log, or a statistically processed log, for analysis by a higher level system, and does not generate complete, formatted reports itself. The quality of service reports are generated to indicate the effectiveness of the call-management method and system. An agent summary report is organized according to the activities of particular individuals, i.e. agents. A skill summary report organizes the data by skill expressions, rather than by agents. This report may list the number of calls requiring selected skill expressions and the average time spent on those calls. Other known report types are also possible. An important report type is the improvement in call center efficiency over time, i.e., decreased wait time, increased throughput, increased customer satisfaction, etc. Thus, each agent should demonstrate improved skills over time. Peak throughput should meet or exceed reasonable expectations based on a statically skill-routed call center. Other metrics may also be evaluated. Such reports are typically not generated from low level communications systems, and are considered an inventive feature.

It is therefore an object of the invention to provide a communications control system comprising an input for receiving a call classification vector, a table of agent characteristic vectors, and a processor, for (a) determining, with respect to the received call classification, an optimum agent selection based on at least a correspondence of said call classification vector and said table of agent characteristic vectors, and (b) controlling a call routing of the information representing said received call in dependence thereon. It is a further object of the invention to provide a system wherein the process maintains a table of skill weights with respect to the call classification, and applies said weights to determine an optimum agent selection.

Another object of the invention is to provide a communications control system for handling real time communications, wherein an integral system resolves a communications target based on an optimizing algorithm and establishes a communications channel with the resolved communications target.

A further object of the invention provides a communications method comprising receiving a call, classifying the call to determine characteristics thereof, receiving a table representing characteristics of potential targets, determining an optimum target based on the characteristics of both the call and the potential targets, and routing the received call to the optimum target, the determining step and the routing step being performed by a common platform.

A still further object of the invention provides a communications control software system, comprising a multithreaded operating system, providing support for applications and for passing messages between concurrently executing applications, a communications control server application executing under said multithreaded operating system, for controlling real time communications, and at least one dynamically linkable application, executing under said multithreaded operating system, communicating with said communications control server application to receive call characteristic data and transmit a resolved communications target.

Another object of the invention provides a method of determining an optimum communications target in real time, comprising receiving a communication having an indeterminate target, selecting an optimum target, and establishing a channel for the communication with the optimum target, wherein said selecting and establishing steps are performed on a consolidated platform.

It is a further object of the invention to provide a communications processing system for directly establishing and controlling communications channels, receiving information regarding characteristics of a preferred target of a communication, comparing the characteristics with a plurality of available targets using an optimizing algorithm, and establishing the communication with the target in dependence thereon.

It is another object of the invention to provide a method of selecting a call handling agent to handle a call, comprising the steps of identifying at least one characteristic of a call to be handled; determining a call center load, and routing the call to an agent in dependence on the characteristic, call center load, and agent characteristics.

A further object of the invention provides a method optimizing an association of a communication with an agent in a communications center, comprising the steps of determining a characteristic of a communication; accessing a skill profile of a set of agents; cost-optimizing the matching of the communication with an agent based on the respective skill profile, and routing the call to a selected agent based on said cost-optimization with a common system with said optimizing.

An object of the invention also includes providing a method for matching a communication with a communication handler, comprising the steps of predicting a set of issues to be handled during the communication; accessing a profile record for each of a plurality of communications handlers; analyzing the profile records with respect to the anticipated issues of the communication to determine a minimal capability; selecting an optimum communication handler; and controlling the communication, all controlled within a common process.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENTS

The Detailed description of the invention is intended to describe relatively complete embodiments of the invention, through disclosure of details and reference to the drawings. The following detailed description sets forth numerous specific details to provide a thorough understanding of the invention. However, those of ordinary skill in the art will appreciate that the invention may be practiced without these specific details. In other instances, well-known methods, procedures, protocols, components, and circuits have not been completely described in detail so as not to obscure the invention. However, many such elements are described in the cited references which are incorporated herein by reference, or as are known in the art.

For each agent, a profile is created based on manual inputs, such as language proficiency, formal education and training, position, and the like, as well as automatically, based on actual performance metrics and analysis, and used to create a skills inventory table. This process is generally performed in a high level system, such as a customer relations management system or human resources management system. A profile thus represents a synopsis of the skills and characteristics that an agent possesses, although it may not exist in a human readable or human comprehensible form.

Preferably, the profile includes a number of vectors representing different attributes, which are preferably independent, but need not be. The profile relates to both the level of ability, i.e. expertise, in each skill vector, as well as the performance of the agent, which may be a distinct criterion, with respect to that skill. In other words, an agent may be quite knowledgeable with respect to a product line, but nevertheless relatively slow to service callers. The profile, or an adjunct database file, may also include a level of preference that call management has for the agent to handle transactions that require particular skills versus transactions that require other skills, or other extrinsic considerations.

This table or set of tables is communicated to the communications server. Typically, the communications server does not create or modify the agent skills table, with the possible exception of updating parameters based on immediate performance. For example, parameters such as immediate past average call duration, spoken cadence, and other statistical parameters of a call-in-progress or immediately past concluded will be available to the communications server. These parameters, which may vary over the course of a single shift, may be used to adaptively tune the profile of the agent in real time. Typically, however, long term agent performance is managed at higher levels.

Figure 1:
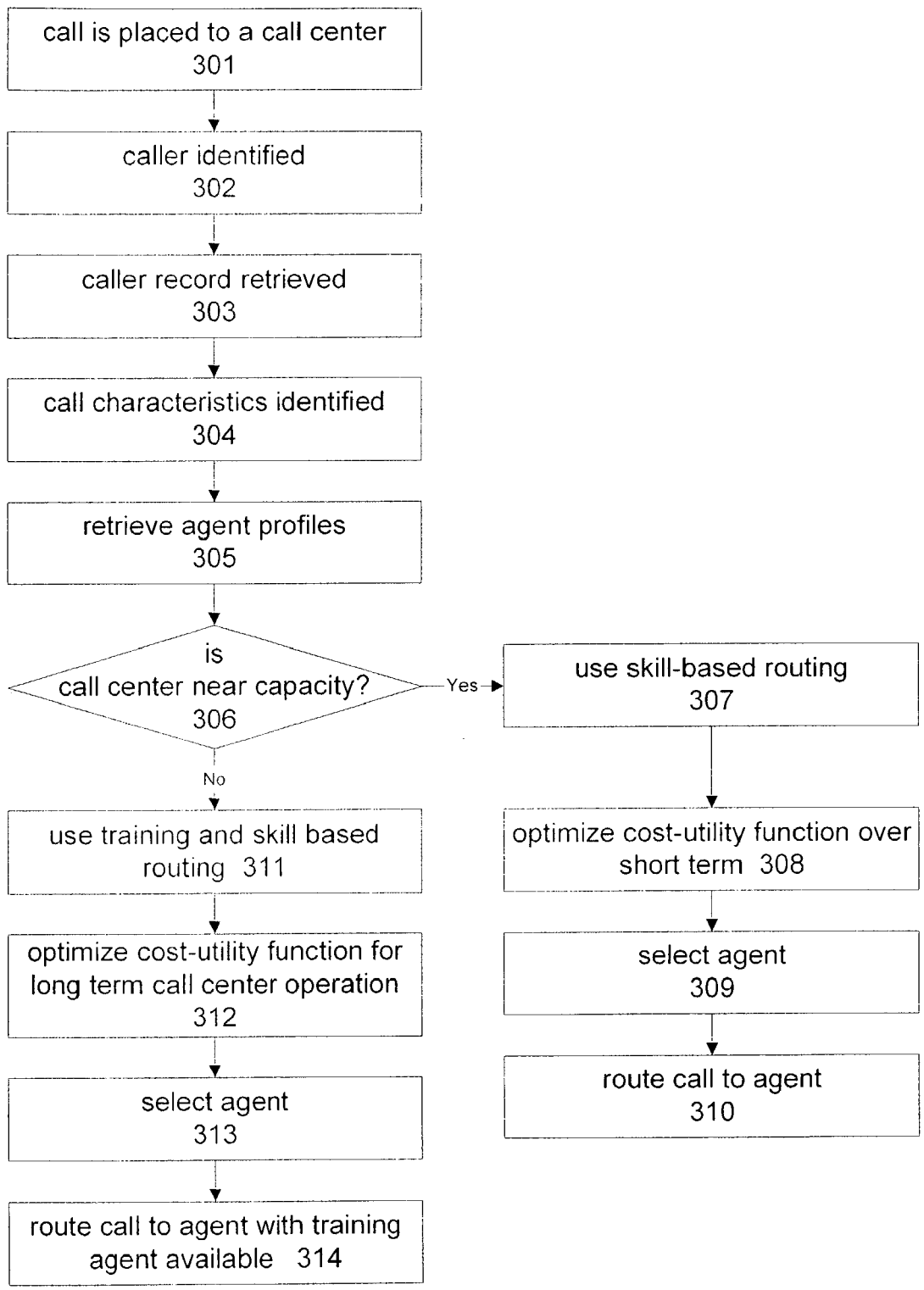
FIGS. 1 and 2 are flow charts showing a skill routing method according to the present invention.
Figure 2:
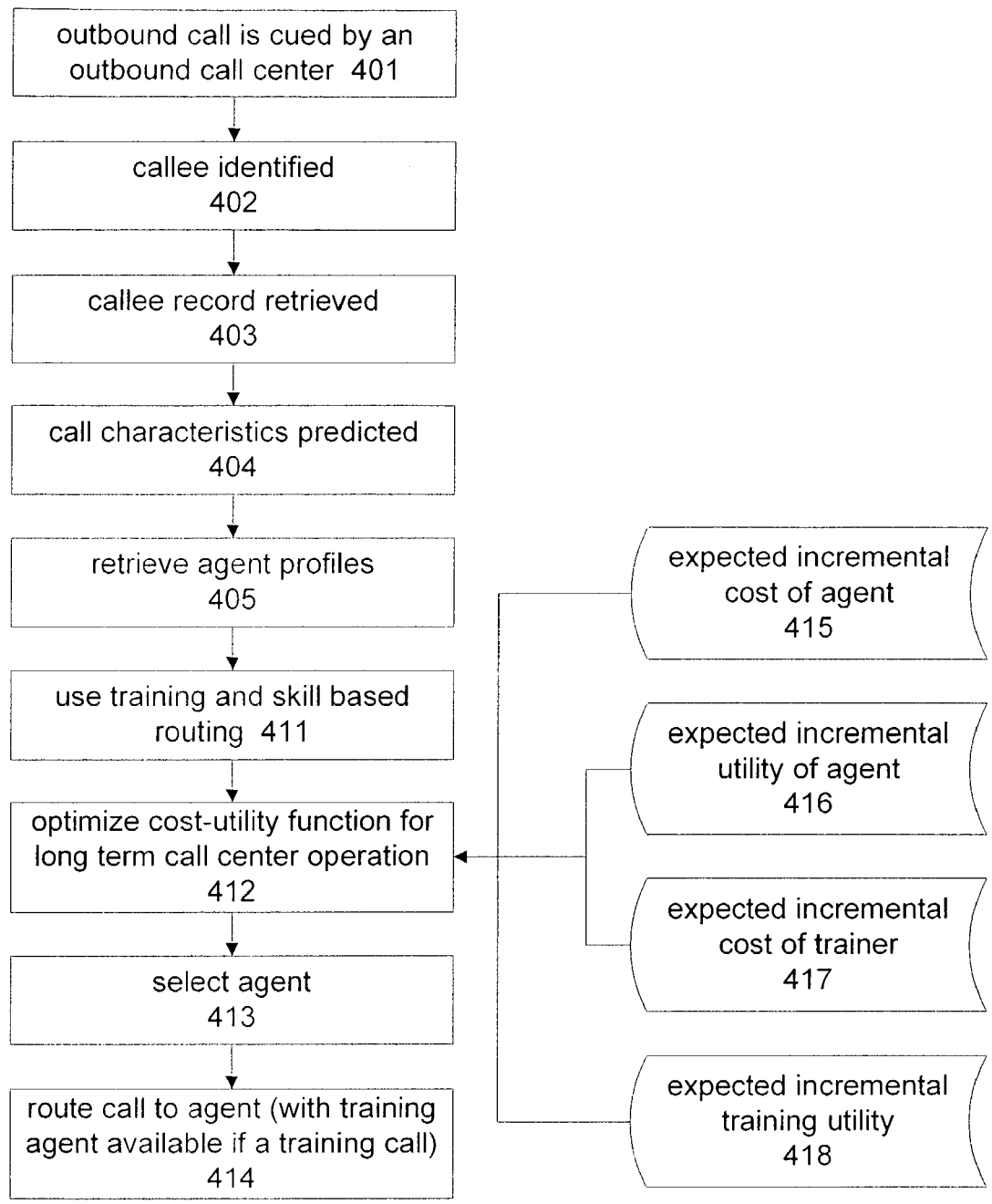

FIG. 1 shows a flow chard of an incoming call routing algorithm according to a preferred embodiment of the present invention. A call is placed by a caller to a call center 301. The call is directed, through the public switched telephone network, although, calls or communications may also be received through other channels, such as the Internet, private branch exchange, intranet VOIP, etc. The source address of the call, for example the calling telephone number, IP address, or other identifier, is received to identify the caller 302. While the call is in the waiting queue, this identifier is then used to call up an associated database record 303, providing, for example, a prior history of interaction, a user record, or the like. The call waiting queue may be managed directly by the telephony server. In this case, since the caller is waiting, variable latencies due to communications with a separate call management system would generally not interfere with call processing, and therefore may be tolerated. In other instances, an interactive voice response (IVR) system may be employed to gather information from the caller during the wait period.

In some instances, there will be no associated record, or in others, the identification may be ambiguous or incorrect. For example, a call from a PBX wherein an unambiguous caller extension is not provided outside the network, a call from a pay phone, or the like. Therefore, the identity of the caller is then confirmed using voice or promoted DTMF codes, which may include an account number, transaction identifier, or the like, based on the single or ambiguous records.

During the identity confirmation process, the caller is also directed to provide certain details relating to the purpose of the call. For example, the maybe directed to "press one for sales, two for service, three for technical support, four for returns, and five for other". Each selected choice, for example, could include a further menu, or an interactive voice response, or an option to record information.

The call-related information is then coded as a call characteristic vector 304. This call characteristic is either generated within, or transmitted to, the communications server system.

Each agent has a skill profile vector. This vector is developed based on various efficiency or productivity criteria. For example, in a sales position, productivity may be defined as sales volume or gross profits per call or per call minute, customer loyalty of past customers, or other appropriate metrics. In a service call, efficiency may be defined in terms of minutes per call, customer loyalty after the call, customer satisfaction during the call, successful resolution of the problem, or other metrics. These metrics may be absolute values, or normalized for the agent population, or both. The skill profile vector is stored in a table, and the profiles, which may be updated dynamically, of available or soon to be available agents, are accessed from the table (database) 305.

Typically, the table 305 is provided or updated by a high level call center management system to the communications server system as the staffing assignments change, for example once or more per shift. Intra-shift management, such as scheduling breaks, may be performed at a low or high level.

The optimization entails analysis of various information, which may include the caller characteristics, the call incident characterization, availability of agents, the agent profile(s), and/or various routing principles. According to the present invention, the necessary information is made directly available to the communications server, which performs an optimization to determine a "best" target, e.g., agent selection, for the caller.

For example, if peak instantaneous efficiency is desired, for example when the call center is near capacity 306, more advanced optimizations may be bypassed and a traditional skill based call routing algorithm 307 implemented, which optimizes a short term cost-utility function of the call center 308. An agent who can "optimally" handle the call is then selected 309, and the call routed to that agent 310. The global (e.g., call center) factors may be accounted as a separate set of parameters.

Thus, in order to immediately optimize the call routing, the general principle is to route the call such that the sum of the utility functions of the calls be maximized while the cost of handling those calls be minimized. Other types of optimizations may, of course, be applied.

According to one optional aspect of the invention, the various routing principles discussed above explicitly value training as a utility of handling a call 311, and thus a long-term optimization is implemented 312. The utility of caller satisfaction is also weighted, and thus the agent selected is generally minimally capable of handling the call. Thus, while the caller may be somewhat burdened by assignment to a trainee agent, the call center utility is maximized over the long term, and call center agents will generally increase in skill rapidly.

In order for the communications server system to be able to include these advanced factors, they must be expressed in a normalized format, such as a cost factor.

As for the cost side of the optimization, the cost of running a call center generally is dependent on required shift staffing, since other costs are generally constant. Accordingly, a preferred type of training algorithm serves to minimize sub-locally optimal call routing during peak load periods, and thus would be expected to have no worse cost performance than traditional call centers. However, as the call center load is reduced, the call routing algorithm routes calls to trainee agents with respect to the call characteristics. This poses two costs. First, since the trainee is less skilled than a fully trained agent, the utility of the call will be reduced. Second, call center agent training generally requires a trainer be available to monitor and coach the trainee. While the trainer may be an active call center agent, and therefore part of the fixed overhead, there will be a marginal cost since the trainer agent might be assuming other responsibilities instead of training. For example, agents not consumed with inbound call handling may engage in outbound call campaigns.

It is clearly apparent that the communications server system will have direct access to call center load data, both in terms of availability of agents and queue parameters.

Thus, in a training scheme, an optimization is performed, using as at least one factor the value of training an agent with respect to that call 312, and an appropriate trainee agent selected 313.

In order to provide proper training, the trainer and trainee must both be available, and the call routed to both 314. Generally, the trainee has primary responsibility for the call, and the trainer has no direct communication with the caller. Therefore, the trainer may join the call after commencement, or leave before closing. However, routing a call which requires two agents to be simultaneously available poses some difficulties. In general, the trainer is an agent capable of handling the entire call alone, while the trainee may not be. Therefore, the trainer is a more important participant, and the initial principle in routing the training call is to ensure that a trainer is available. The trainer may then await availability of an appropriate trainee, or if none is imminently available, handle the call himself or herself.

On the other hand, where a specific training campaign is in place, and a high utility associated with agent training, then the availability of a specific trainee or class or trainees for a call having defined characteristics is particularly important. In that case, when an appropriate trainee is available, the call held in that agent's cue, and the call possibly commenced, awaiting a training agent's availability.

If the training is highly structured, it is also possible to assign the trainer and trainee agents in pairs, so that the two are always available for calls together.

The system according top the present invention may also provide reinforcement for various training. Thus, if a subset of agents receive classroom training on a topic, the server may target those agents with calls relating to that topic. For example, the topic may represent a parameter of a call characterization vector. In order to target certain agents for calls having particular characteristics, a negative cost may be applied, thus increasing the probability that the agent will be selected, as compared with an agent having a positive cost. By using a single cost function, rather than specific override, the system becomes resilient, since this allocation is not treated as an exception, and therefore other parameters may be simultaneously evaluated. For example, if a caller must communicate in a foreign language, and the agent does not speak that foreign language, then the system would not target the call to that agent, even if other factors weigh in favor of such targeting.

The same techniques are available for outbound campaigns and/or mixed call centers. In this case, the cost of training is more pronounced, since agents idle for inbound tasks are generally assigned to outbound tasks, and thus the allocation of trainer agents and trainee agents generally results in both longer call duration and double the number of agents assigned per call. This cost may again be balanced by avoiding training during peak utility outbound calling hours and peak inbound calling hours; however, training opportunities should not be avoided absolutely.

According to one embodiment of the invention, at the conclusion of a call, the caller is prompted through an IVR to immediately assess the interaction, allowing a subjective scoring of the interaction by the caller without delay. This information can then be used to update the stored profile parameters for both caller and agent, as well as to provide feedback to the agent and/or trainer. Under some circumstances, this may also allow immediate rectification of an unsatisfactory result.

EXAMPLE 1

Each agent is classified with respect to 10 skills, and each skill can have a weight of 0 to 127. The skill weights may be entered manually by a supervisor, developed adaptively, or provided by other means. These are sent as a parameter file to the communications server.

A rule vector specifies a normalized contribution of each skill to apply to the total. This rule vector, for example, represents the call characteristic vector. Thus, attributes of the call and the status of the system are analyzed to generate this rule vector. There can be more than one rule vector defined in a project (split), or a rule can be setup in a per call basis. Generally, routing with predefined rules is much more efficient than routing with rules in a per call bases. When a call needs to be routed to an agent, the rule vector is applied to the skills of the available agents and a score is derived for each agent. The agent with the highest score is assigned the call.

| Rule vector | | | Agent 1 | Agent 2 | Agent 3 | Agent 4 | Agent 5 |
|---|---|---|---|---|---|---|---|
| 20% | Skill | 1 | 20 | 5 | 3 | 5 | 4 |
| 5% | Skill | 2 | 3 | 3 | 3 | 3 | 3 |
| 10% | Skill | 3 | 10 | 6 | 9 | 10 | 10 |
| 15% | Skill | 4 | 43 | 50 | 33 | 46 | 25 |
| 3% | Skill | 5 | 7 | 2 | 9 | 2 | 8 |
| 7% | Skill | 6 | 5 | 8 | 5 | 8 | 9 |
| 20% | Skill | 7 | 2 | 3 | 4 | 2 | 2 |
| 8% | Skill | 8 | 64 | 80 | 29 | 45 | 77 |
| 5% | Skill | 9 | 4 | 5 | 4 | 1 | 2 |
| 7% | Skill | 10 | 9 | 3 | 8 | 3 | 6 |
| 100% | Score | | 18.51 | 17.33 | 11.1 | 13.93 | 13.65 |

As shown, Agent 1 would be selected, since this is the highest score.

In this example, it is presumed that all selections have the same cost, and therefore the utility only varies. Thus, the agent with the highest utility function is the optimal selection.

EXAMPLE 2

The conditions below are the same as in Example 1, except two new factors are provided, Ac1 and Ac2. The Preliminary Score is calculated as the sum of the products of the Rule Vector and the Agent Vector. The Final Score is calculated as (Ac1×sum)+Ac2.

In this case, Ac1 represents an agent-skilled weighting cost function, while Ac2 represents an agent cost function. Since we select the maximum value, more expensive agents have correspondingly lower cost values.

| | | | Agent 1 | Agent 2 | Agent 3 | Agent 4 | Agent 5 |
|---|---|---|---|---|---|---|---|
| | | | | | Ac1 | | |
| Rule | | | 0.4 | 0.55 | 0.45 | 0.7 | 0.6 |
| | | | | | Ac2 | | |
| Vector | | | 6 | 3 | 6.8 | 2 | 5.5 |
| 20% | Skill | 1 | 20 | 5 | 3 | 5 | 4 |
| 5% | Skill | 2 | 3 | 3 | 3 | 3 | 3 |
| 10% | Skill | 3 | 10 | 6 | 9 | 10 | 10 |
| 15% | Skill | 4 | 43 | 50 | 33 | 46 | 25 |
| 3% | Skill | 5 | 7 | 2 | 9 | 2 | 8 |
| 7% | Skill | 6 | 5 | 8 | 5 | 8 | 9 |
| 20% | Skill | 7 | 2 | 3 | 4 | 2 | 2 |
| 8% | Skill | 8 | 64 | 80 | 29 | 45 | 77 |
| 5% | Skill | 9 | 4 | 5 | 4 | 1 | 2 |
| 7% | Skill | 10 | 9 | 3 | 8 | 3 | 6 |
| 100% | Prelim Score | | 18.51 | 17.33 | 11.1 | 13.93 | 13.65 |
| | Final Score | | 13.40 | 12.53 | 11.80 | 11.75 | 13.69 |

As can be seen, Agent 5 is now optimum.

EXAMPLE 3

In this example, a limiting criterion is imposed, that is, only agents with a skill score within a bound are eligible for selection. While this may be implemented in a number of ways, possibly the simplest is to define the range, which will typically be a lower skill limit only, below which an agent is excluded from selection, as a preliminary test for "availability".

As noted below, the screening criteria may be lower, upper or range limits. In this case, the screening process excludes agents 2, 3, and 5, leaving agents 1 and 4 available. Of these two choices, agent 1 has the higher score and would be targeted.

| Min Skill | Max Skill | Exclude Agent | | | Agent 1 | Agent 2 | Agent 3 | Agent 4 | Agent 5 |
|---|---|---|---|---|---|---|---|---|---|
| | | | Rule Vector | | 0.4 | 0.55 | Ac1 0.45 | 0.7 | 0.6 |
| | | | | | | | Ac2 | | |
| | | | | | 6 | 3 | 6.8 | 2 | 5.5 |
| 20% | 0% | 25% | Skill | 1 | 20 | 5 | 3 | 5 | 4 |
| 5% | | | Skill | 2 | 3 | 3 | 3 | 3 | 3 |
| 10% | | | Skill | 3 | 10 | 6 | 9 | 10 | 10 |
| 15% | 40% | 100% | 3, 5 | Skill | 4 | 43 | 50 | 33 | 46 | 25 |
| 3% | | | Skill | 5 | 7 | 2 | 9 | 2 | 8 |
| 7% | | | Skill | 6 | 5 | 8 | 5 | 8 | 9 |
| 20% | | | Skill | 7 | 2 | 3 | 4 | 2 | 2 |
| 8% | 30% | 75% | 2, 3, 5 | Skill | 8 | 64 | 80 | 29 | 45 | 77 |
| 5% | | | Skill | 9 | 4 | 5 | 4 | 1 | 2 |
| 7% | | | Skill | 10 | 9 | 3 | 8 | 3 | 6 |
| 100% | | | 2, 3, 5 excluded 1,4 available Prelim Score | | 18.51 | 17.33 | 11.1 | 13.93 | 13.65 |
| | | | Final Score | | 13.40 | 12.53 | 11.80 | 11.75 | 13.69 |

EXAMPLE 4

In this example, the optimization seeks to optimize the placement of 5 incoming calls to 5 agents. As shown, each caller is represented by a different call vector, and each agent by a distinct skill vector. The optimization therefore seeks the maximum utility from the respective possible pairings.

| SKILL | Rule Vector 1 | Rule Vector 2 | Rule Vector 3 | Rule Vector 4 | Rule Vector 5 | | Agent 1 | Agent 2 | Agent 3 | Agent 4 | Agent 5 |
|---|---|---|---|---|---|---|---|---|---|---|---|
| 1 | 20% | 25% | 17% | 20% | 14% | | 20 | 5 | 3 | 5 | 4 |
| 2 | 5% | 10% | 5% | 5% | 3% | | 3 | 3 | 3 | 3 | 3 |
| 3 | 10% | 15% | 20% | 10% | 8% | | 10 | 6 | 9 | 10 | 10 |
| 4 | 15% | 10% | 5% | 5% | 5% | | 43 | 50 | 33 | 46 | 25 |
| 5 | 3% | 0% | 5% | 8% | 1% | | 7 | 2 | 9 | 2 | 8 |
| 6 | 7% | 10% | 13% | 10% | 7% | | 5 | 8 | 5 | 8 | 9 |
| 7 | 20% | 10% | 5% | 10% | 20% | | 2 | 3 | 4 | 2 | 2 |
| 8 | 8% | 4% | 8% | 4% | 8% | | 64 | 80 | 29 | 45 | 77 |
| 9 | 5% | 8% | 13% | 18% | 23% | | 4 | 5 | 4 | 1 | 2 |
| 10 | 7% | 8% | 9% | 10% | 11% | | 9 | 3 | 8 | 3 | 6 |
| | 100% | 100% | 100% | 100% | 100% | Rule 1 | 18.51 | 17.33 | 11.1 | 13.93 | 13.65 |
| | | | | | | Rule 2 | 15.4 | 12.39 | 8.72 | 10.77 | 10.12 |
| | | | | | | Rule 3 | 15.25 | 13.31 | 8.97 | 10.54 | 12.71 |
| | | | | | | Rule 4 | 12.74 | 9.91 | 7.6 | 7.89 | 8.98 |
| | | | | | | Rule 5 | 13.69 | 12.83 | 8.24 | 9.03 | 11.09 |

| Combinatorial analysis of agents vs. callers | | | | | | | | | | | | | | | | | | | | | | | | |
|---|---|---|---|---|---|---|---|---|---|---|---|---|---|---|---|---|---|---|---|---|---|---|---|---|
| 58.85 | 59.52 | 58.77 | 59.58 | 60.68 | 58.79 | 58.04 | 58.85 | 60.28 | 57.72 | 58.12 | 58.93 | 60.42 | 57.86 | 59.01 | 60.15 | 59.26 | 56.7 | 59.96 | 58.18 |
| 57.88 | 58.55 | 58.88 | 60.66 | 59.71 | 57.82 | 58.15 | 59.93 | 59.31 | 56.75 | 55.41 | 57.19 | 60.53 | 57.97 | 56.3 | 57.33 | 60.34 | 57.78 | 57.25 | 55.36 |
| 60.13 | 61.28 | 59.25 | 60.06 | 61.96 | 61.33 | 59.3 | 60.11 | 62.04 | 60.26 | 58.9 | 59.71 | 60.9 | 59.12 | 59.79 | 60.93 | 59.74 | 57.96 | 58.63 | 58.96 |
| 60.24 | 49.54 | 56.54 | 58.32 | 62.07 | 58.99 | 56.96 | 58.74 | 59.33 | 57.92 | 56.56 | 58.34 | 58.19 | 56.78 | 57.45 | 58.48 | 58 | | 56.59 | 57.26 | 56.51 |
| 58.66 | 59.81 | 60.14 | 62.42 | 60.49 | 59.86 | 60.19 | 62.47 | 60.57 | 58.79 | 57.45 | 59.73 | 61.79 | 60.01 | 58.34 | 58.59 | 62.1 | | 60.32 | 58.65 | 56.62 |
| 59.74 | 58.07 | 57.32 | 59.6 | 61.57 | 58.49 | 57.74 | 60.02 | 58.83 | 57.42 | 57.82 | 60.1 | 58.97 | 57.56 | 58.71 | 58.96 | 59.28 | 57.87 | 59.02 | 56.99 |

Using a combinatorial analysis, the maximum value is 62.42, which represents the selection of agent 1/caller 1; agent 2/caller 5; agent 3/caller 4; agent 4, caller 2; and agent 5, caller 3.

EXAMPLE 5

Similarly to Example 4, it is also possible to include an agent cost analysis, to provide an optimum cost-utility function. As in Example 2, the cost factors are reciprocal, since we select the largest value as the optimum. Likewise, time factors are also reciprocal, since we seek to minimize the time spent per call. In this case, the cost analysis employs three additional parameters; the agent cost, a value representing the cost of the agent per unit time; a value representing an anticipated duration of the call based on the characteristics of the caller; and a value representing the anticipated duration of the call based on characteristics of the agent

| | Rule Vector 1 | Rule Vector 2 | Rule Vector 3 | Rule Vector 4 | Rule Vector 5 | | Agent 1 | Agent 2 | Agent 3 | Agent 4 | Agent 5 |
|---|---|---|---|---|---|---|---|---|---|---|---|
| | | | | | | | | | Agent Cost | | |
| | | | | | | | 0.59 | 0.68 | 1 | 0.86 | 0.79 |
| | | | Caller time factor | | | | | | Agent time factor | | |
| SKILL | 3 | 3.5 | 2.75 | 4 | 10 | | 1.3 | 1.3 | 1 | 1.1 | 1.2 |
| 1 | 20% | 25% | 17% | 20% | 14% | | 20 | 5 | 3 | 5 | 4 |
| 2 | 5% | 10% | 5% | 5% | 3% | | 3 | 3 | 3 | 3 | 3 |
| 3 | 10% | 15% | 20% | 10% | 8% | | 10 | 6 | 9 | 10 | 10 |
| 4 | 15% | 10% | 5% | 5% | 5% | | 43 | 50 | 33 | 46 | 25 |
| 5 | 3% | 0% | 5% | 8% | 1% | | 7 | 2 | 9 | 2 | 8 |
| 6 | 7% | 10% | 13% | 10% | 7% | | 5 | 8 | 5 | 8 | 9 |
| 7 | 20% | 10% | 5% | 10% | 20% | | 2 | 3 | 4 | 2 | 2 |
| 8 | 8% | 4% | 8% | 4% | 8% | | 64 | 80 | 29 | 45 | 77 |
| 9 | 5% | 8% | 13% | 18% | 23% | | 4 | 5 | 4 | 1 | 2 |
| 10 | 7% | 8% | 9% | 10% | 11% | | 9 | 3 | 8 | 3 | 6 |
| | 100% | 100% | 100% | 100% | 100% | Rule 1 | 72.189 | 58.80069 | 19.647 | 31.71861 | 36.855 |
| | | | | | | Rule 2 | 70.07 | 49.045815 | 18.0068 | 28.610505 | 31.878 |
| | | | | | | Rule 3 | 54.51875 | 41.3974275 | 14.553825 | 21.999615 | 31.45725 |
| | | | | | | Rule 4 | 66.248 | 44.83284 | 17.936 | 23.95404 | 32.328 |
| | | | | | | Rule 5 | 177.97 | 145.1073 | 48.616 | 68.5377 | 99.81 |

| Combinatorial Analysis | | | | | | | | | |
|---|---|---|---|---|---|---|---|---|---|
| 259.5527 | 255.3573 | 256.8383 | 289.6307 | 267.1886 | 254.8785 | 256.3595 | 289.1519 | 255.0903 | 246.9756 | 247.4191 |
| 236.6543 | 232.4589 | 235.0236 | 290.7144 | 244.2902 | 231.9801 | 234.5448 | 290.2356 | 232.1919 | 224.0773 | 219.4143 |
| 260.9804 | 259.9429 | 259.9962 | 292.7886 | 268.6163 | 260.932 | 260.9853 | 293.7777 | 259.6759 | 253.0292 | 248.887 |
| 239.1658 | 163.4004 | 231.9914 | 287.6822 | 246.8016 | 234.7961 | 234.8494 | 290.5402 | 231.6711 | 226.8933 | 222.7511 |
| 224.1784 | 223.1409 | 225.7056 | 295.3001 | 231.8143 | 224.13 | 226.6947 | 296.2892 | 222.8739 | 216.2272 | 211.5642 |
| 225.2621 | 218.0345 | 219.5155 | 289.1099 | 232.898 | 220.8925 | 222.3735 | 291.9679 | 217.7675 | 212.9896 | 213.4331 |
| | | 280.2116 | 264.8651 | 256.7504 | 255.7129 | 291.0701 | 309.1051 | 300.9904 | 367.4349 | 302.5176 |
| | | 275.1051 | 243.0504 | 234.9358 | 227.7081 | 284.8799 | 310.1888 | 302.0741 | 339.4301 | 296.3275 |
| | | 281.6795 | 268.023 | 261.3763 | 257.1808 | 292.538 | 312.263 | 305.6163 | 301.4208 | 303.9855 |
| | | 278.4419 | 240.0182 | 235.2403 | 231.0449 | 288.2167 | 307.1566 | 302.3787 | 298.1833 | 299.6643 |
| | | 281.1587 | 233.7324 | 227.0857 | 219.858 | 289.5057 | 314.7744 | 308.1277 | 300.9 | 300.9533 |
| | | 283.0276 | 227.5423 | 222.7644 | 221.7269 | 291.3746 | 308.5843 | 303.8064 | 302.7689 | 302.8222 |

As can be seen, the maximum value is 314.78, which corresponds to a selection of: Agent 1/Call5; Agent 2/Call 1; Agent 3/Call 4; Agent 4/Call 2; and Agent 5/Call 3. Therefore, it is seen that the optimum agent/caller selection is sensitive to these cost factors.

It is also seen that, while the analysis can become quite complex, the formulae may be limited to evaluation of simple arithmetic functions, principally addition and multiplication, with few divisions required. Thus, these calculations may be executed efficiently in a general purpose computing environment.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A communications control system, having a common operating environment, comprising:
    (a) an input for receiving call classification information;
    (b) a data structure representing agent characteristics; and
    (c) a processor, for (a) determining, with respect to the received call classification information, an optimum agent for association with a call corresponding to call classification information, based on a multivariate cost function comparing at least three agents, the selection being based on at least a correspondence of said call classification and said data structure of agent characteristics, and (b) controlling a call routing of the call in dependence on the determination, said determining and routing functions of said processor being performed within the common operating environment.

2. The system according to claim 1, wherein the processor comprises a plurality of central processor units (CPUs).

3. The system according to claim 1, wherein the common operating environment comprises consolidated operating system.

4. The system according to claim 1, wherein the determination and control by the processor employ a common message queue within a common operating system.

5. The system according to claim 1, wherein said process maintains a data structure representing skill weights with respect to said call classification information, and applies said weights to determine an optimum agent selection.

6. The system according to claim 1, wherein said optimization may be extrinsically perturbed to provide discrimination in control of call routing.

7. The system according to claim 1, wherein a cost function is provided for each agent, said processor optimizing a cost benefit of a routing.

8. The system according to claim 1, wherein a plurality of call classification vectors are received, said processor determining, with respect to the received plurality of call classification vectors, an optimum set of agents and associated call classification vectors.

9. The system according to claim 1, wherein the optimization comprises performing a cost-benefit analysis.

10. A communications method comprising:
    (a) receiving a plurality of communications, each having associated classification information;
    (b) storing information representing characteristics of a plurality of potential targets;
    (c) determining an optimum target for each communication based on the communication classification and target characteristics using a multivariate cost function comparing at least three potential targets; and
    (d) routing the communication to the optimum target, said determining step and said routing step being performed within a common operating environment.

11. The method according to claim 10, wherein the determination and routing employ a common message queue in an operating system.

12. The method according to claim 10, wherein a data structure representing skill weights with respect to the communication classification is applied to determine an optimum agent selection.

13. The method according to claim 10, further comprising the step of perturbing the determining step to provide discrimination in routing.

14. The method according to claim 10, wherein said determining step comprises providing a cost function for each target, and optimizing a cost benefit of a routing.

15. The method according to claim 10, wherein the determining comprises performing a cost-benefit analysis.

16. The method according to claim 10, wherein the determining of an optimum target is sensitive to a training benefit of a target.

17. A communications control software system, comprising:
    (a) a multithreaded operating system, providing support for applications and for passing messages between concurrently executing applications;
    (b) a communications control server application executing under said multithreaded operating system, for controlling real time communications; and
    (c) at least one dynamically linkable application, executing under said multithreaded operating system, communicating with said communications control server application to receive call characteristic data and transmit a resolved communications target.

18. The system according to claim 17, wherein said at least one dynamically linkable application performs an optimization according to a multivariate cost function.

19. A method of remediating discrimination, comprising:
    (a) measuring a set of performance metrics for a population;
    (b) comparing performance metrics of subgroups of the population, each subgroup being defined with respect to a suspected discriminatory classification;
    (c) defining a remediation mode wherein a member of a subgroup having an inferior performance metric is presented with an opportunity to apply skills associated with the inferior performance metric under circumstances wherein improvement in the inferior performance metric is anticipated;
    (d) defining a cost-benefit of the remediation mode sufficient to offset the inferior performance metric as compared to another population subgroup in a cost benefit analysis; and
    (e) allocating opportunities using a cost benefit optimization to members of the population.

20. The method according to claim 19, wherein the cost benefit analysis comprises analysis of a multivariate cost function.

* * * * *